US008375457B2

(12) United States Patent
Ootaki

(10) Patent No.: US 8,375,457 B2
(45) Date of Patent: Feb. 12, 2013

(54) DOCUMENT MANAGEMENT DEVICE, DOCUMENT MANAGEMENT METHOD AND STORAGE MEDIUM

(75) Inventor: Yousuke Ootaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 241 days.

(21) Appl. No.: 12/980,093

(22) Filed: Dec. 28, 2010

(65) Prior Publication Data

US 2011/0167500 A1 Jul. 7, 2011

(30) Foreign Application Priority Data

Jan. 5, 2010 (JP) ................................ 2010-000487
Jun. 30, 2010 (JP) ................................ 2010-149685

(51) Int. Cl.
*G06F 7/04* (2006.01)
*H04L 9/00* (2006.01)

(52) U.S. Cl. ................ 726/28; 726/26; 726/27; 726/29; 726/30; 713/182; 713/183; 713/184; 713/189

(58) Field of Classification Search ..................... 726/28
See application file for complete search history.

(56) References Cited

U.S. PATENT DOCUMENTS

2005/0256840 A1* 11/2005 Hirosumi et al. ................ 707/1

FOREIGN PATENT DOCUMENTS

JP 2006024058 A 1/2006

OTHER PUBLICATIONS

U.S. Appl. No. 13/050,343, filed Mar. 17, 2011 by Yousuke Ootaki.

* cited by examiner

*Primary Examiner* — Longbit Chai
(74) *Attorney, Agent, or Firm* — Fitzpatrick, Cella, Harper & Scinto

(57) ABSTRACT

A document management device, when receiving information on a document registration user who is a requester for document registration and information on a document registration destination, provides a first page (top page) displayed when the document registration user logs into the document management device with a link (button) for accessing a second page for registering a desired document at the document registration destination. When the document registration user performs an operation of registering the desired document on the second page accessed through the link included in the first page, the desired document is registered at the document registration destination.

14 Claims, 47 Drawing Sheets

4····DELETION RIGHT
3····PRODUCTION/CHANGE RIGHT
2····READ RIGHT
1····NON-READ RIGHT

2201

DOCUMENT REGISTRATION BUTTON INFORMATION IN DATABASE SERVER

| No | Document_Register | User_ID | User_Password | Folder_Pass | Type | Graphic_Mode | Protocol |
|---|---|---|---|---|---|---|---|
| 00001 | user106 | user105 | user105pass | /docsystem/user105/personal/ | .pdf | 200*200 | WebDAV |
| 00002 | user107 | user105 | user105pass | /docsystem/user105/personal/ | .tiff | 300*300 | FTP |
| 00003 | | | | | | | |
| 00004 | | | | | | | |

FIG.22

| | | |
|---|---|---|
| FIG.24A | FIG.24B | FIG.24C |

| FIG.28A | FIG.28B | FIG.28C |
|---|---|---|

| FIG.30A |
| --- |
| FIG.30B |

| FIG.31A | FIG.31B | FIG.31C |
|---|---|---|

| FIG.34A |
| --- |
| FIG.34B |

DOCUMENT MANAGEMENT DEVICE, DOCUMENT MANAGEMENT METHOD AND STORAGE MEDIUM

BACKGROUND OF THE INVENTION

1. Field of the Invention

The present invention relates to an operation that allows document registration at a registration destination where a document registration user has no access right, such as a folder personally managed by a user different from a user (hereinafter, a document registration user) who registers a document or a folder in an organization to which the document registration user does not belong.

2. Description of the Related Art

In a document management device described in Japanese Patent Laid-Open No. 2006-024058, registration ticket mail in which a document registration parameter is included in a message ID or the like of e-mail is produced and is transmitted to a destination address. The document registration parameters include a document registration expiry date, a registration destination, an access right to a document that is newly registered, a user ID etc. Then, a user at the destination who has received the registration ticket mail attaches a document to be registered to return mail for the registration ticket mail and sends it. Since a message ID of the return mail includes the message ID of the registration ticket mail, the return mail includes also the document registration parameters. Then, the document management device, when receiving the return mail, registers the document attached to the return mail according to the document registration parameters included in the message ID of the return mail. In the technology of Japanese Patent Laid-Open No. 2006-029058, it is thus possible to easily register a document by using mail.

However, in the technology described above, since the mail to which the document to be registered is attached is sent back, when the return mail is eavesdropped, the document to be registered may be secretly read by a third party. Depending on an e-mail client used by the document registration user, when the volume of a document to be attached is large, there is a possibility that mail cannot be sent back and thus a large volume of a document cannot be registered.

According to the present invention, unlike Japanese Patent Laid-Open No. 2006-024058 in which registration is performed by attaching a document to mail, a document registration user, when logging into a document management system, can perform document registration by a simple operation.

SUMMARY OF THE INVENTION

To achieve the foregoing problem, a document management device according to the present invention includes: a reception unit receiving information on a document registration user that is a requester for document registration and information on a document registration destination; a provision unit proving a first page displayed when the document registration user logs into the document management device with a link for accessing a second page for registering a desired document at the document registration destination received by the reception unit; and a registration unit registering the desired document at the document registration destination when the document registration user performs an operation of registering the desired document on the second page accessed through the link included in the first page.

According to the present invention, since the document registration user performs the document registration through the screen displayed after logging in the document management device, it is possible to easily register the document at the document registration destination for which the document registration request is made under a secure environment using a SSL communication or the like.

Further features of the present invention will become apparent from the following description of exemplary embodiments (with reference to the attached drawings).

BRIEF DESCRIPTION OF THE DRAWINGS

FIG. 22 is a diagram showing document registration button information stored in a DB server in the third embodiment;

FIG. 25 is a diagram showing the relationship between FIG. 25A and FIG. 25B;

FIG. 29 is a diagram showing the relationship between FIG. 29A and FIG. 29B;

DESCRIPTION OF THE EMBODIMENTS

First Embodiment

Figure 1:
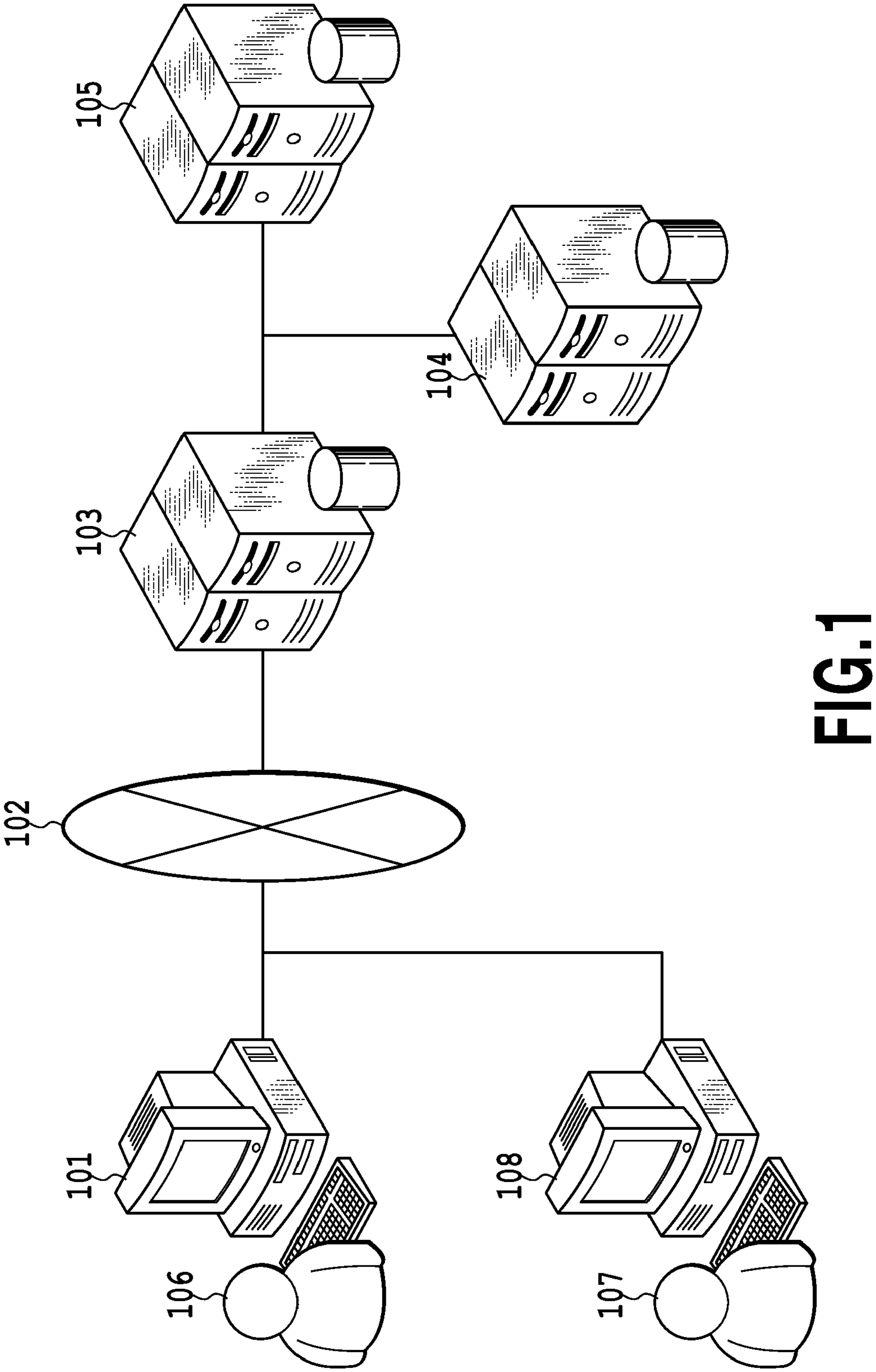
FIG. 1 is a diagram showing the configuration of a document management system according to a first embodiment of the present invention.
Figure 2:
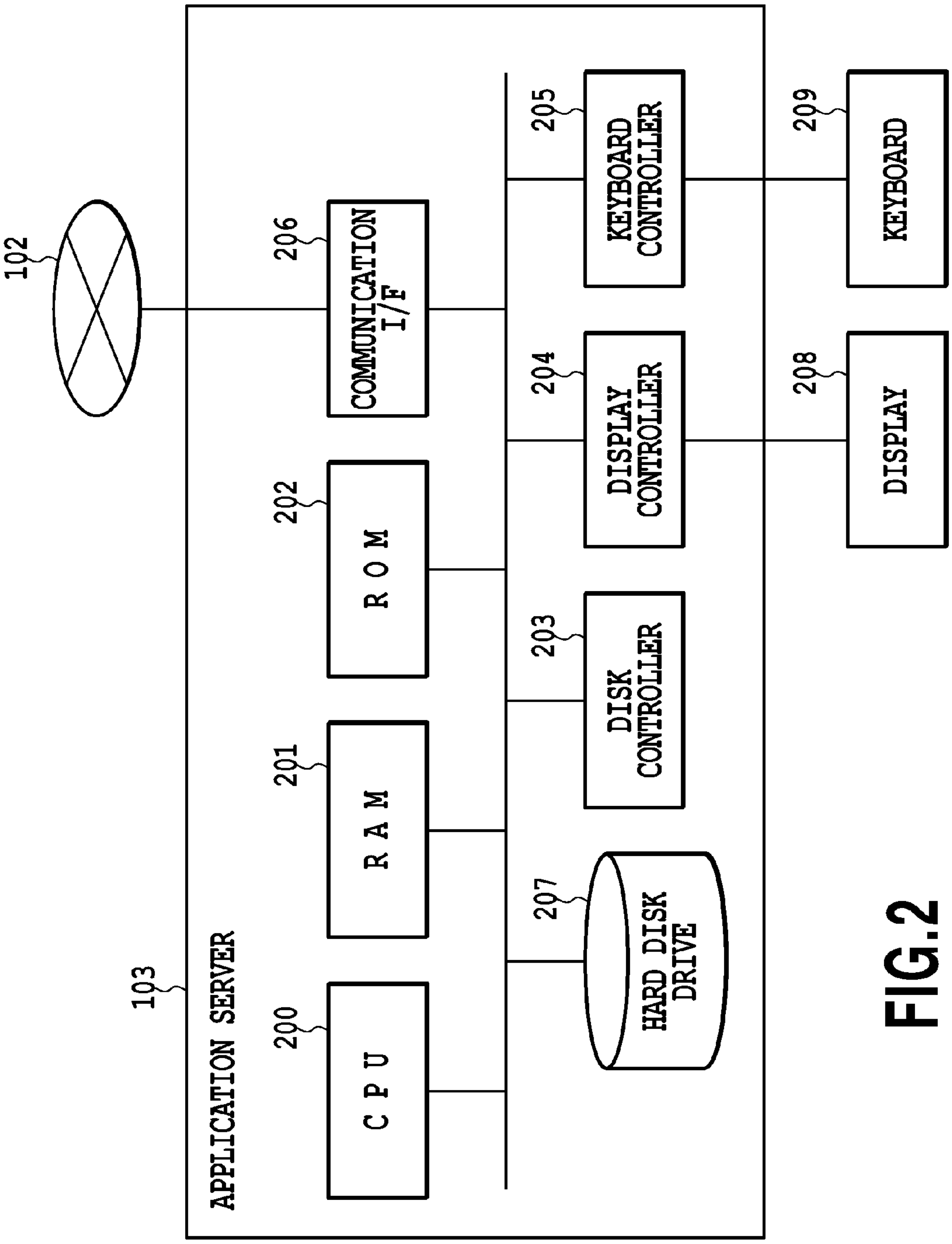
FIG. 2 is a diagram showing a hardware configuration of each server in the first embodiment.

A first embodiment of the present invention will be described based on FIGS. 1 to 7. FIGS. 1 and 2 show a configuration based on the present embodiment; FIGS. 3 to 7 show the details of processing for embodying the present invention.

Summary of Processing in the First Embodiment

A summary of processing in the first embodiment will be described before the detailed description. In the first embodiment, a folder management user (a request user that makes a request for document registration) makes a request for document registration to a document registration user through a document registration request page on the Web supplied by an e-mail or a document management system.

When an electronic mail is used to make a request for document registration, the request user transmits an e-mail including document registration destination information to the document management system and the document registration user. The document management system reads the e-mail, extracts the document registration destination information included in the text of the e-mail or an attached file and identifies the document registration user based on the destination address of the e-mail. Then, the document management system produces a button linking to a document registration permission page where a list of document registration requests is displayed, on a top page displayed when the document registration user logs into the document management system. On the document registration permission page, the list of document registration requests that are sent to the document registration user is displayed. To the document registration permission page are linked document registration destination information detailed pages for performing the respective document registration requests. The button displayed on the top page may directly link to the document registration destination information detailed pages for performing the document registration requests.

When the request user makes a request for document registration through the document registration request page supplied by the document management system, the request user logs into the document management system, and thereafter the document registration request page is displayed. Then, in the document registration request page, the request user specifies the document registration destination information (for example, information on a registration destination folder) and the document registration user. Then, the document management system produces, on the top page, a button linking to the document registration permission page (or document registration destination information detailed page for performing the document registration request) where the list of the document registration requests is displayed. In this case, the document management system notifies, through an e-mail or the like, the document registration user of the fact that a new request for document registration has been made.

Thereafter, when the document registration user logs into the document management system, a page that is displayed after the login is displayed together with the button. Then, when the document registration user presses down the button, the document registration permission page where a list of document registration requests addressed to the document registration user is displayed is displayed. Furthermore, when the document registration user selects a desired document registration request from the list, a document registration page for performing document registration at a document registration destination corresponding to the document registration request is displayed. Here, when the document registration user performs the document registration, the document management system temporarily gives an access right to the document registration destination to the document registration user, and this allows the document to be uploaded onto the document registration destination. Then, the document management system completes the reception of the document uploaded from the document registration user, and thereafter removes (returns to the original setting) the access right temporarily given to the document registration user.

DEFINITIONS OF TERMS

The definitions of terms used in this specification will first be described. A system having a UI function that can be operated by each user through a network using a browser or the like displayed on a display by a PC is referred to as a document management system. A server in which the document management system that can be accessed from outside through the Internet utilizing http (hyper text transfer protocol) or https is operating as an application is referred to as an application server (document management device). A server that is connected to the application server, that stores a document registered by a user from a PC through the application server and that reads the document when acquiring the stored document from the PC through the application server is referred to as a database server. A server that is connected to the application server and the database server and that, for example, produces a thumbnail of a document, produces data for full-text search and produces a user operation history report of the document management system in an asynchronous manner is referred to as an asynchronous server. A mail client application is referred to as a mail client.

[System Configuration]

FIG. 1 is a diagram showing the configuration of the document management system according to the first embodiment of the present invention.

A client PC 101 utilized by a user 106 (request user who manages document registration destinations) who makes a document registration request is connected through a network 102 to an application server 103, an asynchronous server 104 and a database server 105. A client PC 108 utilized by a user (document registration user) 107 who receives the document registration request from the request user and performs the document registration is also connected to the network 102.

The user 106 utilizes SMTP (simple mail transfer protocol) and transmits a document registration request mail to the e-mail address of the application server 103 from the client PC 101 through the network 102 such as the Internet. The e-mail address of the user 107 is also written as a destination in the document registration request mail, thus the e-mail is also simultaneously transmitted to the client PC 108 who receives the document registration request, and a notification indicating that the document registration request has been made may be provided. The number of client PCs that receive document registration requests is not limited to one; a plurality of client PCs may be used. Then, the application server 103 acquires information on the document registration destination from the received document registration request mail, and has the document management system read this information. The document management system that has read the information performs control such that the button to which a link to the document registration permission page for displaying a list of the document registration requests is given is displayed on the top page, which is displayed when the user 107 logs in.

Then, when the user 107 having received the document registration request from the user 106 of the client PC 101 uses the client PC 108 to access and login to the application server 103 and the document management system, the document management system displays the top page on the client PC 108. When the user 107 clicks the button on the top page, the document management system displays the list of the document registration requests addressed to the user 107 and requests the selection of whether or not any of the document registration requests is performed. When the user 107 selects any request from the list of the document registration requests, a document registration destination information detailed page corresponding to the selected document registration request is displayed. When only one document registration request is made for the user 107, the document registration destination information detailed page corresponding to the document registration request may be displayed by pressing the button. The user checks the details of the document registration requests on the document registration destination information detailed page, and can thereafter select whether or not to actually perform registration processing. When the user selects to perform registration processing, a document registration page for selecting the document to be registered is displayed. Here, when the user 107 does not have an access right to the document registration destination, the user 107 encounters a problem in that the document registration cannot be performed. Hence, in the present embodiment, when the user 107 performs the document registration, the access right to the document registration destination is temporarily given to the user 107. Thus, it becomes possible to eliminate the inconvenience of changing the access rights of the document registration users as necessary by a document registration requester or a manager for the entire system.

When, on the document registration page, the user 107 starts to perform the registration processing on the document selected from among the documents stored in the PC 108, the above-mentioned document is registered in the database server 105 through the application server 103. After the completion of the registration, the document management system returns the access right temporarily given to the user 107 to the original setting state before the change, and displays the original top page without the button if there are no other document registration requests.

In the present embodiment, a plurality of client PCs 101 and a plurality of client PCs 108 may be present on the network. The document management system may be a special application for operating documents or may be a Web application that operates on a Web browser.

[Hardware Configuration]

The hardware configuration of the application server 103 constituting the present embodiment is now shown in FIG. 2. The hardware configuration shown in the figure is equivalent to that of a general information-processing device.

In FIG. 2, a CPU 200 executes a program such as an OS (operating system) or an application loaded onto a RAM 201 either from a ROM 202 storing a program ROM or from a hard disk drive (HDD) 207. This program causes the computer (CPU) to execute the processing of each flowchart described later. That is, executing the program makes it possible to cause the computer to function as each processing part described later and shown in FIG. 3. Although, in the present embodiment, executing the program causes the computer to function as each processing part of FIG. 3, part or all of the each processing part of FIG. 3 may be configured with a special electronic circuit (hardware). The RAM 201 functions as a main memory, a work area or the like of the CPU 200. A keyboard controller 205 controls a key input from a keyboard 209. A display controller 204 controls display on various types of display 208. A disk controller 203 controls data access in the hard disk drive 207, which stores the received documents. A communication interface (I/F) 206 is connected to the network 102, and controls communication with other devices connected to the network 102.

The hardware configuration of the general information-processing device can be applied to the database server 105 and the unillustrated asynchronous server 104.

[Software Configuration]

Figure 3:
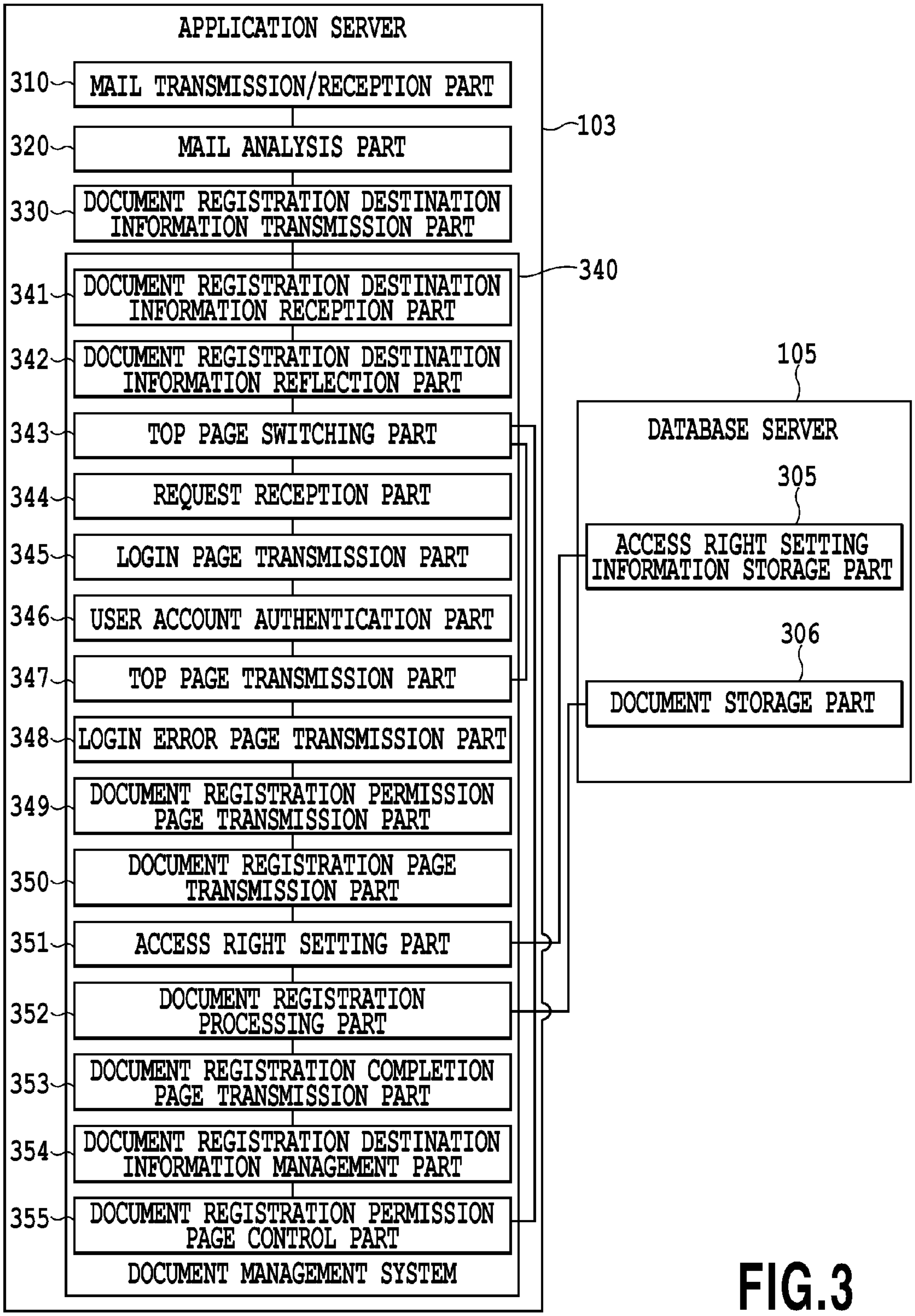
FIG. 3 is a diagram showing a software configuration in the first embodiment.

A diagram showing a software configuration within the application server 103 and the database server 105 is now shown in FIG. 3.

A mail transmission/reception part 310 receives, through the network, an e-mail transmitted from the client PC 101. A mail analysis part 320 analyzes the e-mail received by the mail transmission/reception part 310 and reads document registration destination information included in the e-mail. A document registration destination information transmission part 330 transmits the read document registration destination information to a document registration destination information transmission/reception part 341 of the document management system 340.

The document registration destination information transmission/reception part 341 receives the document registration destination information and transmits it to a document registration destination information reflection part 342. The document registration destination information reflection part 342 searches for the document registration destination present in the document management system 340 from the received document registration destination information, and reflects the document registration destination, the manager of the document registration destination and the text of the e-mail on the document registration permission page and the document registration destination information detailed page. When the content of the document registration request is reflected by the document registration destination information reflection part 342, a top page switching part 343 switches from an existing top page (to which an access button to the document registration permission page is not given) to a top page including the access button to the document registration permission page.

A request reception part 394 utilizes http or https to receive an access request transmitted from the client PC 108 to the document management system.

When the request reception part 344 receives the access request, a login page transmission part 345 transmits a login page for logging into the document management system to the client PC 108. When the user 107 of the client PC 108 enters a user account and a password on the login page transmitted from the login page transmission part 345, the user account and the password are transmitted to a user account authentication part 346. Then, based on the user account and the password transmitted, the user account authentication part 346 determines whether or not a user who attempts to login is previously authenticated.

When the user account authentication part 396 determines that the user is previously authenticated, a top page transmission part 347 reads the top page from the top page switching part 343, and transmits the read top page to the client PC 108. When the user account authentication part 346 determines that the user is not previously authenticated (for example, input of an erroneous password), a login error page transmission part 348 transmits, to the client PC 108, a page with a message indicating failed authentication.

When, on the top page transmitted from the top page transmission part 347, the user 107 of the client PC 108 presses down the button included in the top page on the screen, the access request to the document registration permission page is transmitted to the application server. When the request reception part 344 receives the access request to the document registration permission page from the client PC 108, a document registration permission page transmission part 349 transmits the document registration permission page to the client PC 108. Then, the client PC 108 displays the transmitted document registration permission page on the screen. When the user's desired document registration request is selected by the user 107 from among the document registration requests displayed on the screen, a document registration performance request on the selected document registration request is transmitted to the application server. When the request reception part 344 receives, on the document registration permission page, the document registration performance request transmitted from the client PC 108, a document registration page transmission part 350 transmits a document registration page corresponding to the selected document registration request to the client PC 108.

An access right setting part 351 reads out an access right on the user 107 having transmitted the document registration performance request from an access right setting information storage part 305 of the database server 105. At the same time the document registration page transmission part 350 performs the processing for transmitting the document registration page, the access right setting part 351 temporarily changes the access right setting information on the user 107 having transmitted the document registration performance request.

When, on the document registration page displayed by the client PC 108 on the screen, the user 107 provides an instruction to perform the desired document registration, the document registration performance request including information on the instructed document is transmitted to the application server. When the request reception part 399 receives the document registration performance request, a document registration processing part 352 transfers the document to a document storage part 306 of the database server 105 and registers it. When the document registration processing part 352 completes the document transfer processing, a document registration completion page transmission part 353 transmits a document registration completion page to the client PC 108. Then, when the user 107 closes the document registration completion page displayed on the screen or the screen moves from the document registration completion page to the top page, the access right setting part 351 returns the temporarily changed access right of the user 107 to the original setting.

When the document registration request transmitted to the document management system 390 is managed and the registration is completed, a document registration destination information management part 359 transmits the number of remaining document registration requests to a document registration permission page control part 355. When the received number of remaining document registration requests is zero, the control part 355 instructs the top page switching part 343 to switch to the conventional top page without the access button, whereas, when the received number of remaining document registration requests is one or more, the control part 355 does not provide instruction to the switching part 343.

FIG. 3 simply shows the software configuration necessary for the present embodiment; the present invention is not limited to the illustrated software configuration.

Processing in the document management system of the present embodiment will be described in detail below with reference to FIGS. 4 to 8.

[Document Registration Request]

Figure 4:
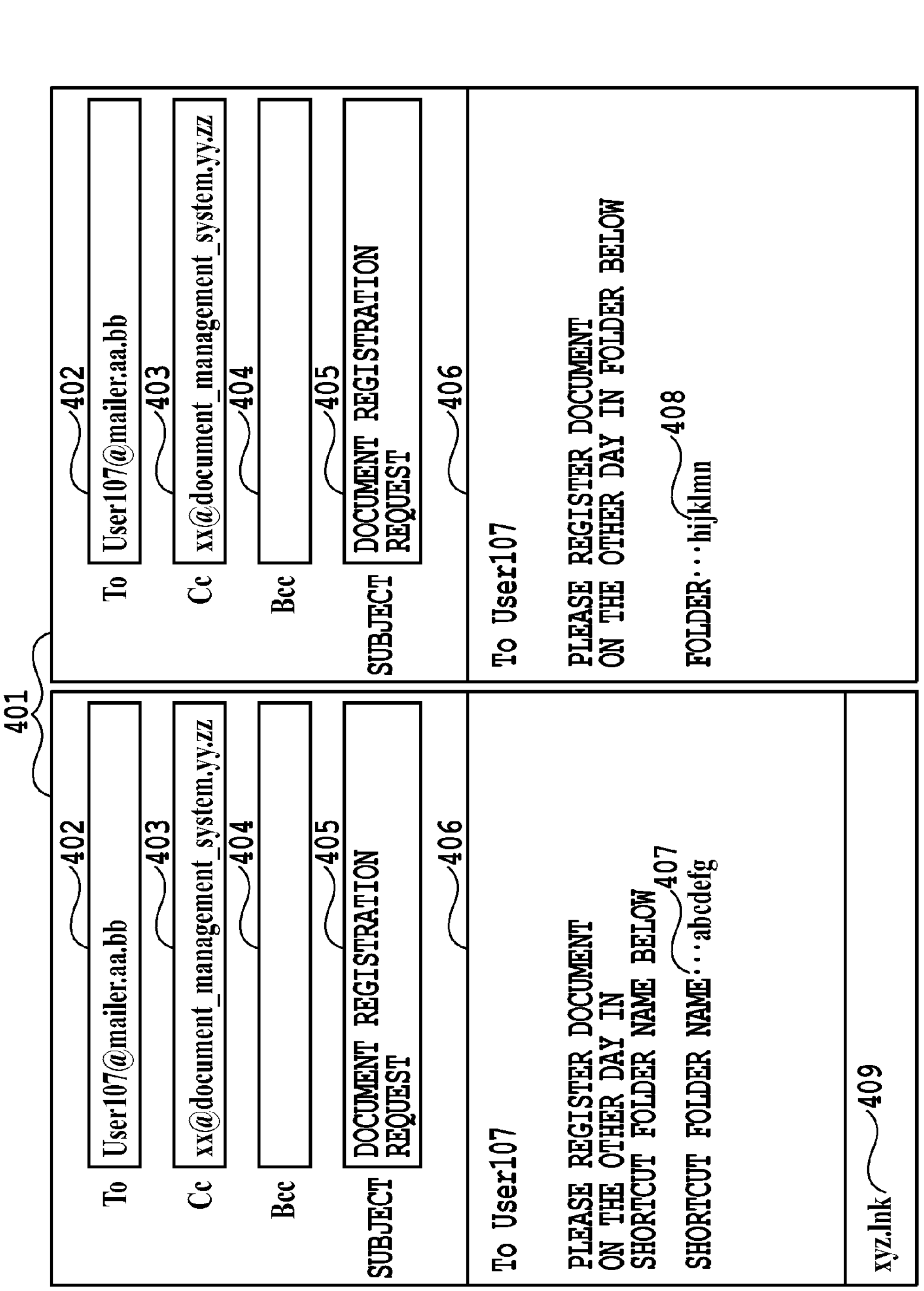
FIG. 4 is a diagram showing the details of transmission e-mail in the first embodiment.

First, FIG. 4 shows the details of electronic mail (document registration request mail) 401 transmitted from the client PC 101 to the application server 103 when the document registration request is performed in the present embodiment.

In the e-mail 401 prepared by the user 106, an e-mail address of the user 107 who performs the document registration is entered into an address entry box 402. Then, a user ID of the user 106 in the document management system 340 is written into a local portion of the e-mail address, and the user 106 enters the e-mail address including a domain of the document management system 340 into an address entry box 403. For example, when the user ID of the user 106 in the document management system is "xx", and the domain of the document management system is "document_management-_system.yy.zz", an e-mail address indicated by a symbol 403 in FIG. 4 is entered. The addresses of the e-mail 401 entered into the address entry boxes 402 and 403 may be exchanged in the above example; no address may be entered into the address entry box 403, and addresses may be entered into the address entry boxes 402 and 404.

When the user 106 uses the e-mail to request the user 107 to perform the document registration, the user 106 may enter the subject into a subject (title) entry box 405. The user 106 also may enter into a text entry box 406 the information on the document registration request to the user 107 and a shortcut name 407 and a folder name 408 indicating a registration destination folder in the document management system 340. Furthermore, a shortcut file is attached as an attachment file 409, and the file may be transmitted to the document management system 340.

[Switching of the Top Page Including the Document Registration Permission Button]

Figure 5:
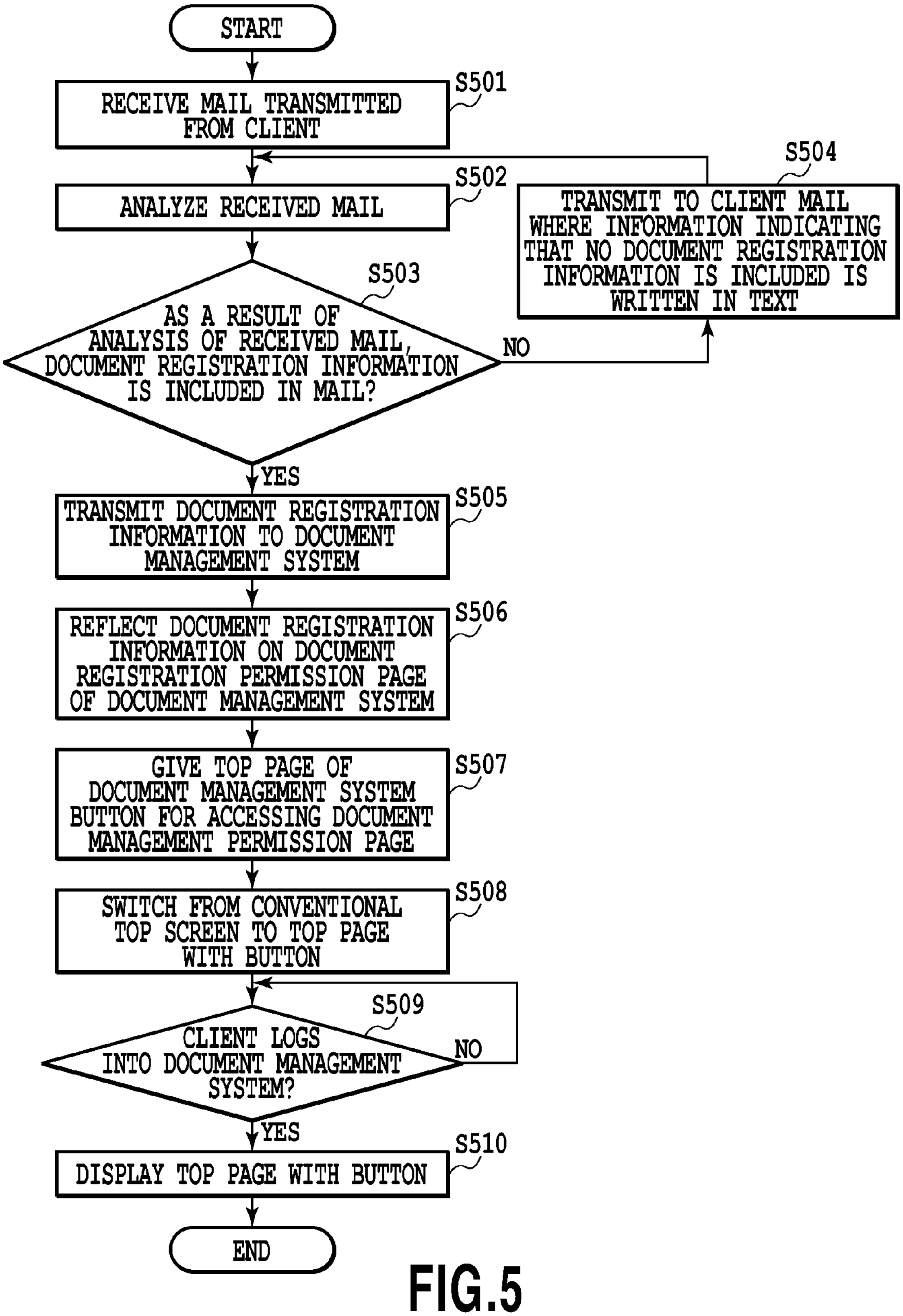
FIG. 5 is a flowchart showing a processing procedure of a top page switching process in the first embodiment.

Next, FIG. 5 shows a flowchart illustrating the processing procedure in which the application server 103 that has received the document registration request mail analyzes the received e-mail and switches to a top page having the document registration permission button added to the existing top page.

The top page switching process will be schematically described. The application server 103 first receives the e-mail transmitted from the client PC 101, and analyzes the e-mail. Then, the application server 103 reads the document registration destination information obtained by analyzing the e-mail, and produces the document registration permission button for accessing the document registration permission page reflecting the read document registration destination information on the top page displayed when the document registration user accesses the document management system 340. The application server 103, when the user 107 logs into the system 340 from the client PC 108, displays the top page including the button on the client PC 108.

The top page switching process will now be described in more detail according to the processing procedure of FIG. 5. At step 501, the mail transmission/reception part 310 of the application server 103 receives the e-mail the user 106 transmitted using the client PC 101. At step 502, the mail analysis part 320 analyses the received e-mail. At step 503, it is determined whether or not the e-mail includes the document registration destination information as a result of the analysis by the e-mail analysis part 320 and whether or not the user of a registration requester can be identified based on the destination address of the e-mail. If the information is determined not to be included, at step 509, the mail transmission/reception part 310 transmits an e-mail in which the fact that no document registration destination information addressed to the e-mail address of the user 106 is present is entered into the text. Then the process returns to step 501.

On the other hand, if the information is determined to be included, the process proceeds to step 505 where the document registration destination information transmission part 330 transmits the document registration destination information to the document registration destination information reception part 341 of the document management system 340. At step 506, the document registration destination information received at step 504 by the document registration destination information reception part 341 is reflected on the document registration permission page. At step 507, the document registration destination information reception part 341 updates the top page by giving the button for accessing the document registration permission page to the top page displayed when the user 107 of the system 340 logs in. At step 508, the top page switching part 343 switches from the top page to which no access button to the document registration permission page of the document management system 340 is given to the top page to which the access button to the document registration permission page is given.

At step 509, it is repeatedly determined whether or not the user 107 uses the client PC 108 and the like to log into the document management system 340 until the user 107 is determined to login. If the user 107 is determined to login, the updated top page with the button is displayed at step 510.

Figure 6:
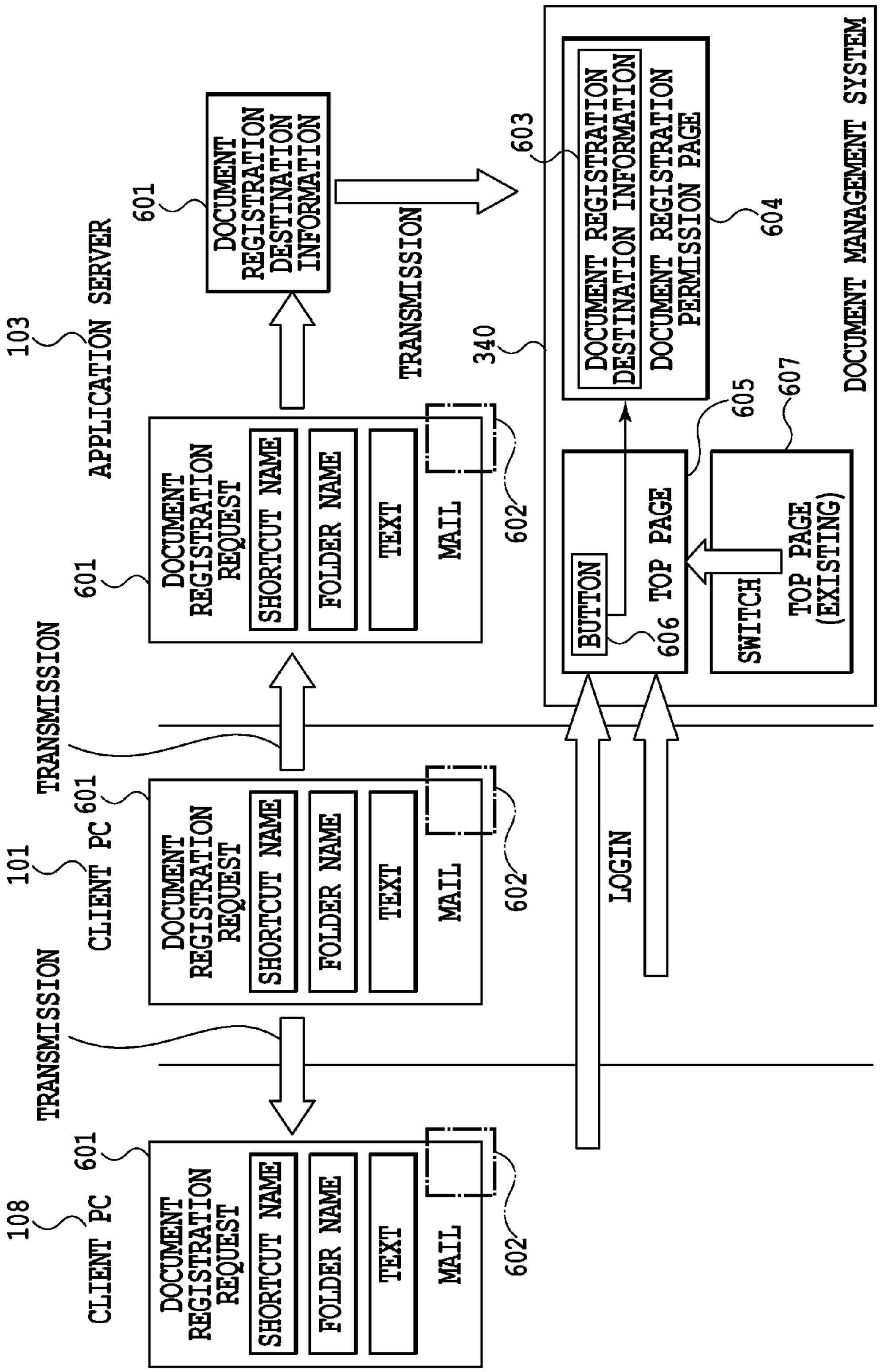
FIG. 6 is a diagram conceptually showing processing in the flowchart of FIG. 5.

FIG. 6 is a diagram conceptually showing the top page switching process like FIG. 5.

The client PC 101 either enters the shortcut name/the folder name of the registration destination into the text of e-mail 601 or attaches them as an attachment file 602, and transmits the e-mail 601 to the application server 103. Here, the information on the document registration request is entered in the text of the e-mail 601, and the e-mail 601 is also transmitted to the user 107. The application server 103 analyzes the e-mail 601 transmitted from the client PC 101, extracts the document registration destination information 603 and transmits the document registration destination information 603 to the document management system 340.

The document management system 340 reflects the received document registration destination information 603 on the document registration permission page 604. Moreover, the document management system 340 produces the button 606 for accessing the document registration permission page 604 on the top page 605 displayed when the document registration user 107 logs in. Then, when the user 107 logs in from the client PC 108, the document management system 340 switches the existing top page 607 (to which the access button to the document registration permission page is not given) to the top page 605 including the button 606 (notification information), and displays the top page 605.

[Document Registration Destination Information Extraction Through Mail Analysis]

Figure 7:
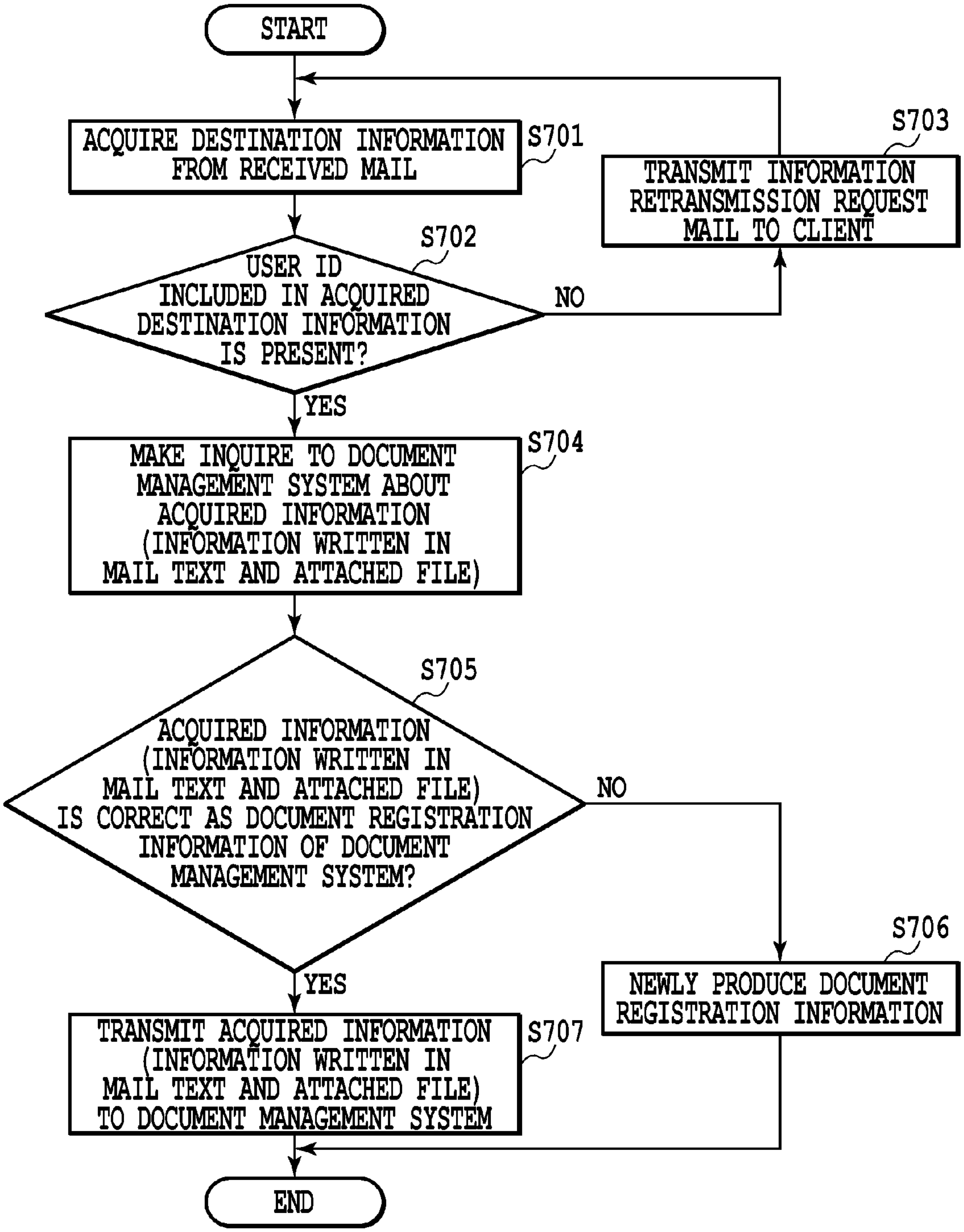
FIG. 7 is a flowchart showing a processing procedure of a document registration destination information extraction process in the first embodiment.

FIG. 7 is a flowchart showing the details of the processing at steps 502 to 505 of FIG. 5.

In the processing shown in FIG. 7, the application server 103 determines whether or not the information included in the received e-mail 601 is correct as the document registration destination information of the document management system 340. And then, if the information is correct, the application server 103 transmits it to the document management system 340. If the received e-mail does not include the information or if the information included in the e-mail 601 is not correct as the document registration destination information of the document management system 340, the application server 103 transmits an e-mail for retransmission request to the client PC 101.

Specifically, at step 701, the application server 103 acquires destination address information, information written in the text, and the attached file from the e-mail received at step 502 shown in FIG. 5. At step 702, the application server 103 makes an inquiry to the document management system 340 about whether or not the user ID for the document management system 340 associated with the acquired destination address information 402 of the e-mail is present and whether or not the user ID for the request user 106 indicated by the destination address information 403 is present. If, at step 702, the user ID for the document management system 340 is determined not to be present, then at step 703, the application server 103 transmits the retransmission request mail to the client PC 108.

On the other hand, if, at step 702, the user ID for the document management system 340 is determined to be present, then at step 704, the application server 103 makes an inquiry to the document management system 340 about the information (or the attached file) written in the text of the e-mail and acquires it. If, at step 705, the information is determined not to be the document registration destination information of the document management system 340, then at step 706, the document registration destination information (folder for the registration destination) is newly produced. On the other hand, if, at step 705, the information is determined to be the document registration destination information of the system 340, then at step 707, the acquired information is transmitted to the document management system 340.

Figure 8:
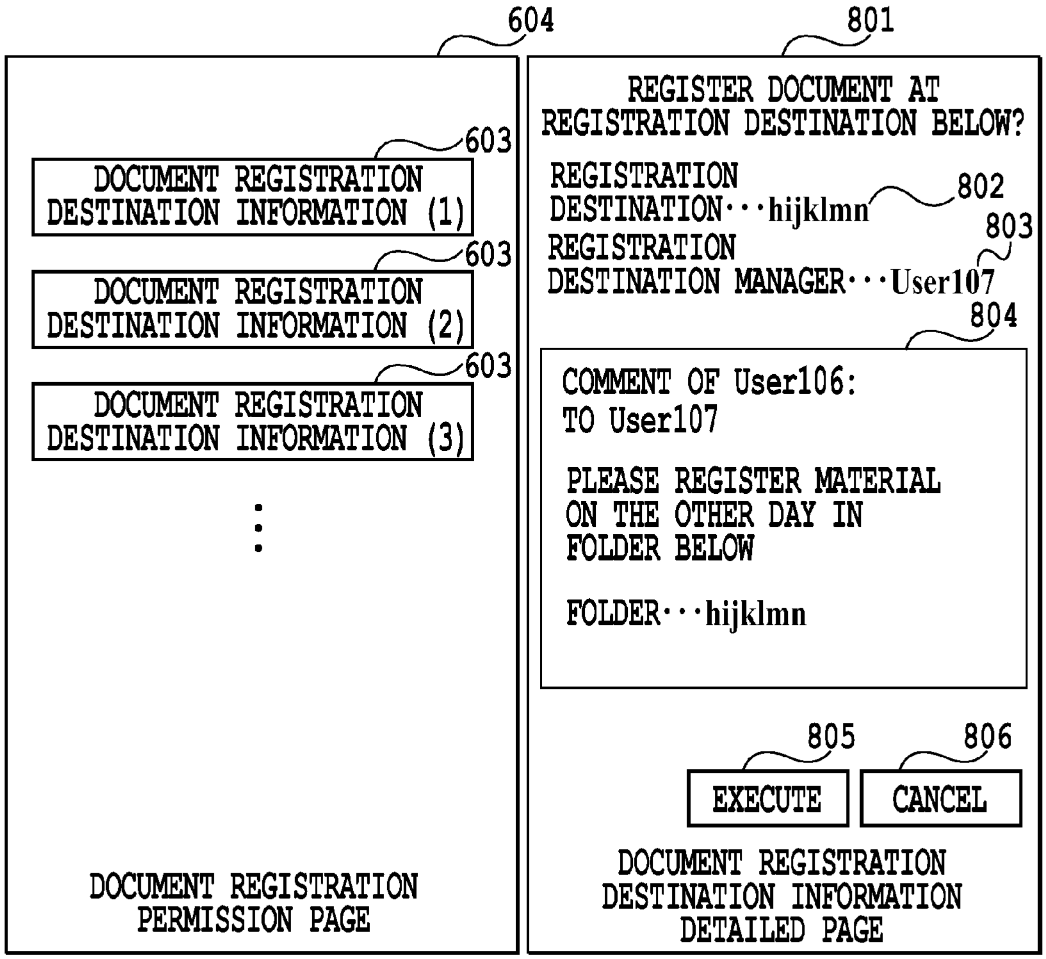
FIG. 8 is a diagram showing the details of a document registration permission page and document registration destination information in FIG. 6.

FIG. 8 shows the details of the document registration destination information 603 and the document registration permission page 604 shown in FIG. 6.

The application server 103 receives the e-mail 601 from the client PC 101. If the information acquired from the e-mail 601 is the document registration destination information of the document management system 340, the application server 103 transmits the above-mentioned information to the document management system 340. The document management system 340 displays, as the document registration destination information 603, the received information on the document registration permission page 604. When a plurality of document registration requests is present, the document management system 340 displays a plurality of pieces of document registration destination information 603 on the document registration permission page 604. When the user 107 logs into the document management system 390 and clicks the button 606 on the displayed top page 605, the document management system 340 displays the document registration permission page 604 on which the document registration destination information 603 associated with the user ID of the user 107 held in the document management system 340 is displayed as a list. Here, when another user holding a user ID that is not associated with the document registration destination information 603 logs into the document management system 340 and the top page 605 is displayed, the document management system 340 performs control such that the button 606 is not displayed.

When the user 107 selects any of pieces of document registration destination information 603, the document management system 340 displays the document registration destination information detailed page 801 corresponding to the selected piece of document registration destination information (document registration request). The document management system 340 displays information including the document registration destination information 603 acquired from the e-mail 601, the registration destination 802 and the manager 803 of the registration destination on the document registration destination information detailed page 801. Furthermore, the document management system 340 extracts the user ID of the request user 106 from the e-mail address containing the domain of the document management system 340 that is the destination of the received e-mail 601. Then, the document management system 340 displays on a comment box 804 the extracted user ID and a sentence 406 written in the text of the received e-mail 601. In this way, it is possible to explicitly indicate from which user to which user the document registration is requested. When the user 107 clicks a start button 805, the document management system 340 starts to perform the processing necessary for document registration. When the user 107 clicks a cancel button 806, the document management system 340 displays the document registration permission page 604. The user 107 clicks the start button 805 on the document registration destination information detailed page 801, and thus the desired document is transmitted to the document management system 340. Then, the document management system 340 starts to receive the transmitted document, and, when the reception is completed, the document management system 340 controls the display such that the document registration destination information 603 selected by the user 107 is deleted.

[Access Right Setting in Document Registration Process]

Figure 9:
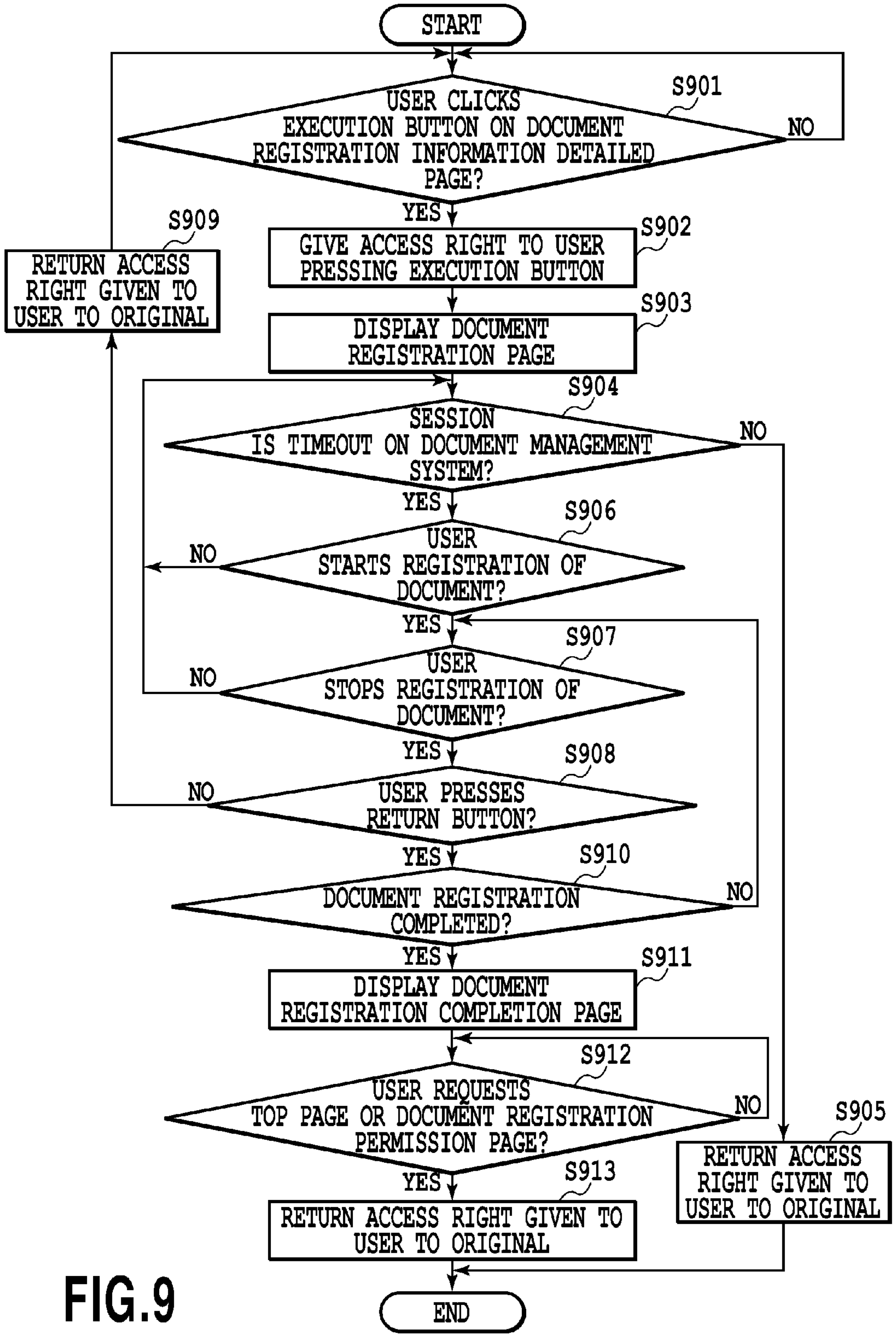
FIG. 9 is a flowchart showing a processing procedure of setting an access right in a document registration process in the first embodiment.
Figure 10:
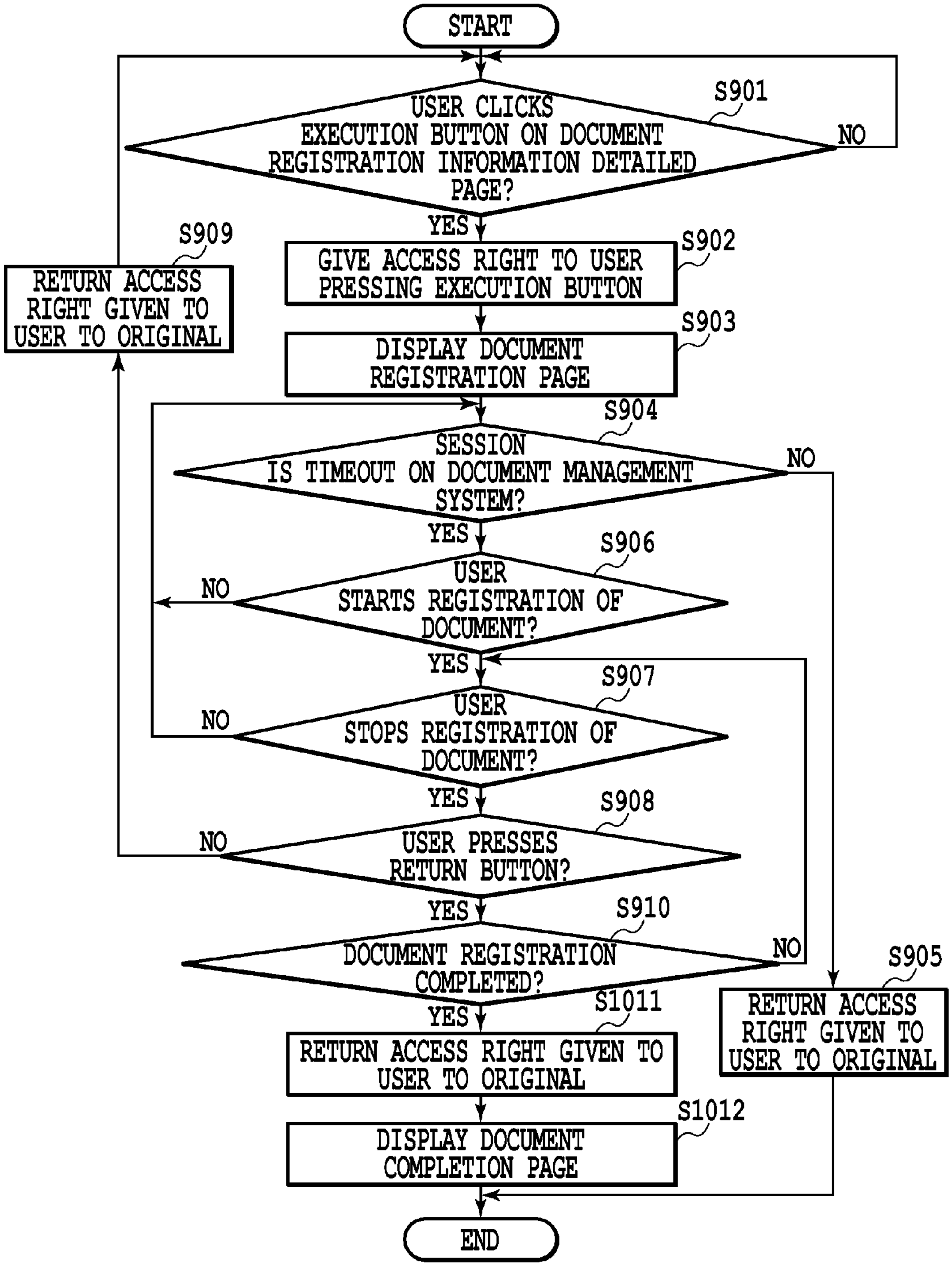
FIG. 10 is a flowchart of a variation of an access right setting process of FIG. 9.
Figure 11:
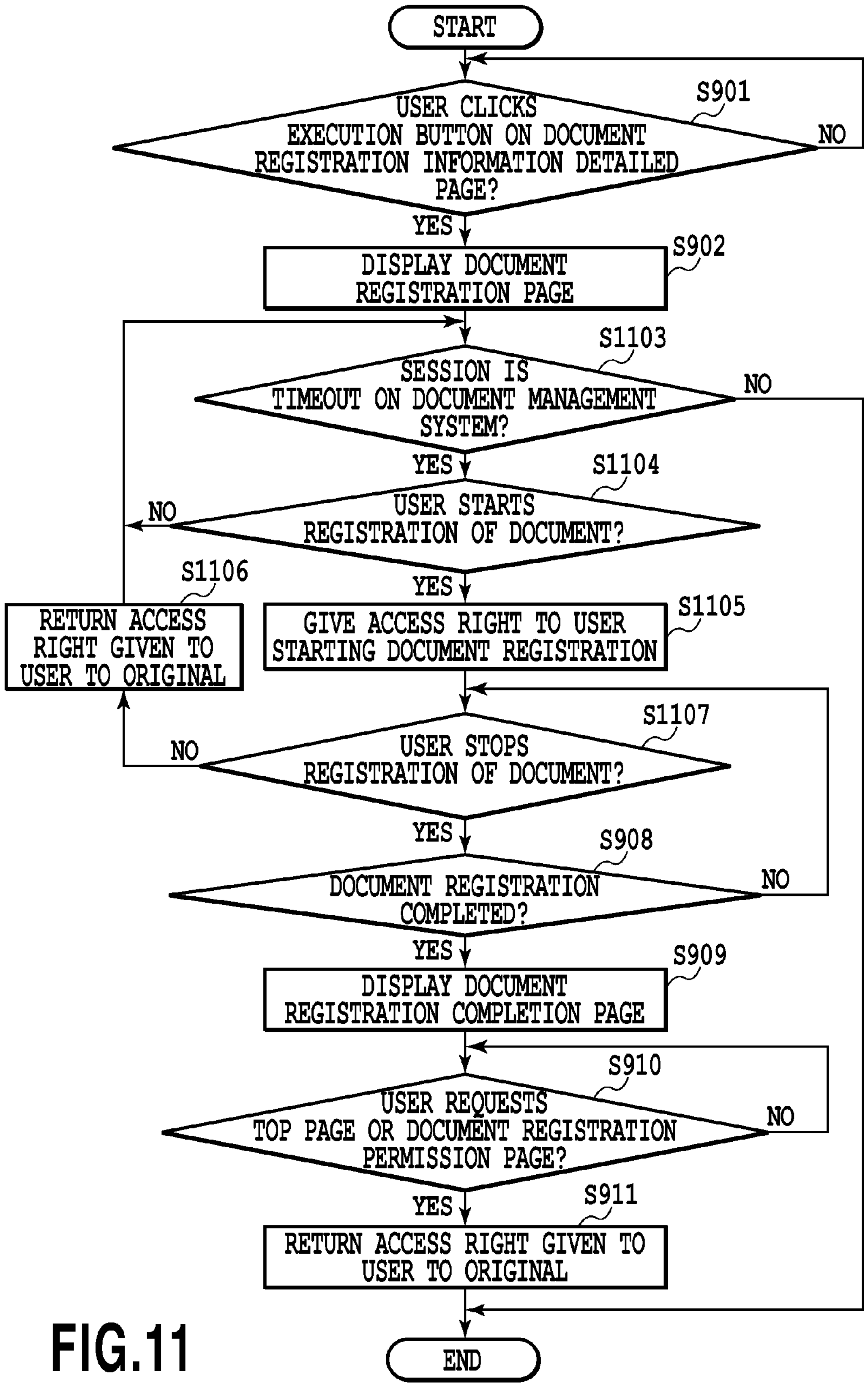
FIG. 11 is a flowchart of another variation of the access right setting process of FIG. 9.
Figure 12:
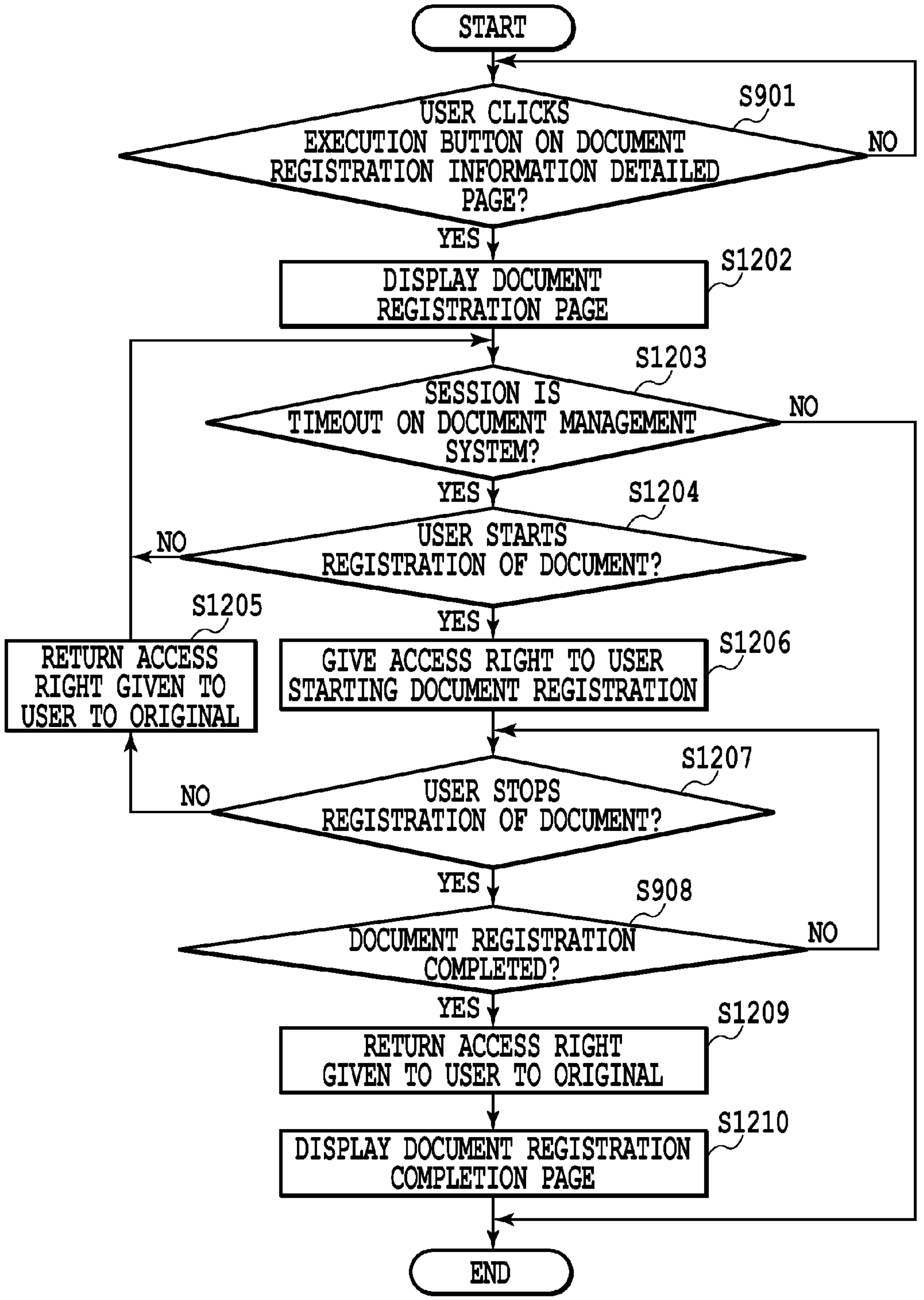
FIG. 12 is a flowchart of yet another variation of the access right setting process of FIG. 9.

In the present embodiment, when the document registration user has no access right to the registration destination on which the document registration user performs the document registration, it is disadvantageously impossible to perform the document registration. Here, processing for setting the access right to the registration destination for the document registration user is shown in the flowchart of FIG. 9, and variations thereof are shown in the flowcharts of FIGS. 10 to 12. This processing is processing in which the document management system 340 temporarily gives the access right to the user 107 who has clicked the start button 805 as shown in FIG. 8 and, after the document registration of the user 106 is completed, the temporarily given access right is returned to the original setting.

This processing will be described in detail. At step 901, the document management system 340 determines whether or not the start button 805 on the document registration destination information detailed page 801 shown in FIG. 8 has been clicked by the user 107. If the start button 805 is determined to have been clicked by the user 107, then at step 902, the document management system 340 temporarily gives to the user 107 the access right to the document registration destination. Then, at step 903, the document management system 340 displays the document registration page. At step 904, the document management system 340 determines whether or not a session is timed out. If the session is timed out, then at step 905, the document management system 340 returns the access right given to the user 107 to the original setting, and then the processing is completed. On the other hand, if, at step 904, the document management system 340 determines that the session is not timed out, the process proceeds to step 906 where the document management system 340 determines whether or not the user 107 has started the document registration. If, at step 906, the document management system 340 determines that the user 107 has not started the document registration, the process returns to the time-out determination process at step 904.

On the other hand, if, at step 906, the document management system 340 determines that the user 107 has started the document registration, the process proceeds to step 907 where the document management system 340 determines whether or not the user 107 has stopped the document registration during the document registration. If, at step 907, the document management system 340 determines that the user 107 has stopped the document registration during the document registration, the process returns to the time-out determination process at step 904. On the other hand, if the document management system 340 determines that the user 107 has not stopped the document registration during the document registration, the process proceeds to step 908 where the document management system 340 determines whether the user has transitioned to the document registration destination information detailed page 801. If, at step 908, the document management system 340 determines that the user 107 pressed down a return button 1306 and has transitioned to the document registration destination information detailed page 801, the process proceeds to step 909 where the document management system 340 returns the setting of the access right given to the user 107 to the original setting and displays the document registration destination information detailed page 801.

On the other hand, if the document management system 340 determines that the user has not transitioned to the document registration destination information detailed page 801, the process proceeds to step 910 where the document management system 340 determines whether or not the document registration is completed. If, at step 910, the document management system 340 determines that the document registration is not completed, the process returns to the document registration stop determination process of step 907. On the other hand, if the document management system 340 determines that the document registration is completed, the process proceeds to step 911 where a document registration completion page 1307 (see FIG. 13) is displayed. Then, at step 912, the document management system 340 determines whether or not the user 107 has requested the top page of the document management system 340 or the document registration permission page 604. If, at step 912, the document management system 340 determines that the user 107 has requested the top page of the document management system 340 or the document registration permission page 604, the process proceeds to step 913 where the document management system 340 returns the setting of the access right given to the user to the original setting and the processing is completed.

Contents of processing shown in FIGS. 10 to 12 that are various variations of the access right setting processing differ from those at the time point of giving the access right to the user 107 and at the time point of returning the access right given to the user to the original setting in the case of FIG. 9, respectively. In FIGS. 10 to 12, the same numbers as the step numbers in FIG. 9 are given to the steps in the same processing flow as in the case of FIG. 9.

In the flowchart shown in FIG. 10, a flow (steps 1011 and 1012) where the access right given to the user 107 is returned to the original setting after the user 107 completes the document registration is different from the process of FIG. 9. In the flowchart shown in FIG. 11, a flow (steps 1103 to 1107) where the access right is given to the user 107 when the user 107 starts the document registration is different. In the flowchart shown in FIG. 12, a flow (steps 1202 to 1207) where the access right is given to the user 107 when the user starts the document registration and the flow where the given access right is returned to the original setting after the user 107 completes the document registration are different. Steps 1209 and 1210 are the flow where the given access right is returned to the original setting.

In the processing shown in FIGS. 9 to 12, after the user 107 completes the document registration, the access right given to the user 107 is returned to the original setting. This processing allows the document registration requester and the manager of the entire system to grasp the progress of the document registration of the user 107 and can eliminate the inconvenience of returning the setting of the access right to the original setting after the completion of the document registration.

Figure 13:
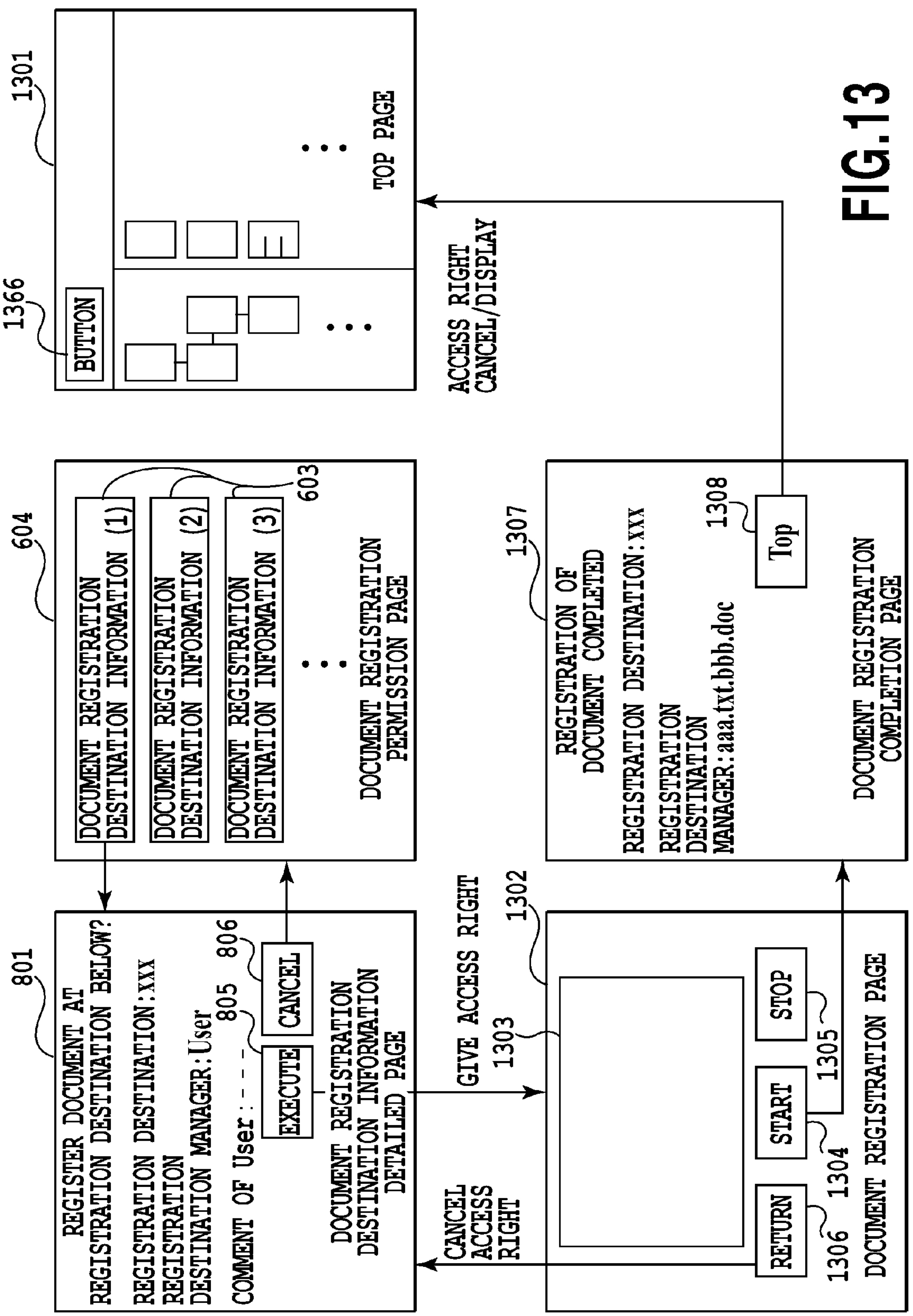
FIG. 13 is a diagram illustrating a page displayed by the document management system of the first embodiment.

Now, the details and the transition of pages displayed by the document management system 340 of the present embodiment are shown in FIG. 13.

The document management system 340 displays, as the top page 1301, folders and documents the user 107 can access. Then, when the user 107 clicks a button 1366 on the top page 1301 and thereby requests the document registration permission page, the document management system 340 displays the document registration permission page 604. Then, when the user 107 selects the document registration destination information 603 on the document registration permission page 604, the document management system 340 displays the document registration destination information detailed page 801. It is possible to go to the top page 1301 from the document registration permission page 604. Furthermore, when the user 107 clicks the start button 805 on the document registration destination information detailed page 801, the document management system 390 displays the document registration page 1302 to give the access right to the user 107. When the user 107 clicks the cancel button 806 on the document registration destination information detailed page 801, the document management system 340 displays the document registration permission page 604 and cancels the access right given to the user to return to the original setting.

Moreover, when the user 107 drags and drops the document to be registered in a document registration box 1303 on the document registration page 1302 or enters a pass for the document and clicks a registration start button 1309, the document management system 340 starts the document registration. When the document management system 390 completes the reception of the document that the user 107 has requested for registration, the document management system 390 displays the document registration completion page 1307. On the other hand, when the user clicks a registration stop button 1305, the document management system 340 stops the document registration. Further, when the user 107 clicks the return button 1306, the document management system 340 displays the document registration destination information detailed page 801 to cancel the access right given to the user 107. Then, when the user 107 clicks the top button 1308 on the document registration completion page 1307, the document management system 340 displays the top page 1301 to cancel the access right given to the user 107.

Figure 14:
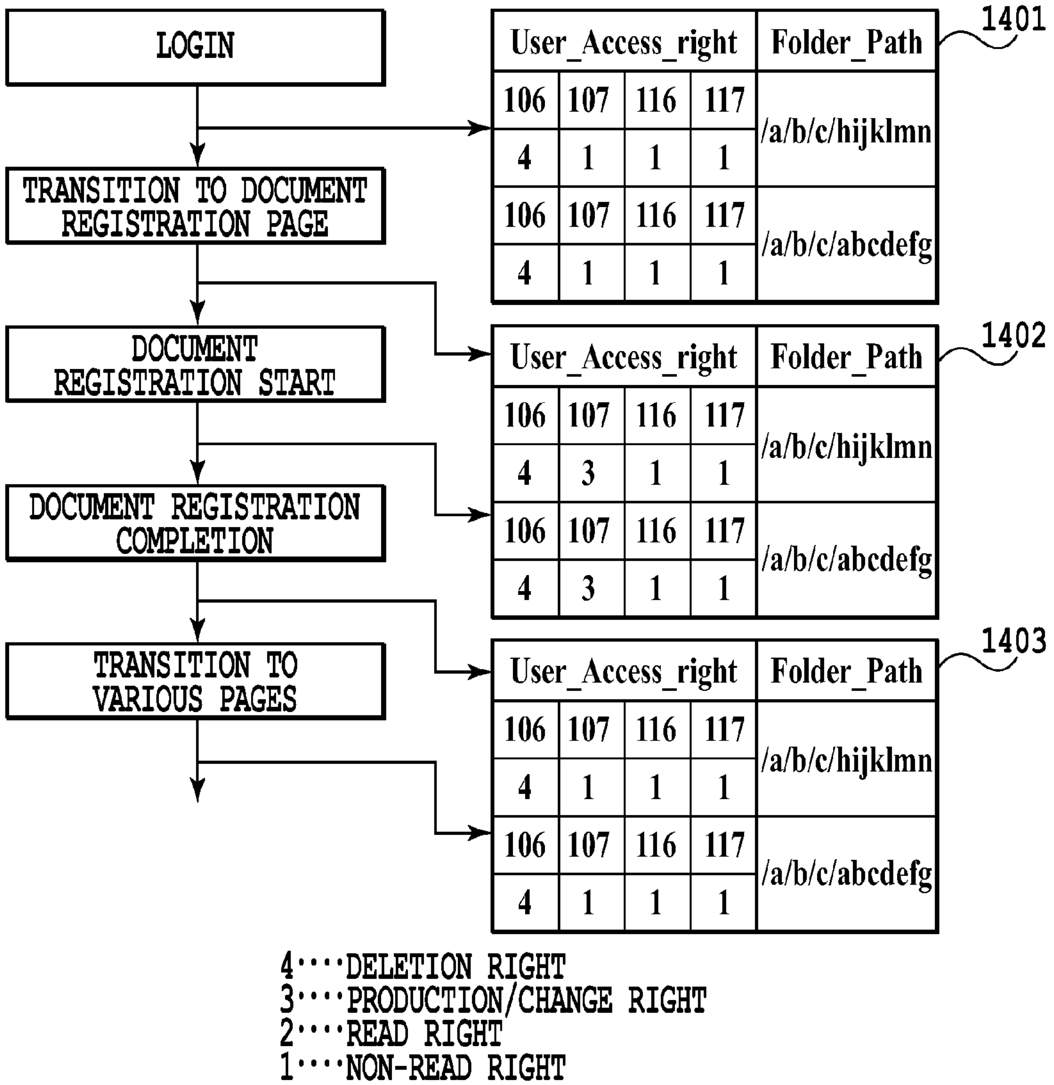
FIG. 14 is a diagram showing access right information stored in a DB server in the first embodiment.

FIG. 14 is a diagram showing access right information that is stored in the access right setting information storage part 305 in the database server 105 according to the operation by the user 106 or 107, in the document management system 340 of the present embodiment.

In the access right setting information storage part 305, the access right information 1401 to 1403 on the folder and the document registration destination of each user belonging to a region of the document management system 340 is stored. The access right information 1401 to 1403 shows that the user 106 can perform operation for readout, registration, change or deletion of the document for the document registration destination specified by "hijklmn" or "abdcdefg". It also shows that the users 107, 116 and 117 cannot perform operation of reading out, for the above-mentioned document registration destination, the document or a document registration destination in the same hierarchical level or a lower hierarchical level (because, in the access right information 1401 and 1403, a non-read right is set by the use of, for example, "1" for those users).

The access right information 1402 shows that the user 106 can perform operation for readout, registration, change or deletion of the document for the document registration destination specified by "hijklmn" or "abdcdefg". It also shows that the user 107 can perform operation for readout, registration, change or deletion of the document for the document registration destination specified by "hijklmn" or "abdcdefg". The access right information 1402 shows that the users 116 and 117 cannot perform operation of reading out the document or the document registration destination in the same hierarchical level or the lower hierarchical level for the above-mentioned document registration destination.

For example, while the user 107 logs into the document management system 340, does not transition to the document registration page 1302 and performs another operation, the document management system 340 sets preset access right setting information 1401. When the transition to the document registration page 1302 is made or the document registration is started from the document registration page 1302 by the operation of the user 107, the document management system 340 provides an instruction to the database server 105. The database server 105, when receiving the instruction, sets the access right information 1401 stored in the access right setting information storage part 305 as with the access right information 1402, and thereby changes the access right of the user 107. The document management system 340, when determining that the user 107 has completed the document registration or transitioned to various pages, provides an instruction to the database server 105. Then, the database server 105 sets the access right information 1402 stored in the access right setting information storage part 305 as with the access right information 1403, and returns the setting of the access right of the user 107 to the original setting.

Second Embodiment

The second embodiment of the present invention will be described based on FIGS. 15 to 17. In the present embodiment, the user 106 provides a document registration demand request to the document management system 340. Here, through the UI (User Interface) via the Web supplied by the document management system 340, the user 106 enters a e-mail address of the user to whom the request for the document registration is provided and a request for the document registration destination information and the document registration into the text or comment of the e-mail, and transmits the e-mail from the document management system 340. The document management system 340 transmits the e-mail to the e-mail address of the user to whom the request is provided, and reads the document registration destination information entered as the text or comment. Furthermore, the document management system 340 produces, on the top page 1301, the button 1366 for allowing access to the document registration permission page 604 reflecting the read document registration destination information. The system configuration and the hardware configuration of the present embodiment may be the same as those of the first embodiment.

[Software Configuration]

Figure 15:
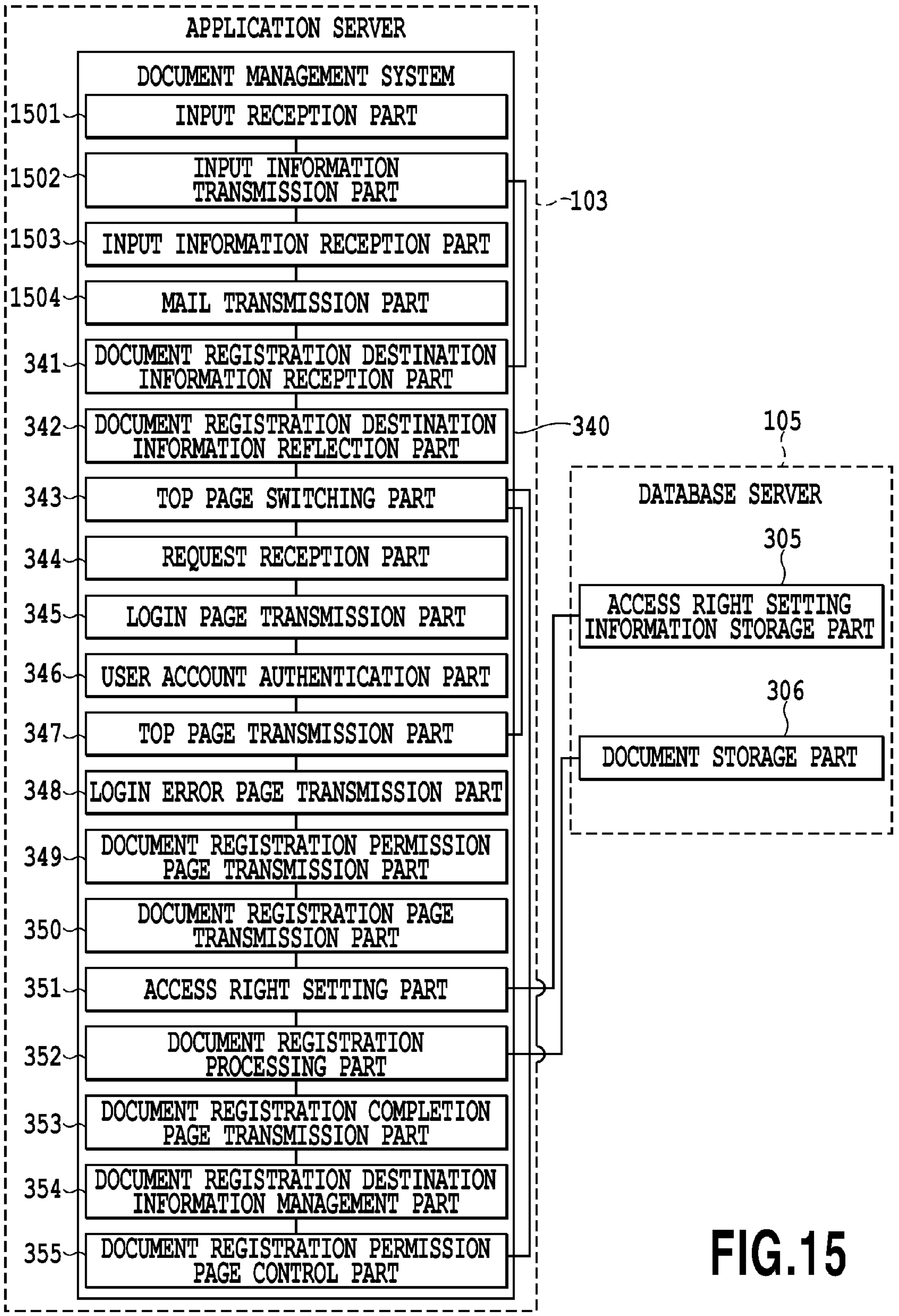
FIG. 15 is a diagram showing a software configuration of a document management system according to a second embodiment of the present invention.

The software configuration of the present embodiment is shown in FIG. 15. This software configuration differs from that shown in FIG. 3 in that the document management system 340 includes an input reception part 1501, an input information transmission part 1502, an input information reception part 1503 and a mail transmission part 1504. The description of the same configuration as that of the first embodiment will not be repeated.

In the input reception part 1501, the e-mail address of the user 107 is entered and the information indicating the request for the document registration destination information and the document registration is entered into the text or the comment by the user 106. When the user 106 transmits the document registration destination information as an attached file, the input reception part 1501 registers the attached file. The input information transmission part 1502 transmits the information entered by the user 106 into the input reception part 1501 to the input information reception part 1503. The input information reception part 1503 reads the received input information, communicates with a document registration destination information reception part 1541 and transmits the read input information or the document registration destination information. The mail transmission part 1504 transmits the e-mail to the e-mail address entered by the user 106 in the input reception part 1501. The document registration destination information reception part 1541 transmits the received document registration destination information to a document registration destination information reflection part 1542, and the document registration destination information reflection part 1542 reflects the received document registration destination information on the document registration permission page 604.

[Document Registration Request Using WebUI]

Figure 16:
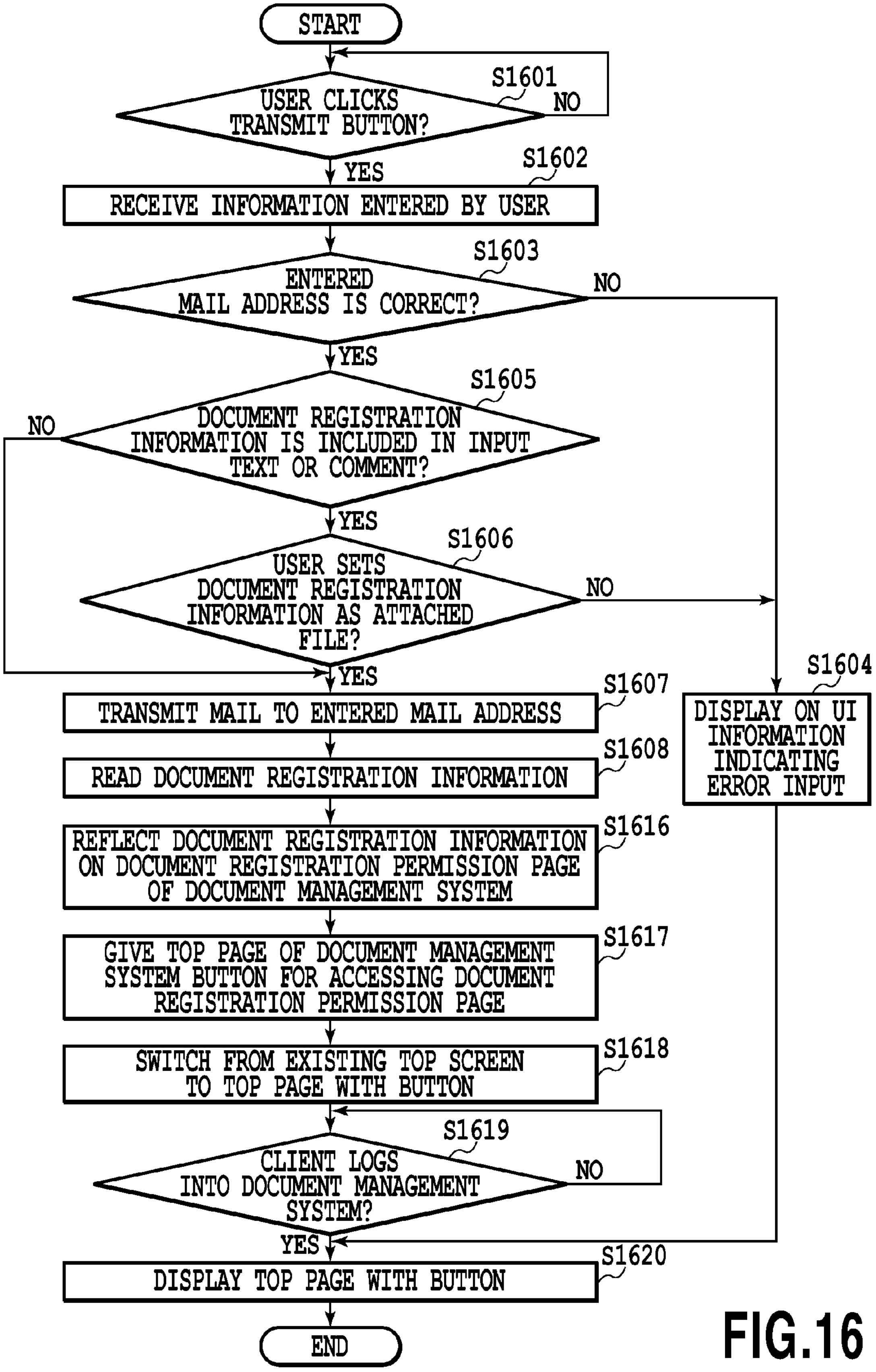
FIG. 16 is a flowchart showing a processing procedure of a document registration request process in the second embodiment.

FIG. 16 is a flowchart of document registration request process using WebUI.

A summary of the document registration request process will be described. The user 106 enters the e-mail address of the user 107 and the request for the document registration destination information and the document registration into the text or the comment on the UI of the Web supplied by the document management system 340. Then, when the user 106 clicks a transmission button displayed as the UI of the document management system 340, the document management system 340 transmits the e-mail to the entered e-mail address. The document management system 340 reads the document registration destination information and the text or the comment, and reflects the read document registration destination information on the document registration permission page 604. Then, the document management system 340 produces the button 1366 for accessing the document registration permission page 604 on the top page 1301 displayed when the user 107 logs in.

The document registration request process will be described in detail below. At step 1601, the user 106 enters the e-mail address and the request for the document registration destination information and the document registration into the text or the comment through the UI of the document management system 340, and whether or not the transmission button is clicked is determined. If the document management system 340 determines that the transmission button is clicked, the process proceeds to step 1602 where the information entered by the user 106 is received. At step 1603, the document management system 340 determines whether or not the received e-mail address is correct. If the document management system 340 determines that the e-mail address is not correct, the process proceeds to step 1604 where the document management system 340 displays information indicating an input error on the UI, and this processing is completed. On the other hand, if, at step 1603, the document management system 340 determines that the entered e-mail address is correct, the process proceeds to step 1605 where the document management system 340 determines whether or not the document registration destination information is included in the entered text or comment.

If the document registration destination information is determined to be included, the process proceeds to step 1607, which will be described later. On the other hand, if the document registration destination information is determined not to be included, the process proceeds to step 1606 where the document management system 340 determines whether or not the user 106 has set the document registration destination information as the attached file. If the user 106 is determined not to have set the document registration destination information as the attached file, the above-described processing at step 1604 and the subsequent steps are performed. On the other hand, if, at step 1606, the user 106 is determined to have set the document registration destination information as the attached file, the process proceeds to step 1607 where the document management system 340 transmits the e-mail to the entered e-mail address. Then, the process proceeds to step 1608, where the document management system 340 reads the document registration destination information transmitted from the user 106, and reflects the read document registration destination information on the document registration permission page 604 at step 1616. The processing subsequent to step 1616 is the same as that subsequent to step 506 in FIG. 5.

Figure 17:
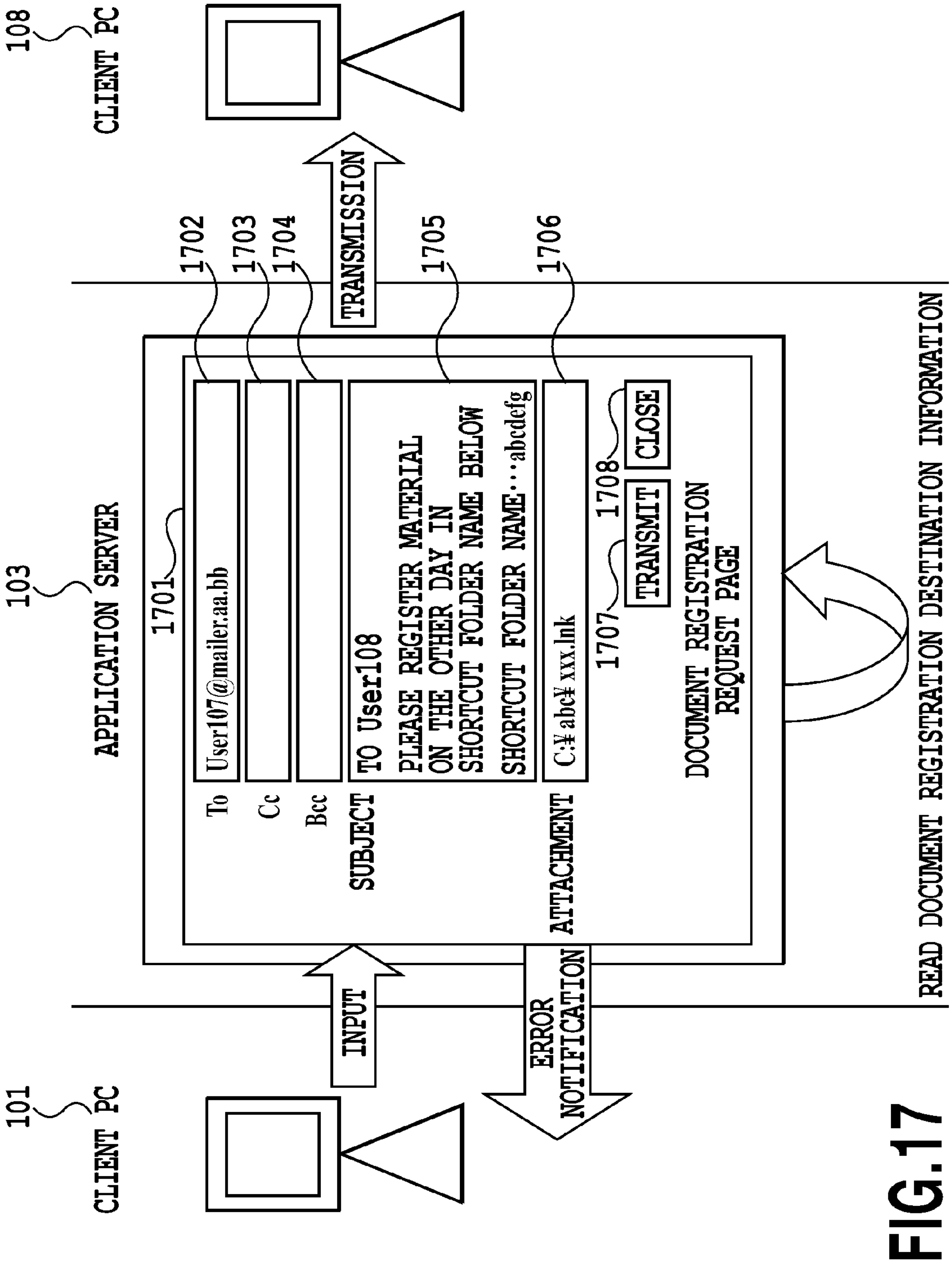
FIG. 17 is a diagram conceptually showing processing in the flowchart of FIG. 16.

FIG. 17 is a diagram conceptually showing the processing in the flowchart of FIG. 16.

First, on a document registration request page 1701 supplied by the document management system 340, the user 106 enters various types of information through the client PC 101. On the document registration request page 1701, the user 106 enters the e-mail address into e-mail address entry boxes 1702, 1703 and 1704. It is mandatory to enter the e-mail address into the mail address entry box 1702. A plurality of e-mail addresses can be entered into each of the mail address entry boxes 1702, 1703 and 1704. The user 106 enters the request for the document registration destination information and the document registration into the mail address entry box 1705. The user 106 can attach a file to an e-mail address attachment box 1706 as the document registration destination information. In response to the clicking of a transmission button 1707 on the document registration request page 1701 by the user 106, the document management system 340 transmits the e-mail to the e-mail addresses entered into the mail address entry boxes 1702, 1703 and 1704. If the document management system 340 determines that the e-mail addresses entered by the user 106 into the mail address entry boxes 1702, 1703 and 1704 are wrong, the document management system 340 provides a notification of an error to the client PC 101. After the transmission of the e-mail, the document management system 340 reads the document registration destination information that is entered or attached as a file by the user 106.

Third Embodiment

Figure 18:
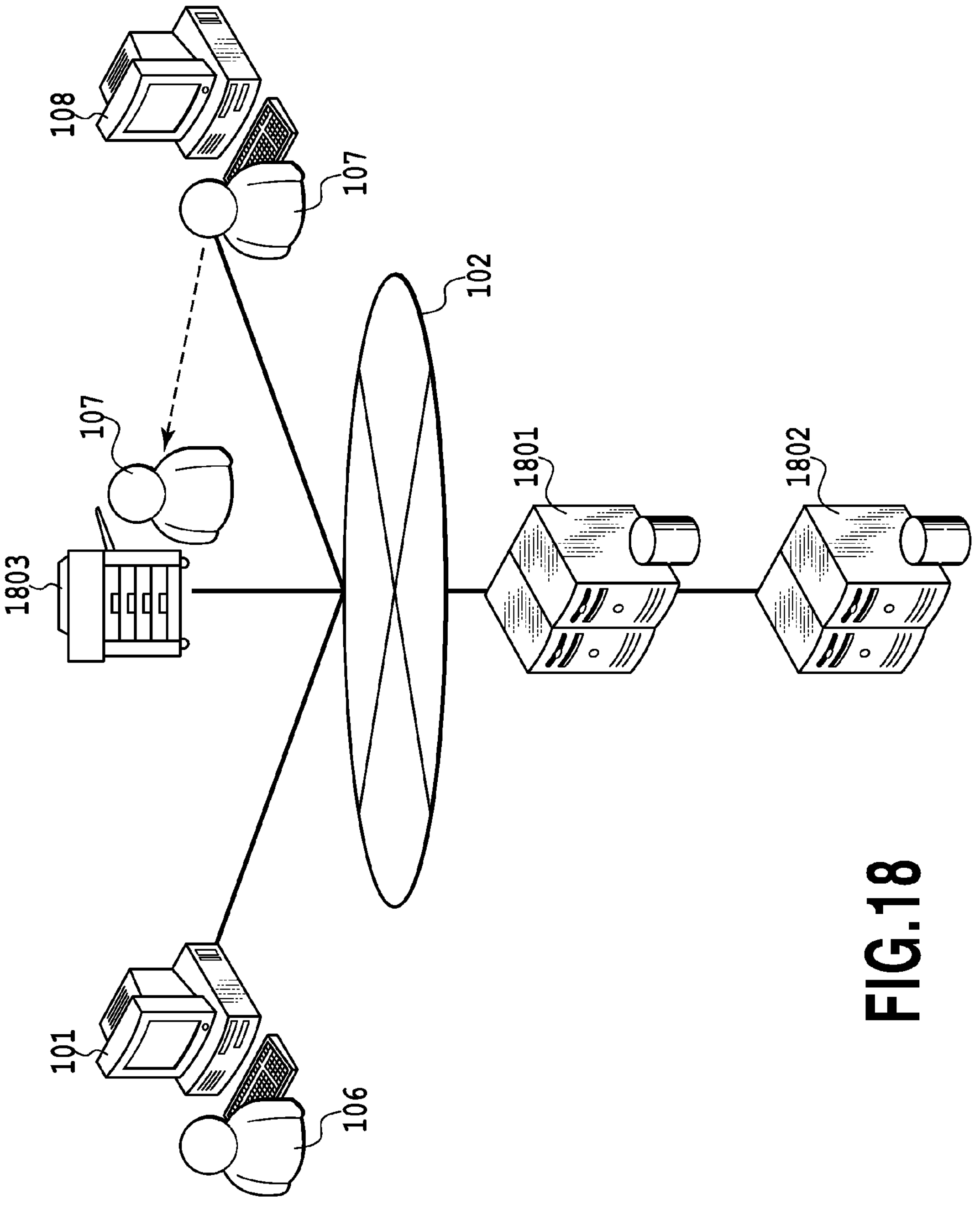
FIG. 18 is a system configuration diagram of a third embodiment of the document management system according to the present invention.

A third embodiment of the present invention will be described based on FIGS. 18 to 24C. FIG. 18 shows a configuration based on the present embodiment; FIGS. 19A to 24C show a unit embodying the present invention.

[System Configuration]

FIG. 18 is a diagram showing the system configuration of the third embodiment of the document management system according to the present invention.

The client PC 101 operated by the user 106 who requests the document registration in a personal folder is connected through the network 102 to an application server 1801 and a database server 1802. The user 106 accesses the document management system within the application server 1801 from the client PC 101, and then logs into the document management system. Then, when the information specified by the user 106 as the document registration request is transmitted to the application server 1801, the application server 1801 reads the information. The information read by the application server 1801 here is information included in the document registration request set by the user 106 and user account information on the document management system for the user 106 transmitting the document registration request.

The application server 1801 extracts, from the received document registration request, document registration button information for producing a document registration button on a menu of a multi-function peripheral 1803, and sets it as newly produced document registration button information. Then, the application server 1801 uses SMTP to transmit the e-mail to the e-mail address specified by the information included in the document registration request, and thereby notifies the user 107 of the occurrence of the document registration request. The user 107 who has received the e-mail notification accesses the application server 1801 from the multi-function peripheral 1803, and logs into the document management system. When the user 107 logs into the document management system, the application server 1801 calls the document registration button information that has been set, and transmits a document registration button production request to the multi-function peripheral 1803. The multi-function peripheral 1803 that has received the document registration button production request produces the document registration button on the menu utilized by the user 107.

When the user 107 starts the document registration using the produced document registration button, the document scanned by the user 107 using the multi-function peripheral 1803 is transmitted to the application server 1801. The application server 1801, when receiving the document transmitted from the user 107, stores the document in the database server 1802. When the document registration is completed, the application server 1801 transmits, to the multi-function peripheral 1803, a request for deleting the document registration button produced on the menu utilized by the user 107. The multi-function peripheral 1803 that has received the request deletes the document registration button on the menu.

In the present embodiment, the client PCs 101 and 108 and the multi-function peripheral 1803 may be present in multiple numbers on the network. The document management system may be a special application for manipulating the document or may be a Web application that operates on the Web browser.

[Hardware Configuration]

The hardware configurations of the present embodiment and fourth to sixth embodiments may be the same as that of the first embodiment; the description thereof will not be repeated.

[Software Configuration]

Figures 19, 19A:
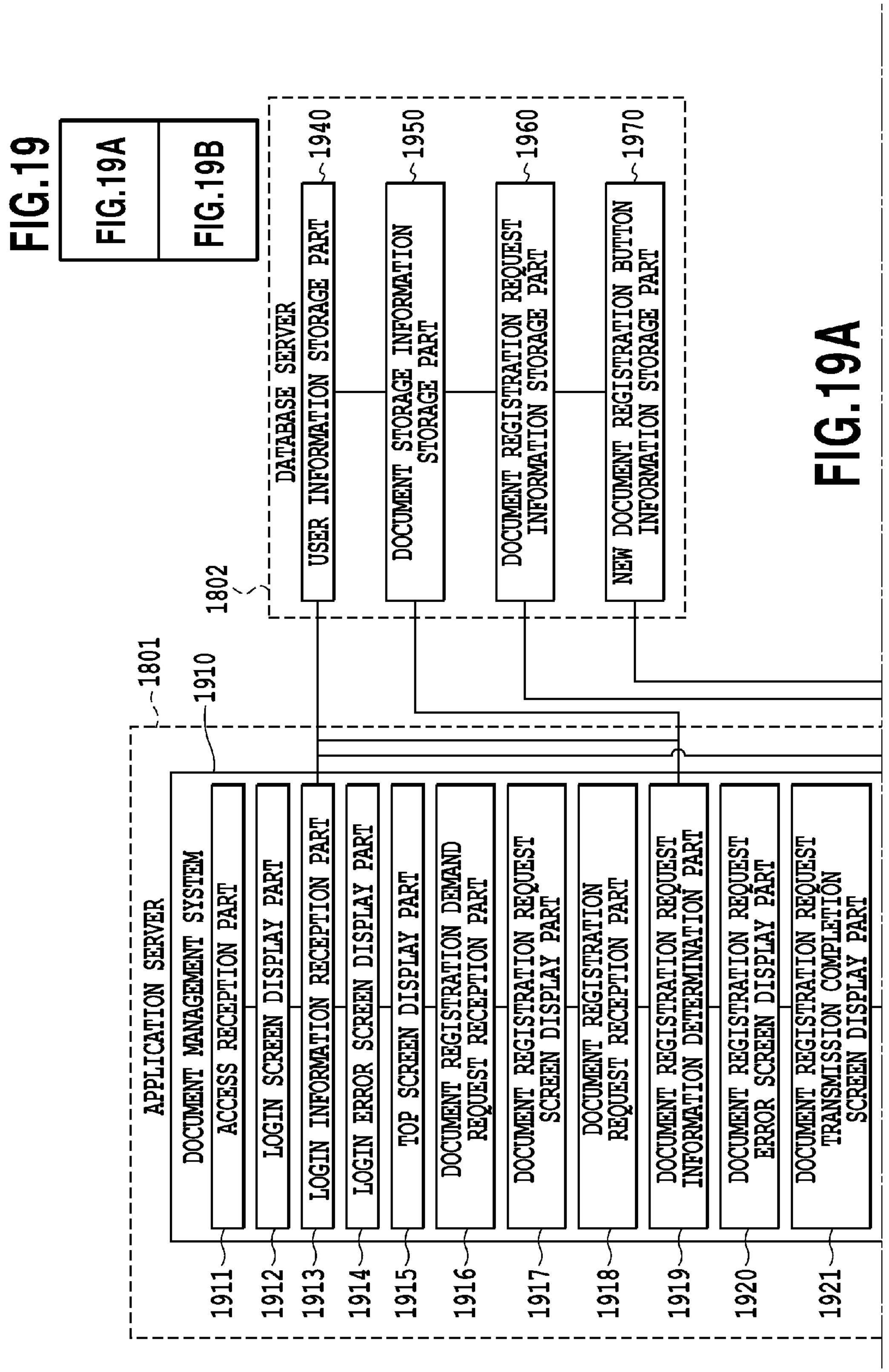
FIG. 19 is a diagram showing the relationship between FIG. 19A and FIG. 19B.
FIG. 19A is a diagram showing a software configuration in the third embodiment.
Figure 19B:
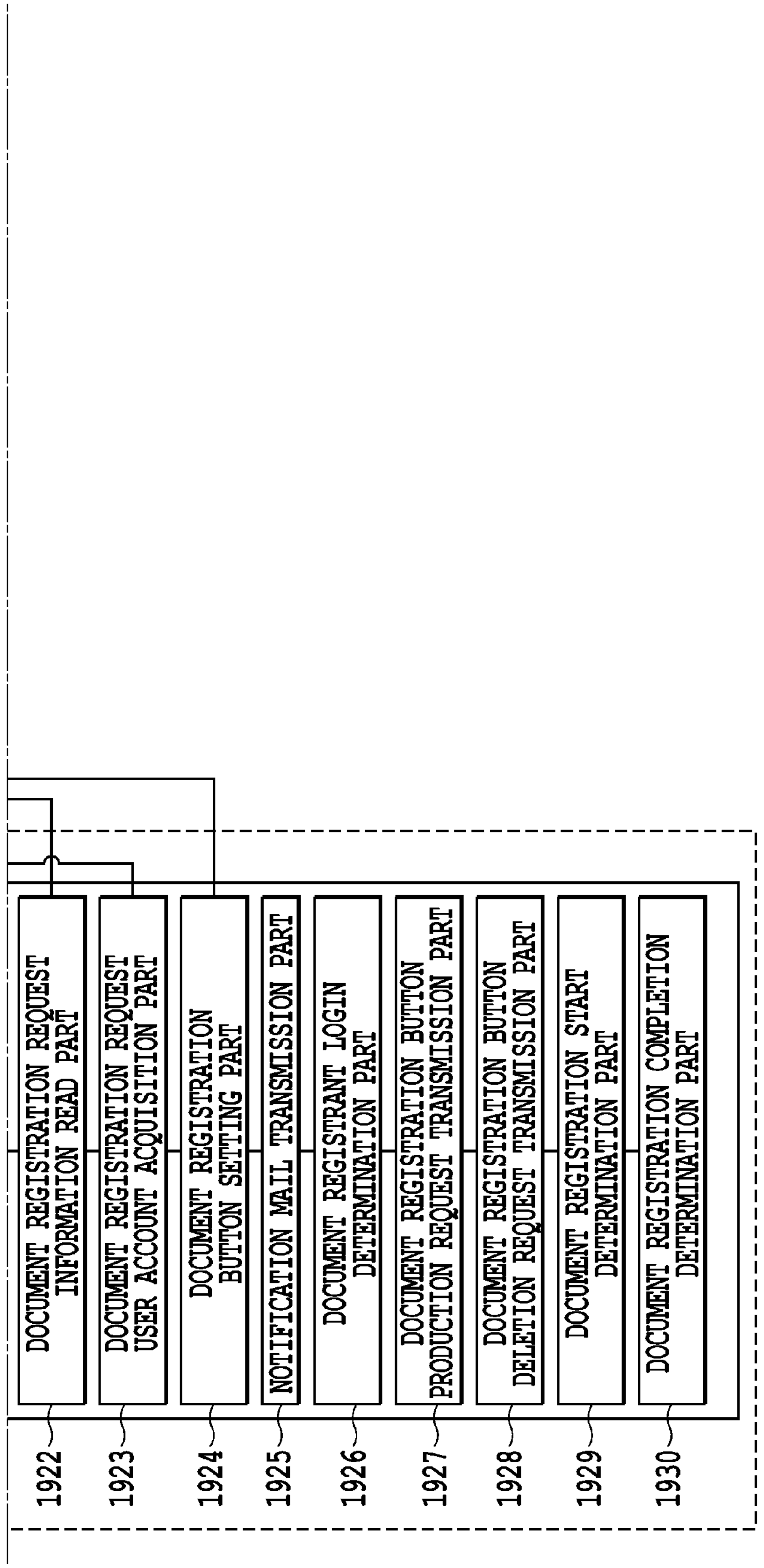
FIG. 19B is a diagram showing a software configuration in the third embodiment.

Now, the software configurations of the application server 1801 and the database server 1802 according to the present embodiment are shown in FIGS. 19A and 19B.

An access reception part 1911 receives an access request transmitted by the client PC 101 to a document management system 1910. When the access reception part 1911 receives the access request, a login screen display part 1912 displays a login screen on a display connected to the client PC 101.

A login information reception part 1913 receives login information transmitted from the client PC 101. The login information reception part 1913 references a user information storage part 1940 of the database server 1802 and thereby determines whether or not the received login information is appropriate login information authorized by the document management system 1910. If the document management system 1910 determines that the login information received by the login information reception part 1913 is not appropriate login information, a login error screen display part 1914 makes the client PC 101 display a login error screen. On the other hand, if the document management system 1910 determines that the login information received by the login information reception part 1913 is appropriate login information, a top screen display part 1915 makes the client PC 101 display the top screen of the document management system 1910.

A document registration demand request reception part 1916 receives a document registration demand request transmitted from the client PC 101. When the document registration demand request reception part 1916 receives the document registration demand request, a document registration request screen display part 1917 makes the client PC 101 display the document registration screen of the document management system 1910.

A document registration request reception part 1918 receives document registration request information transmitted from the client PC 101. Examples of the document registration request information include a document registrant, a storage site where the document is registered, an e-mail address, settings (resolution, extension) used when the scanning is performed by the multi-function peripheral 1803, a protocol used for the document registration and comments written in the text of the e-mail. In order to determine whether or not the document registration information received by the document registration request reception part 1918 has no error and is correct registration request information, a document registration request information determination part 1919 is connected to the user information storage part 1940 and a document storage information storage part 1950. If the document registration information received by the document registration request reception part 1918 has an error or a failure, a document registration request error screen display part 1920 makes the client PC 101 display a document registration request error screen. On the other hand, if the document registration information has no error or failure, a document registration request transmission completion screen display part 1921 makes the client PC 101 display a document registration request completion screen.

A document registration request information read part 1922 reads the document registration request information received by the document registration request reception part 1918, and stores the document registration request information in the document registration request information storage part 1960 of the database server 1802.

In order to acquire a user account on the document management system 1910 of the user 106 who makes the document registration request from the client PC 101, a document registration request user account acquisition part 1923 is connected to the user information storage part 1940 of the database server 1802.

A document registration button setting part 1924 uses part (the URL of the server 1801, a document registration destination and scan setting) of the document registration request information received by the reception part 1918 and the user account of the user 106 acquired by the acquisition part 1923, and thereby sets the document registration button information. The document registration button setting part 1924 stores the document registration button information in a new document registration button information storage part 1970 of the database server 1802.

A notification mail transmission part 1925 transmits a e-mail to a e-mail address included in the document registration request information received by the document registration request reception part 1918. A document registrant login determination part 1926 determines whether or not the user 107 accesses and logs into the document management system 1910 from the multi-function peripheral 1803.

A document registration button production request transmission part 1927 transmits, to the multi-function peripheral 1803, a request for producing a document registration button on the menu displayed by the user 107 with the multi-function peripheral 1803. A document registration button deletion request transmission part 1928 uses the document registration button produced by the user 107 with the multi-function peripheral 1803 and thereby completes the document registration, and then transmits a document registration button deletion request to the multi-function peripheral 1803.

A document registration start determination part 1929 determines whether or not the user 107 has started the document registration by using the document registration button. A document registration completion determination part 1930 determines whether or not the user 107 has completed the document registration by using the document registration button.

FIGS. 19A and 19B simply show one of the software configurations necessary for the present embodiment; the present invention is not limited to the software configuration shown in FIGS. 19A and 19B.

Processing in the document management system of the present embodiment will be described in detail below with reference to FIGS. 20 to 24C.

[Document Registration Request Reception Unit and Document Registrant Notification Unit]

Figure 20:
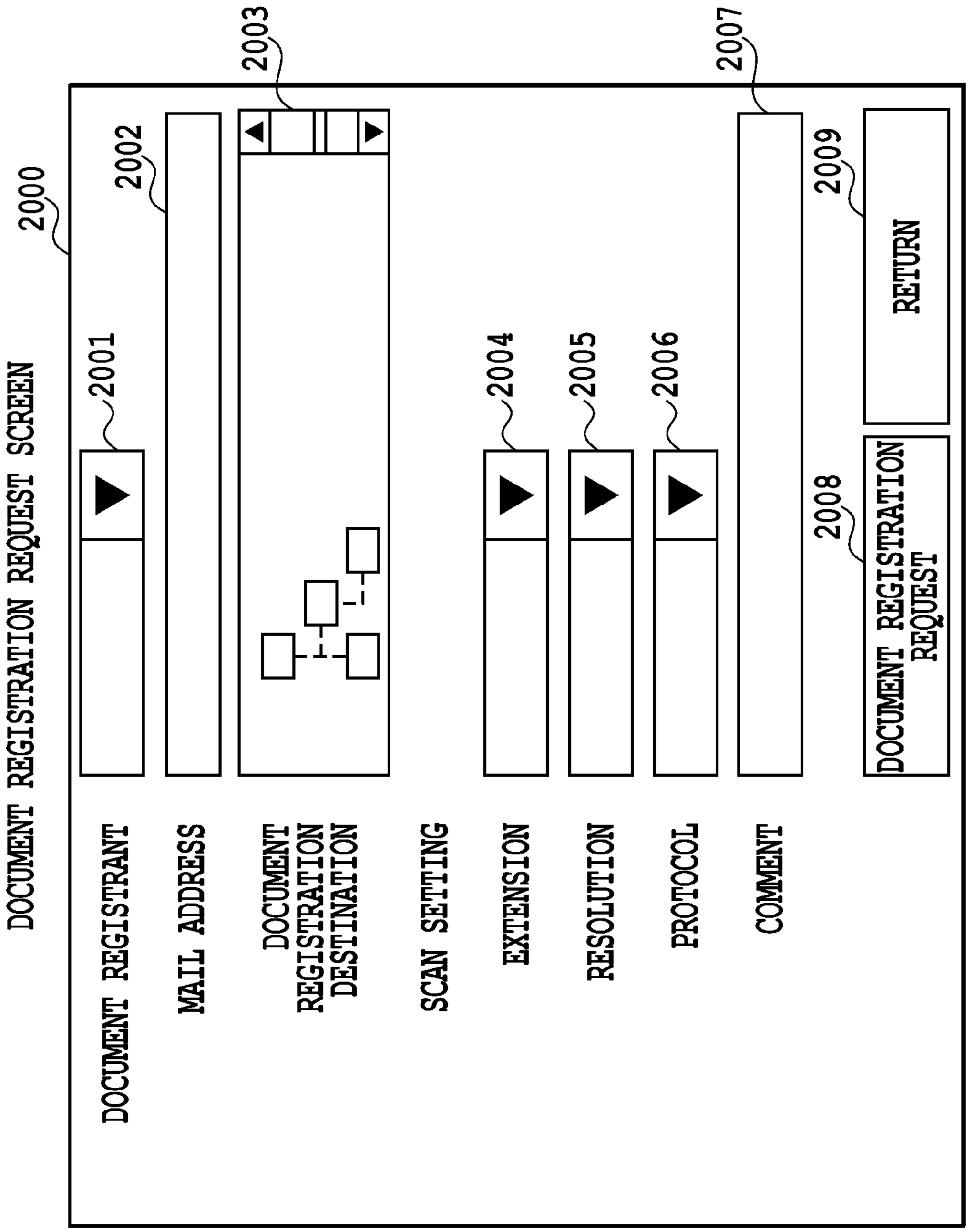
FIG. 20 is a diagram showing the details of a document registration request screen in the third embodiment.

An example of the document registration request screen used when the document registration request is made in the present embodiment is shown in FIG. 20. FIG. 20 shows a document registration request screen 2000 used when the user 106 makes the document registration request to another user (the user 107 in the present embodiment).

In a document registrant selection box 2001, a user who belongs to the same organization (such as an OU (organization unit) or a cabinet) as the user 106 among the users registered in the document management system 1910 can be selected as the document registrant. In an e-mail address entry box 2002, an e-mail address of the user selected as the document registrant in the document registrant selection box 2001 can be manually entered. The e-mail address of the user selected in the document registrant selection box 2001 may be automatically entered. In a document registration destination selection box 2003, document registration destinations that the user 106 can reference are displayed. The user 106 can select the document registration destination where the user selected in the document registrant selection box 2001 registers the document from the displayed document registration destinations. In an extension selection box 2004, the extension of the document scanned in the scan operation of the multi-function peripheral 1803 can be selected. In a resolution selection box 2005, the resolution of the document scanned by the multi-function peripheral 1803 can be selected. In a protocol selection box 2006, a protocol utilized when the scanned document is registered in the document management system 1910 and the application server 1801 can be selected. In a comment entry box 2007, a comment that is written in the text of the e-mail within the e-mail transmitted to the e-mail address entered in the mail address entry box 2002 can be entered.

When a document registration request button 2008 is selected, the document registration request information entered into the document registration request screen 2000 is transmitted to the document management system 1910 and the application server 1801. When a return button 2009 is selected, the document registration request is cancelled, and a request for requesting the display of the top screen of the document management system 1910 is transmitted to the document management system 1910 and the application server 1801.

Figure 21:
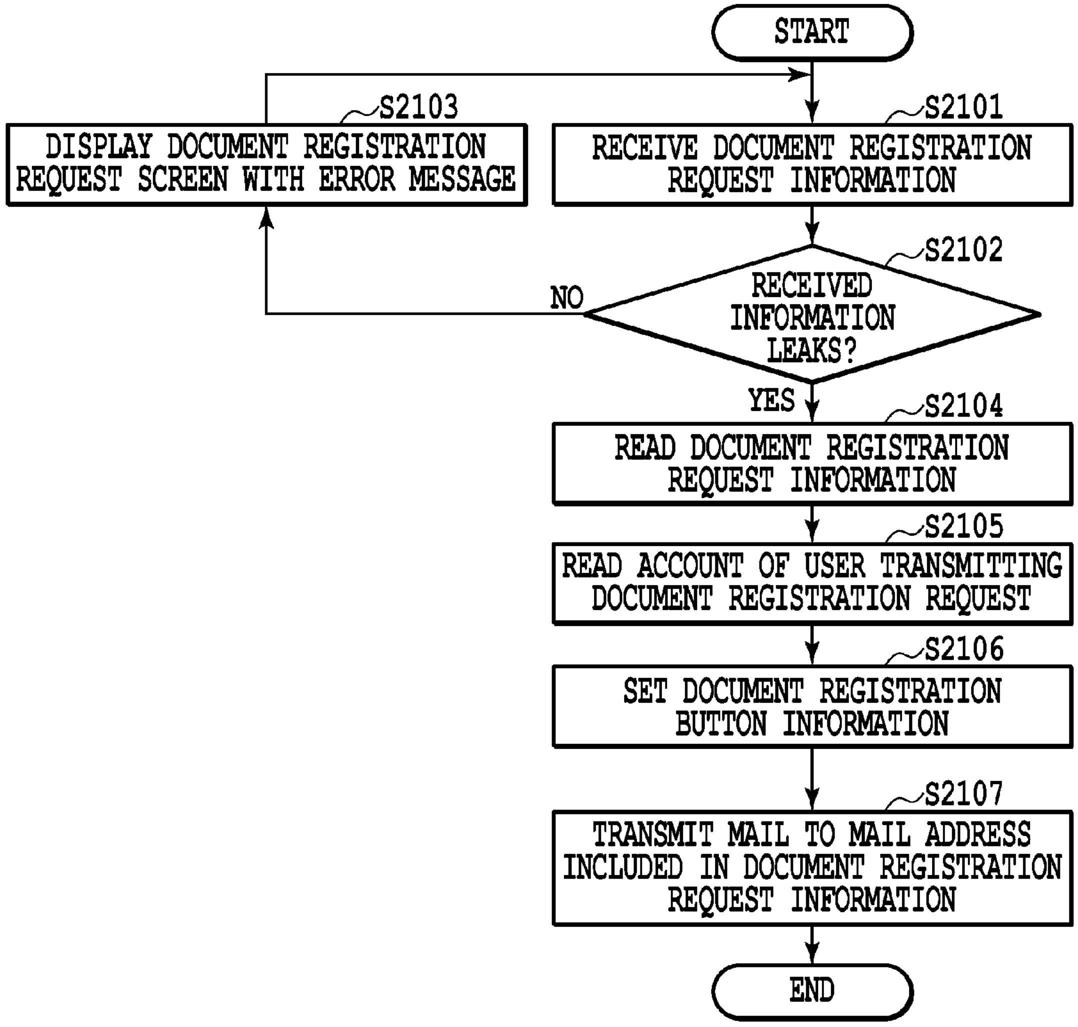
FIG. 21 is a flowchart of a document registration request process in the third embodiment.

Now, a flowchart shown in FIG. 21 and showing the procedure in which the document management system 1910 and the application server 1801 process the document registration request information will be described.

At step 2101, the document registration request reception part 1918 receives the document registration request information transmitted from the client PC 101. At step 2102, the document registration request information determination part 1919 determines whether or not an omission or an error is present in the document registration request information received at step 2101. If an omission or an error is present in the document registration request information, at step 2103, the document registration request error screen display part 1920 displays on the client PC 101 the information indicating that an omission or an error is present in the transmitted document registration request information, and encourages the user 106 to make the document registration request again. If an omission or an error is not present in the document registration request information, the process proceeds to step 2104 where the document registration request information received by the document registration request information read part 1922 is read.

Then, at step 2105, the document registration request user account acquisition part 1923 reads the user account of the user 106 who has transmitted the document registration request from the user information storage part 1940. At step 2106, information necessary for the document registration is extracted from the document registration request information read at step 2104 by the document registration button setting part 1924. Furthermore, at step 2106, the user account of the user 106 on the document management system 1910 read at step 2105 is used to set the document registration button information. Then, the document registration button information is transmitted to the new document registration button information storage part 1970 of the database server 1802. At step 2107, the notification mail transmission part 1925 transmits an e-mail to the user 107 to notify the user 107 that the document registration request occurs.

Now, the details of the document registration button information stored in the database server 1802 are shown in FIG. 22.

A table 2201 stored in the database server 1802 stores various types of information as the document registration button information. That is, the table 2201 stores a document registrant (Document_Register), a user ID transmitting the document registration request (User_ID), its password (User_Password) and a document registration destination (Folder_Pass). Moreover, the table 2201 stores the extension of the document scanned by the multi-function peripheral (Type), the resolution of the scanning (Graphic_Mode) and a protocol used in the document registration (Protocol). Every time the document management system 1910 receives the document registration request, the database server 1802 adds the document registration button information to the row of the table 2201, and updates the table 2201. The configuration of the table 2201 is not limited to the one shown in the figure, and can freely be changed as necessary.

[Document Registration Button Production Unit and Deletion Unit]

Figure 23:
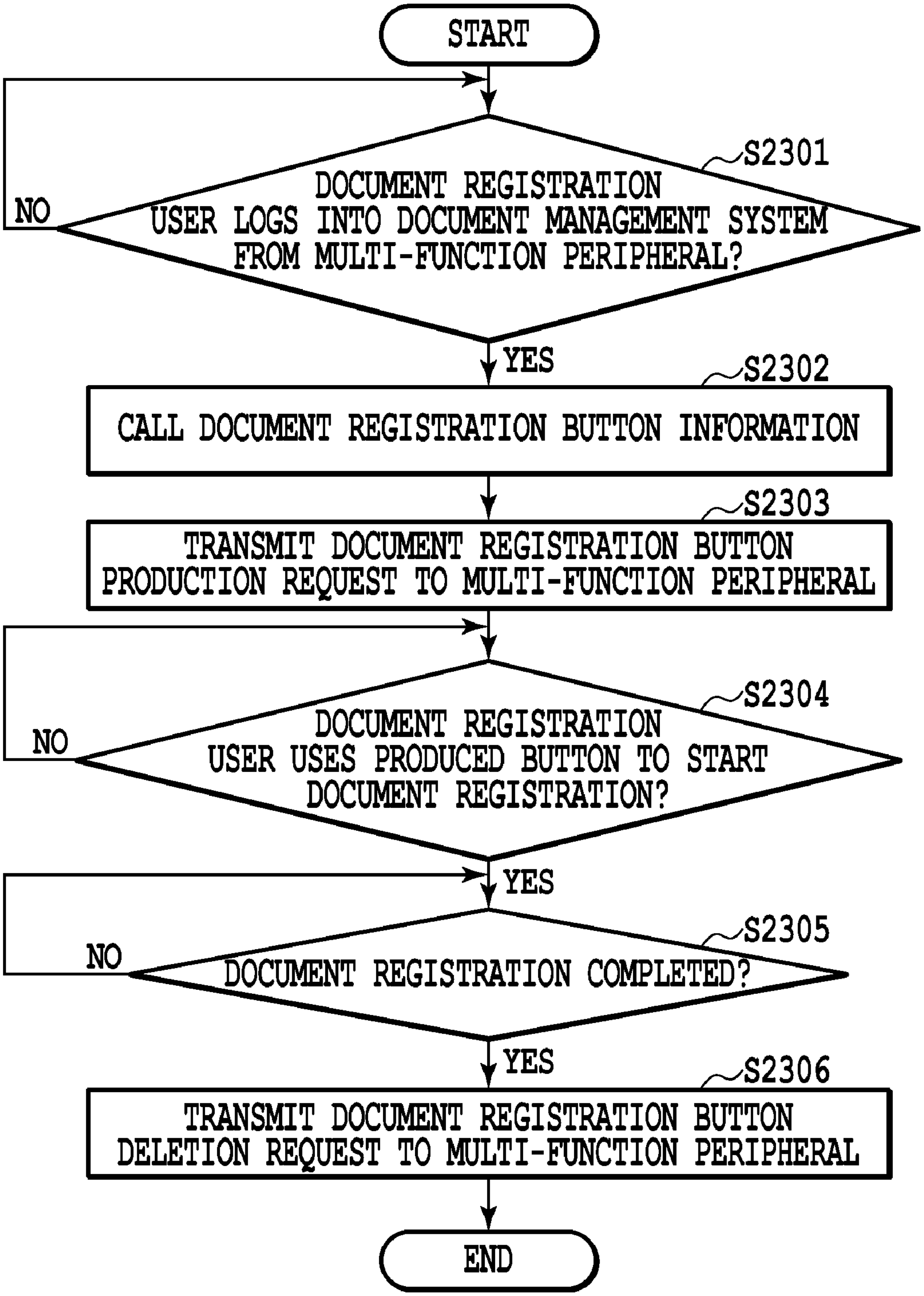
FIG. 23 is a flowchart of processing for producing and deleting a document registration button in the third embodiment.

The flowchart of processing performed when access to the document management system 1910 through the multi-function peripheral 1803 is made after the user 107 who has received the document registration request receives the notification is shown in FIG. 23. In this processing, the document registration button is produced on the menu of the multi-function peripheral 1803 utilized by the user 107, and the document registration button is deleted after the document registration of the user 107 is completed.

At step 2301, the document registrant login determination part 1926 determines whether or not the user 107 has logged into the document management system 1910 from the multi-function peripheral 1803. If the user 107 is determined to have logged in from the multi-function peripheral 1803, the process proceeds to step 2302 where the document registration button setting part 1924 calls the document registration button information stored in the database server 1802. At step 2303, the document registration button production request transmission part 1927 transmits, to the multi-function peripheral 1803, the document registration button information and the document registration button production request called at step 2302. At step 2304, the document registration start determination part 1929 determines whether or not the document registration button production request transmitted at step 2303 is received by the multi-function peripheral 1803 and then the user 107 has started the document registration by using the document registration button. If the user 107 is determined to have started the document registration by using the document registration button, the process proceeds to step 2305 where the document registration completion determination part 1930 determines whether or not the document registration has been completed. If the user 107 is determined to have completed the document registration by using the document registration button, the process proceeds to step 2306 where the document registration button deletion request transmission part 1928 transmits a request for deleting the document registration button to the multi-function peripheral 1803.

Figures 24, 24A:
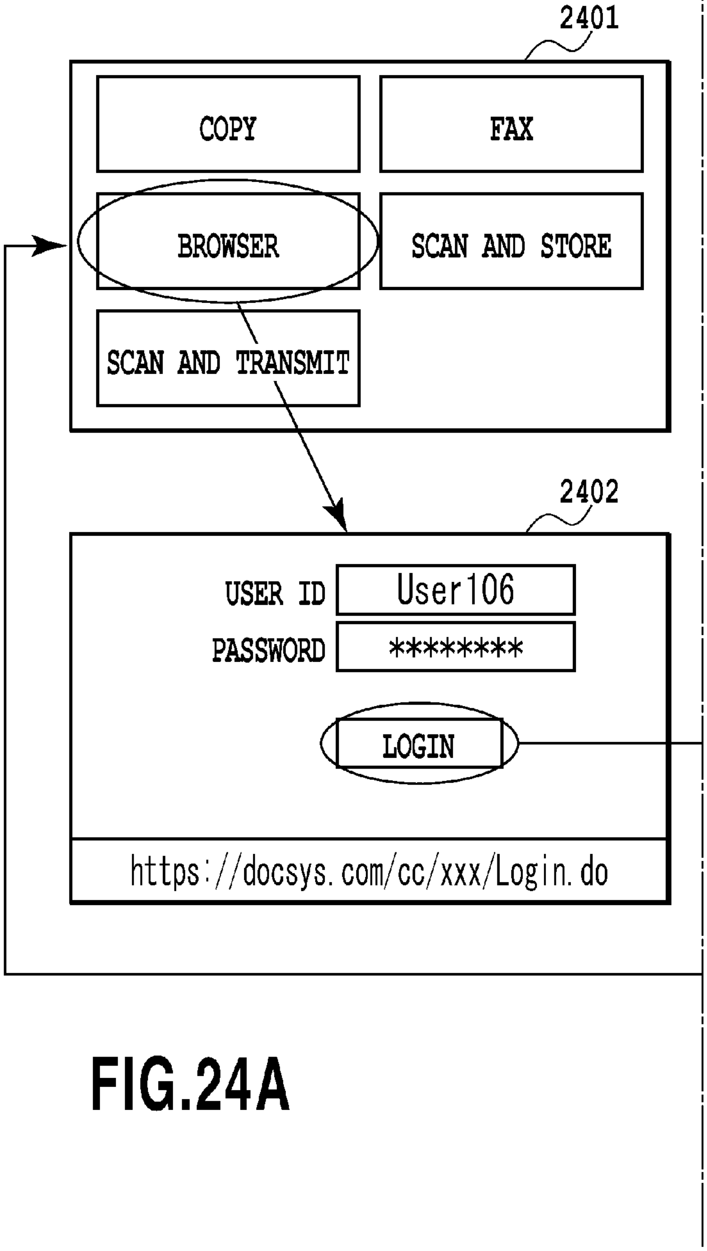
FIG. 24 is a diagram showing the relationship among FIG. 24A, FIG. 24B and FIG. 24C.
FIG. 24A is a diagram showing the details of screen transition in the third embodiment.
Figure 24B:
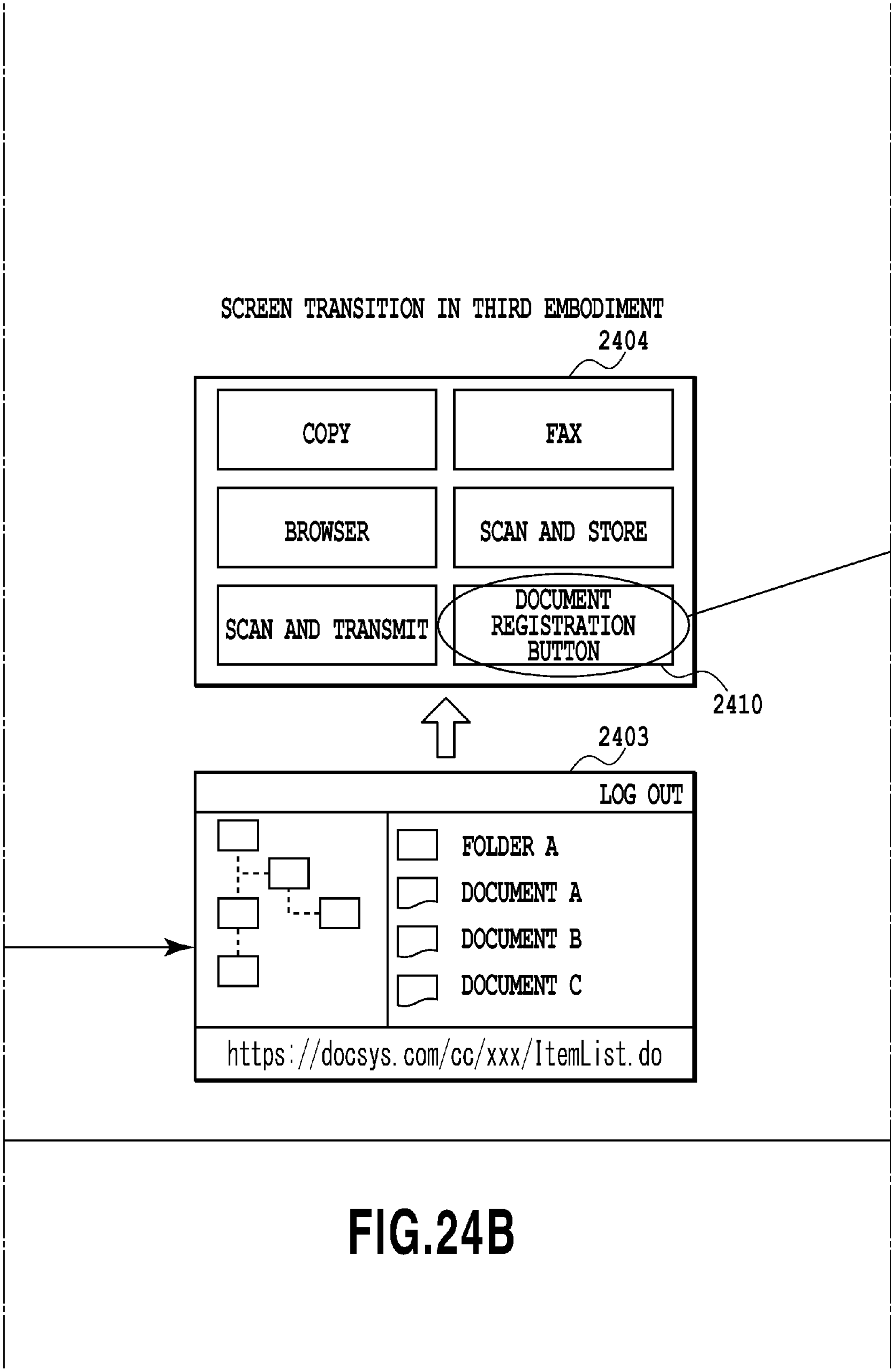
FIG. 24B is a diagram showing the details of screen transition in the third embodiment.
Figure 24C:
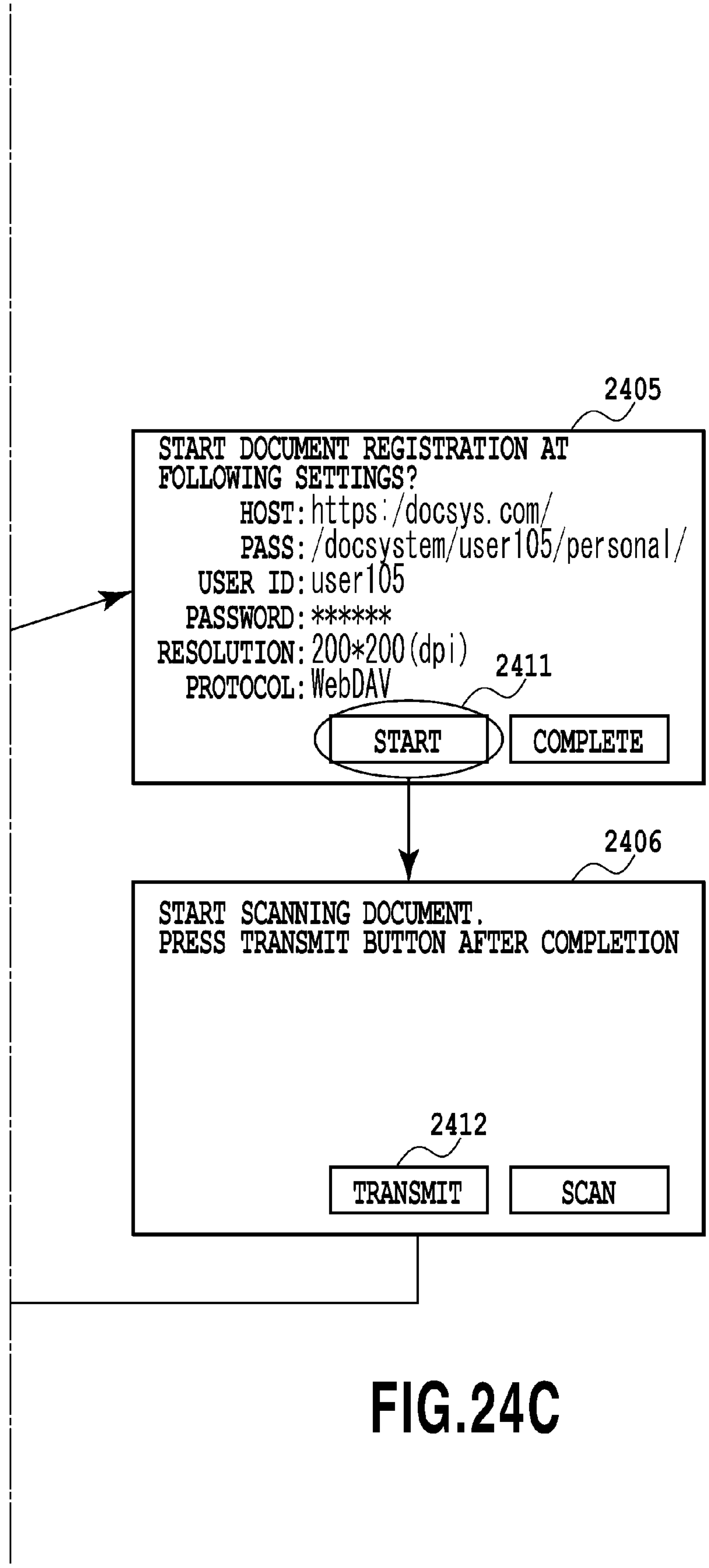
FIG. 24C is a diagram showing the details of screen transition in the third embodiment.

Now, an example of screen transition in the present embodiment is shown in FIGS. 24A to 24C.

When the user 107 logs into the multi-function peripheral 1803, the multi-function peripheral 1803 displays a menu screen 2401 on an operation panel. Then, when the user 107 utilizes a browser or the like installed in the multi-function peripheral 1803 to access the document management system 1910, the multi-function peripheral 1803 displays the login screen 2402 of the document management system 1910 on the operation panel. Then, when, through a login screen 2402, the user 107 enters the user ID and the password and logs in, the multi-function peripheral 1803 displays a top screen 2403 of the document management system 1910 on the operation panel. The document management system 1910, when determining that the user 107 has logged in, transmits the document registration button production request to the multi-function peripheral 1803, and then the multi-function peripheral 1803 having received the document registration button production request produces the document registration button.

Then, when the user 107 switches the screen of the multi-function peripheral 1803 from the browser to the menu screen, a menu screen 2404 including a document registration button 2410 is displayed on the operation panel. When the user 107 selects the document registration button 2410 on the menu screen 2404, a document registration start screen 2405 is displayed on the operation panel. When the user 107 selects a start button 2411 on the document registration start screen 2405, a document scan/transmission start screen 2406 is displayed on the operation panel. When the user 107 scans the document on the document scan/transmission start screen 2406 and thereafter selects a transmission button 2412, the scanned document is transmitted from the multi-function peripheral 1803 to the document management system 1910 and the application server 1801. The document management system 1910 and the application server 1801 that have received the transmitted document transmit a document registration button deletion request to the multi-function peripheral 1803. The multi-function peripheral 1803 that has received the document registration button deletion request deletes the document registration button 2410 on the menu screen 2404 including the document registration button, and displays the menu screen 2401 on the operation panel.

Fourth Embodiment

Fourth embodiment of the present invention will be described based on FIGS. 25A to 28C. In the present embodiment, the document management system 1910 controls the number of times of performing document registration of the user 107 having received the document registration request.

[System Configuration]

Since system configurations in the present embodiment and a fifth embodiment described below may be the same as in the third embodiment, their description will not be repeated.

[Software Configuration]

Figure 25A:
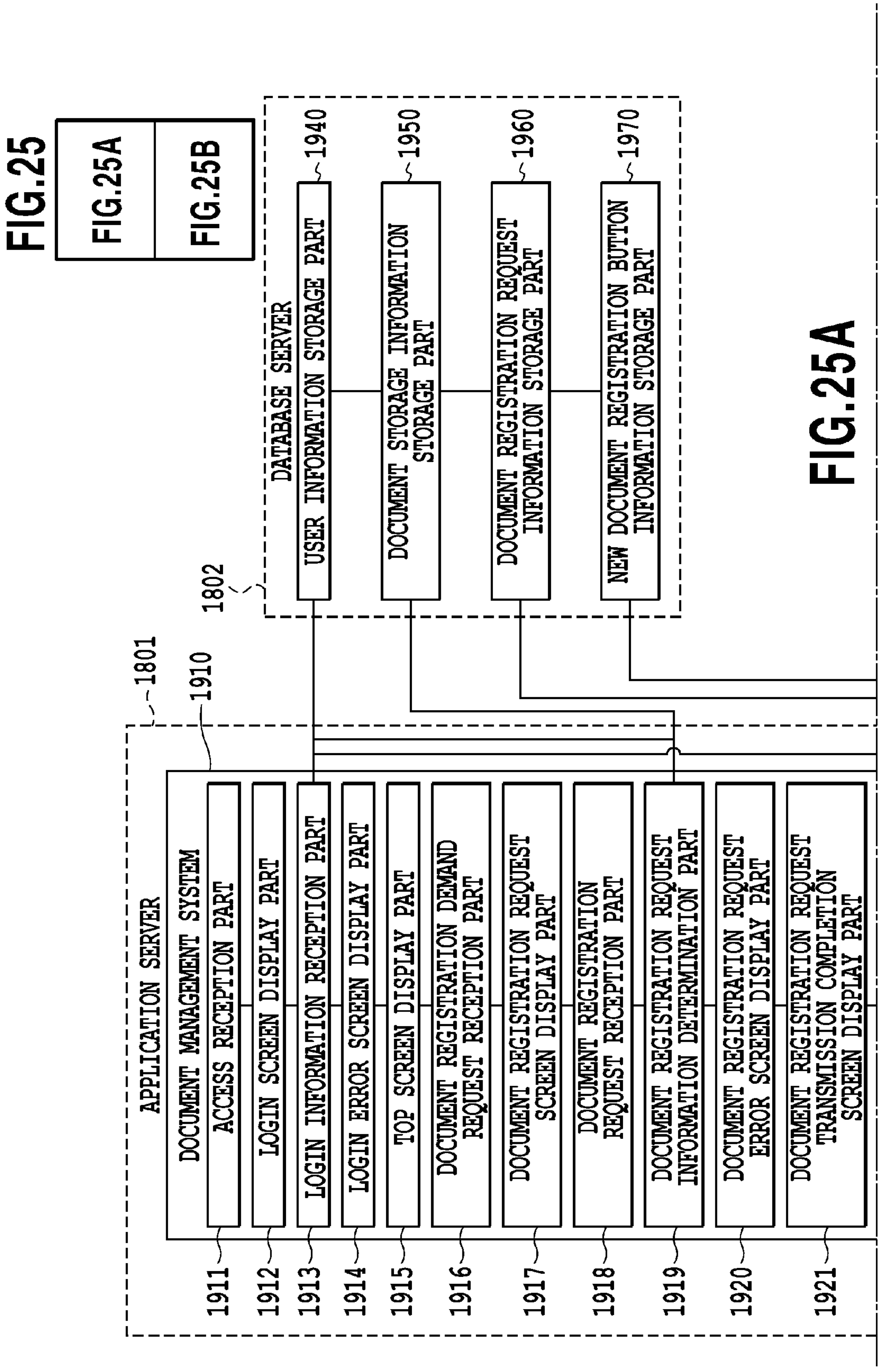
FIG. 25A is a diagram showing a software configuration in a fourth embodiment.
Figure 25B:
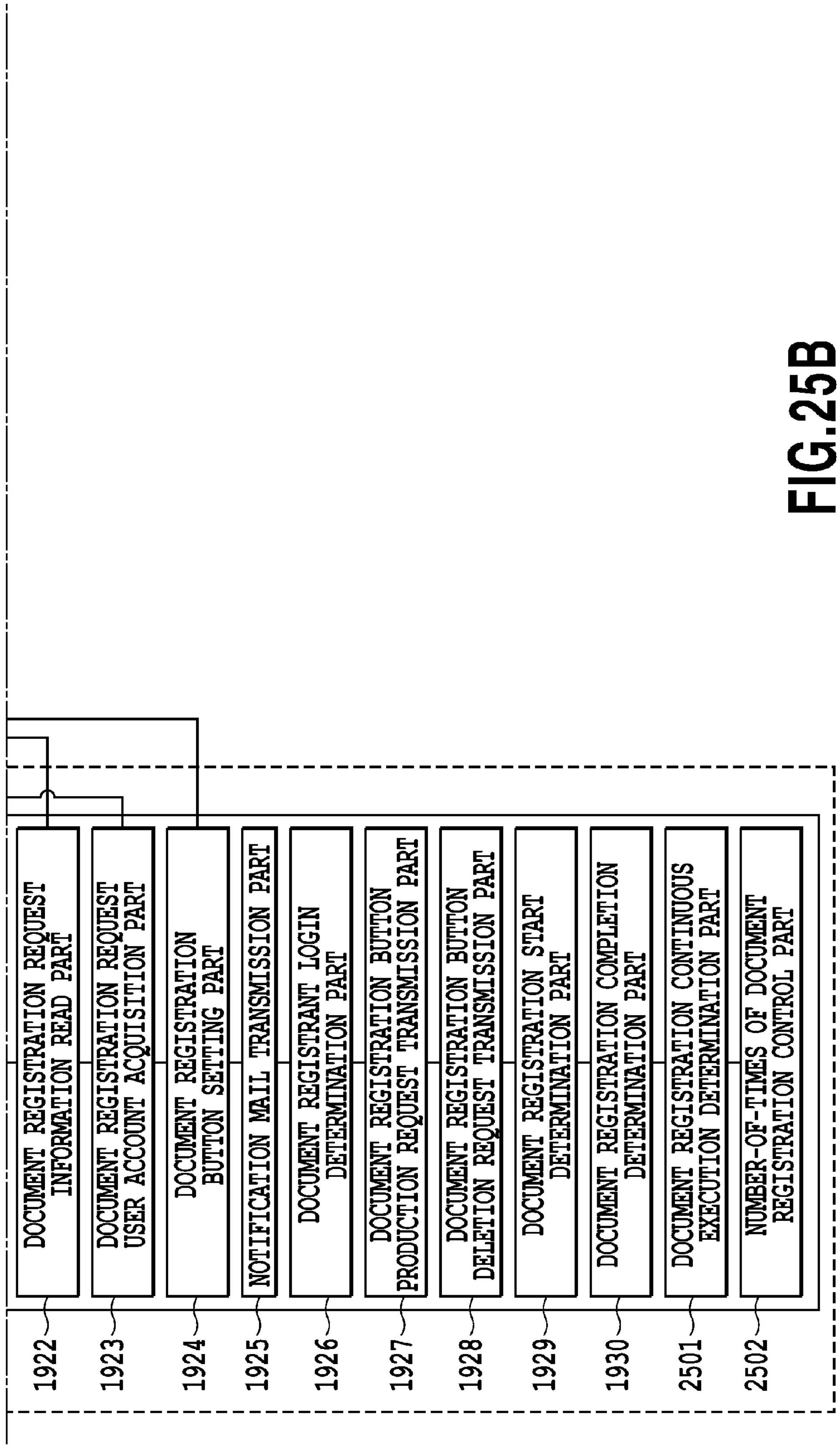
FIG. 25B is a diagram showing a software configuration in a fourth embodiment.

Software configurations within the application server 1801 and the database server 1802 in the present embodiment are shown in FIGS. 25A and 25B.

A document registration continuous execution determination part 2501 determines whether or not the user 107 has completed the document registration using the same document registration button information after the completion of the document registration. A number-of-times of document registration control part 2502 controls the number of times of document registration performed by the user 107 on a document registration request screen 2600 described later based on the possible number of times of document registration specified by the user 106. The configuration of the other parts is the same as in the third embodiment (FIGS. 19A and 19B), and thus their description will not be repeated.

[Number-of-Times of Document Registration Control Unit]

Figure 26:
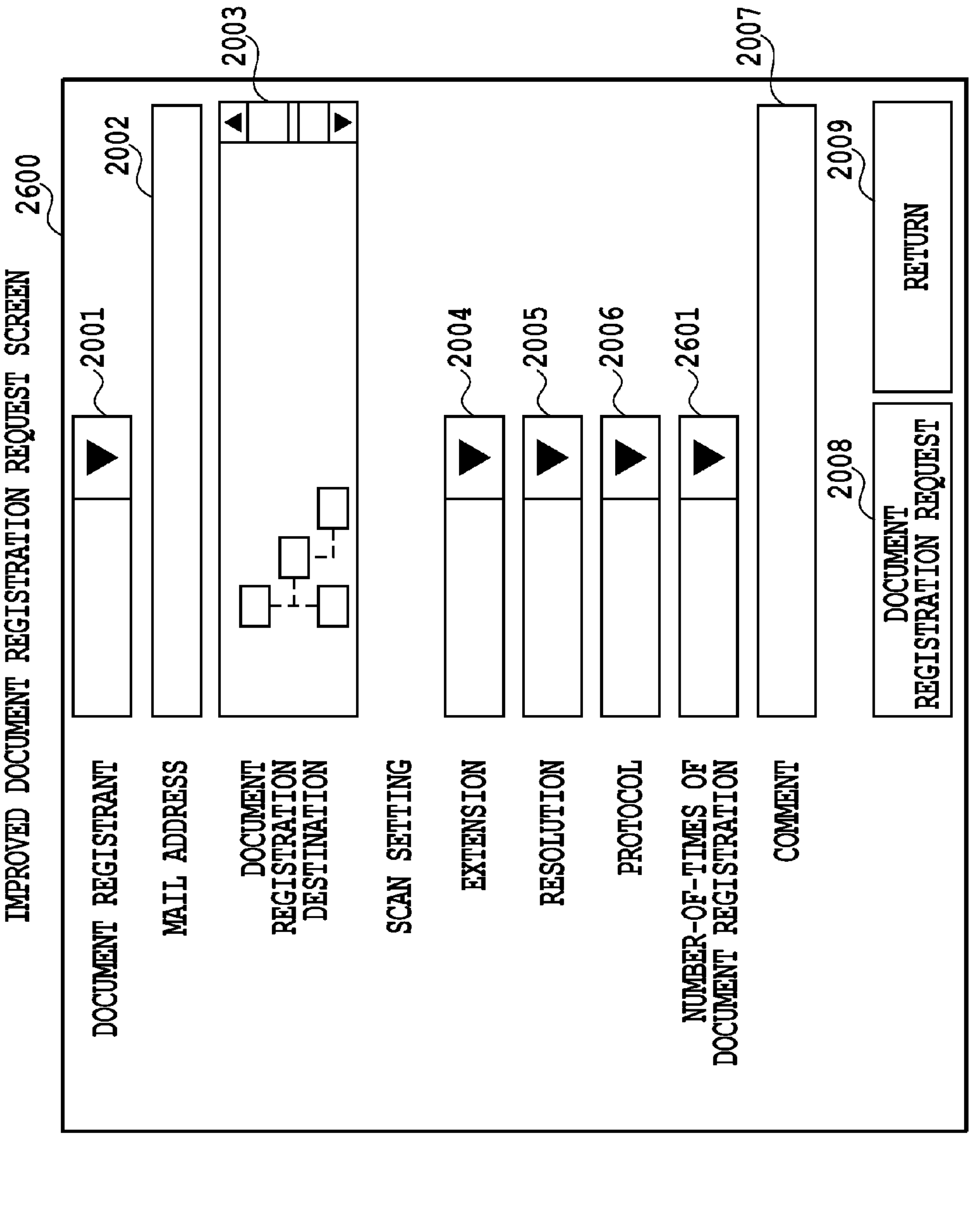
FIG. 26 is a diagram showing the details of a document registration request screen in the fourth embodiment.

An example of the document registration request screen used when the document registration request is performed in the present embodiment is shown in FIG. 26. FIG. 26 is obtained by adding a possible number-of-times of document registration specification box 2601 to the document registration request screen 2000 shown in FIG. 20. In this possible number-of-times of document registration specification box 2601, the number-of-times of document registration is specified, and thus it is possible to control the number-of-times of document registration performed by the user 107.

Figure 27:
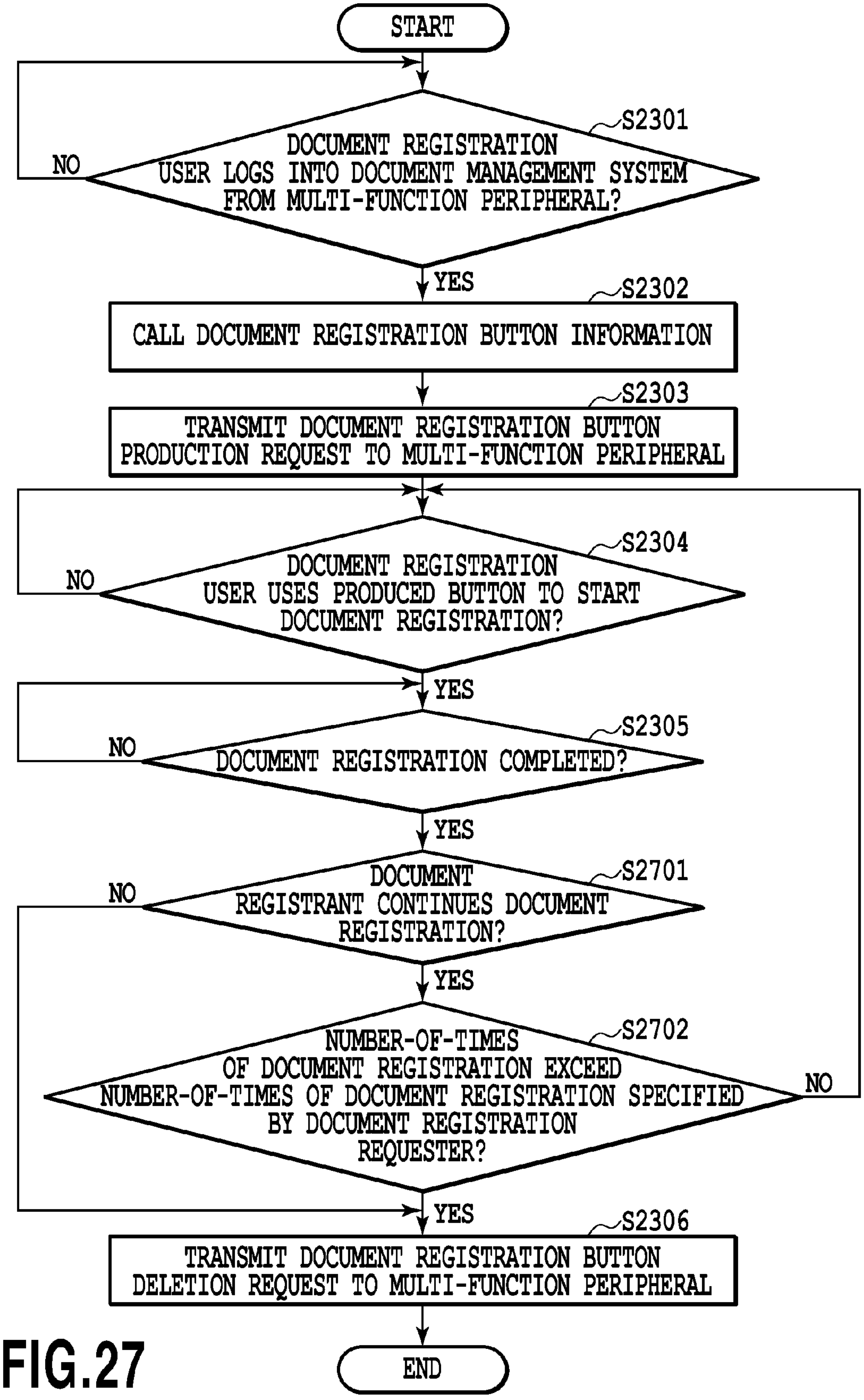
FIG. 27 is a flowchart of a number-of-times of document registration restriction process in the fourth embodiment.

FIG. 27 shows a flowchart of processing in which the document management system 1910 determines whether or not the document registration is performed within the number-of-times of document registration specified by the user 106. Processing at steps 2301 to 2305 and step 2306 shown in FIG. 27 is the same as that in the above-mentioned steps of FIG. 23, and thus its description will not be repeated.

If, at step 2305, the document registration completion determination part 1930 determines that the document registration is completed, processing at step 2701 is performed. At step 2701, the document registration continuous execution determination part 2501 determines whether or not the user 107 has continuously performed the document registration after the completion of the document registration utilizing the document registration button produced by the multi-function peripheral 1803. If the user 107 has continuously performed the document registration, at step 2702, the number-of-times of document registration control part 2502 determines whether or not the number of uses of the document registration button by the user 107 exceeds the possible number-of-times of document registration specified by the user 106. If, at step 2702, the number of uses of the document registration button is determined not to exceed the possible number-of-times of document registration specified by the user 106, the process returns to step 2304 where the document registration start determination part 1929 determines whether or not the user 107 starts the document registration. On the other hand, if, at step 2702, the number of uses of the document registration button is determined to exceed the possible number-of-times of document registration specified by the user 106, the process proceeds to step 2306 where the document registration button deletion request transmission part 1928 transmits the document registration button deletion request to the multi-function peripheral 1803.

Figures 28, 28A:
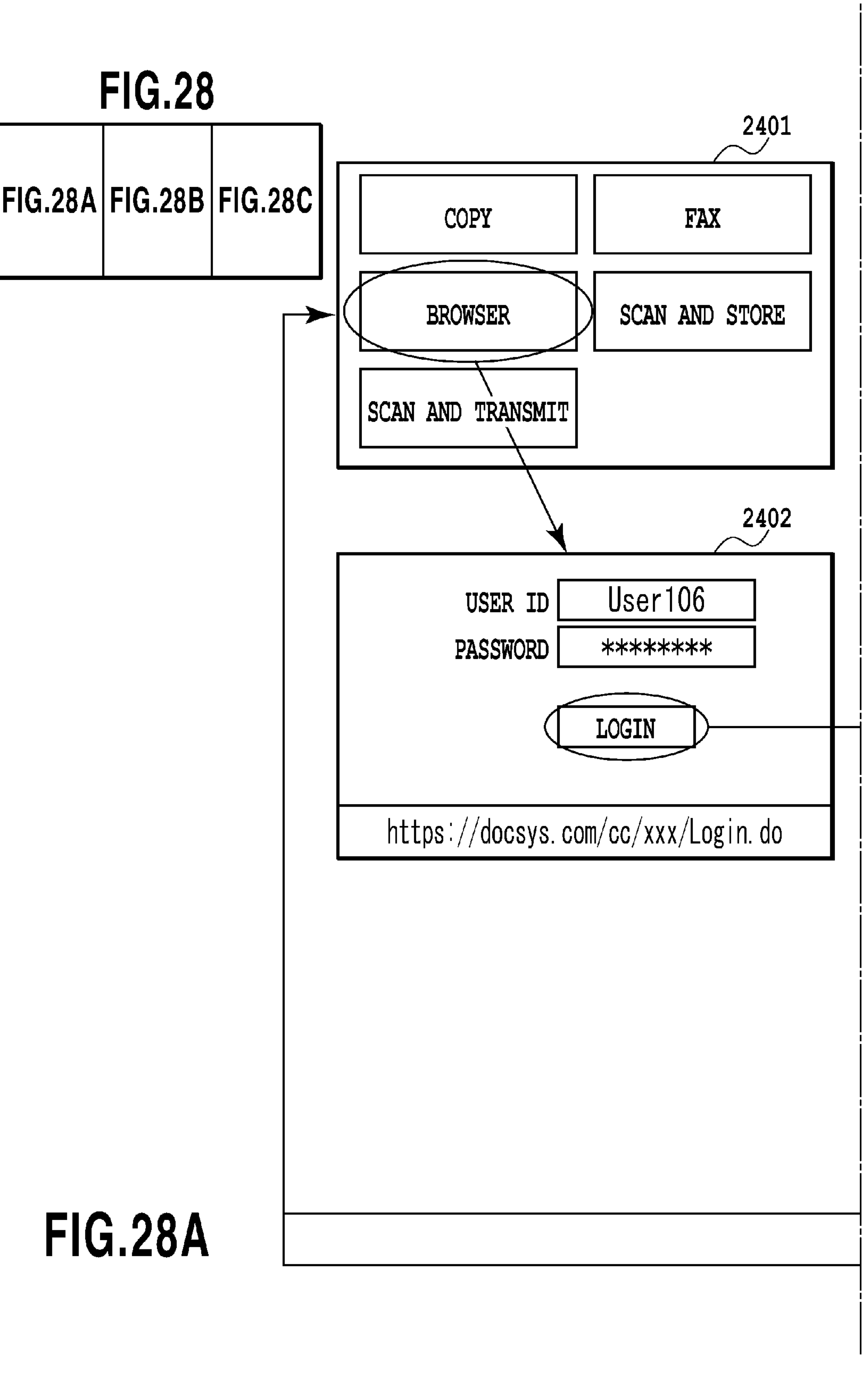
FIG. 28 is a diagram showing the relationship among FIG. 28A, FIG. 28B and FIG. 28C.
FIG. 28A is a diagram showing the details of screen transition in the fourth embodiment.
Figure 28B:
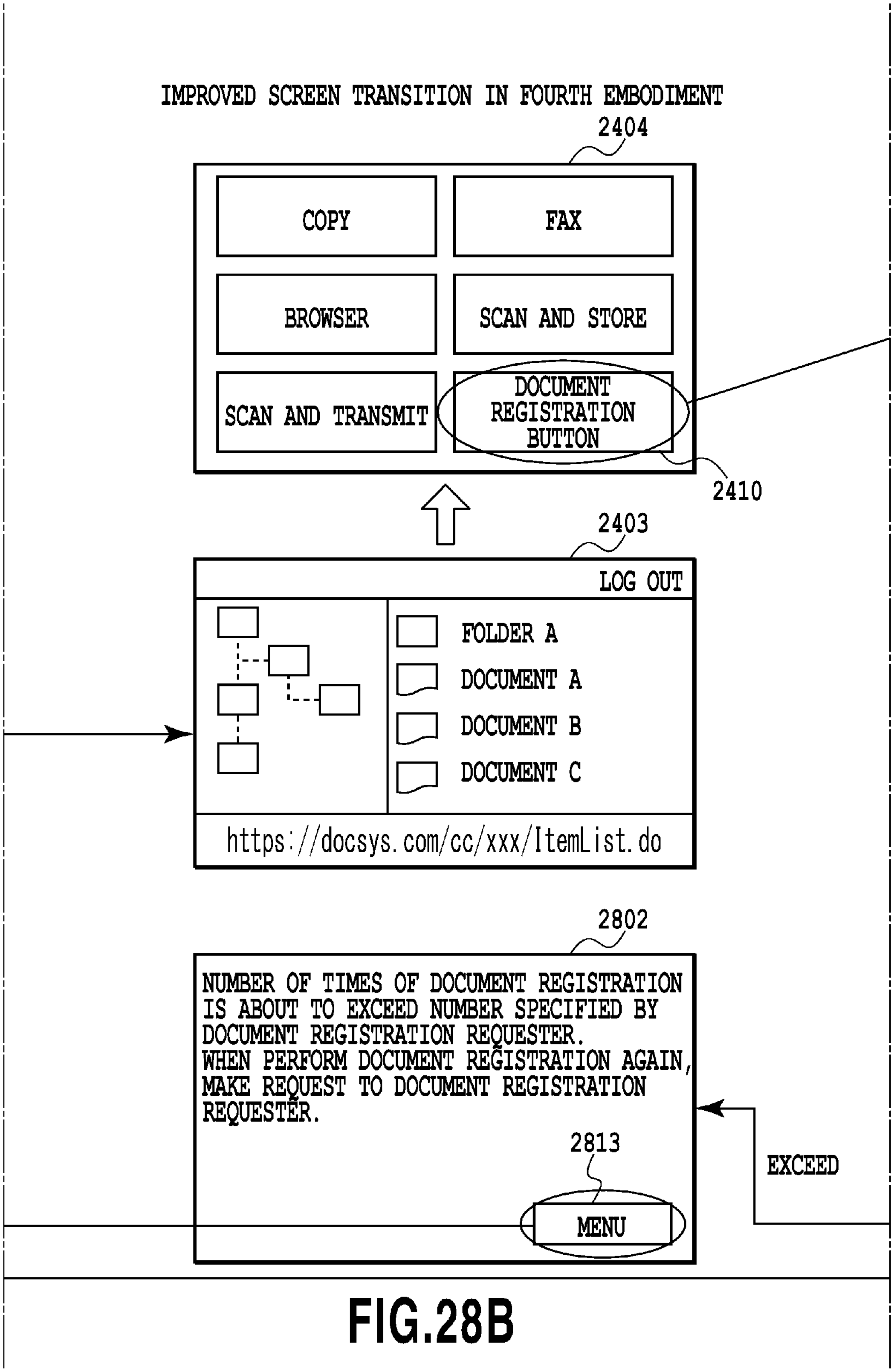
FIG. 28B is a diagram showing the details of screen transition in the fourth embodiment.
Figure 28C:
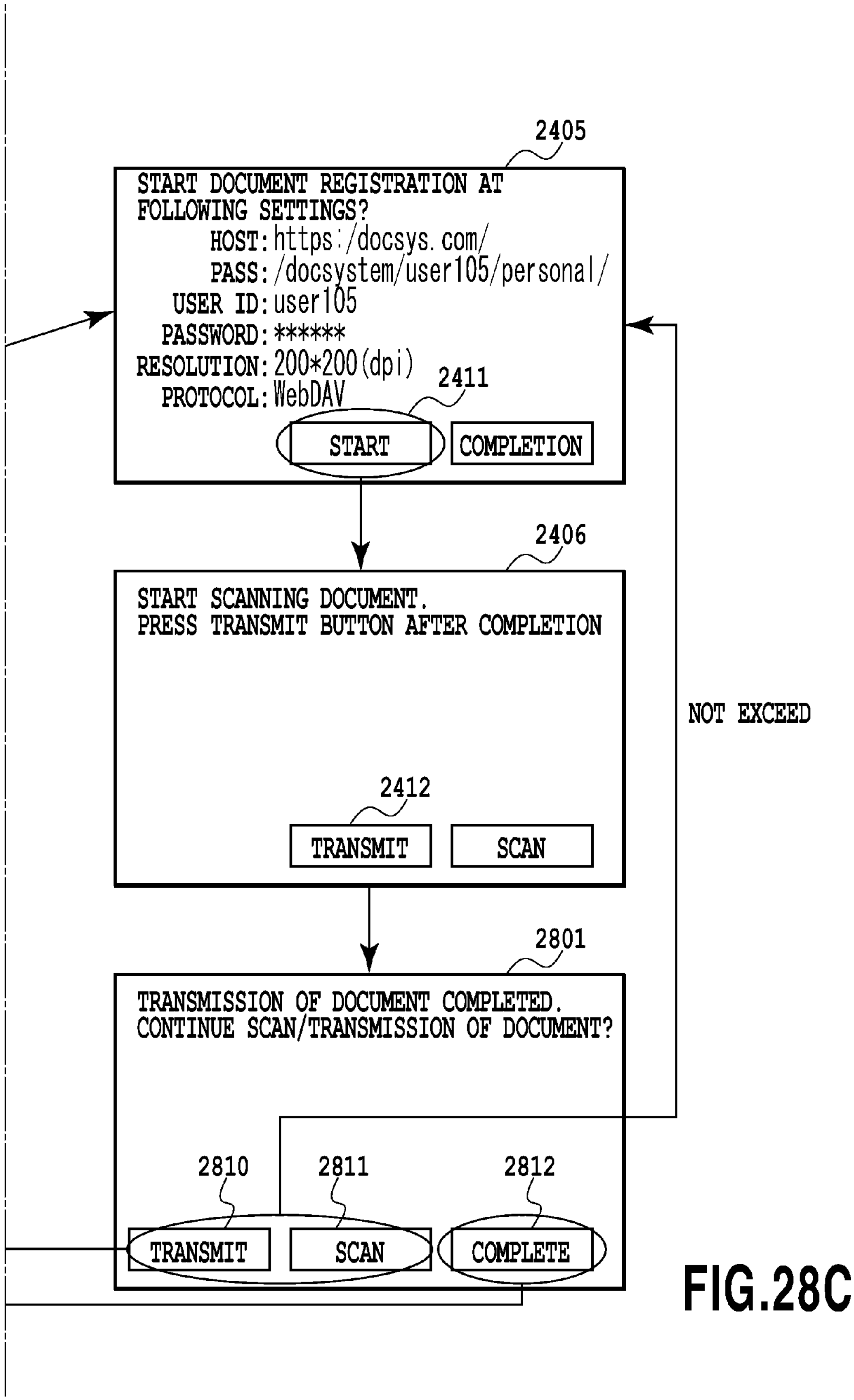
FIG. 28C is a diagram showing the details of screen transition in the fourth embodiment.

An example of screen transition in the present embodiment is shown in FIGS. 28A to 28C.

When the user 107 completes the document registration on the document scan/transmission start screen 2406, the multi-function peripheral 1803 displays a document continuous scan/transmission start screen 2801. When a transmission button 2810 or a scan button 2811 is selected on the document continuous scan/transmission start screen 2801, the number-of-times of document registration performed by the user 107 is transmitted to a document management system 1901, and whether or not the above-mentioned number-of-times of document registration exceeds the number-of-times of document registration specified by the user 106 is determined. When the number-of-times of document registration performed by the user 107 is determined not to exceed the number-of-times of document registration specified by the user 106, the multi-function peripheral 1803 displays the document registration start screen 2405 on the operation panel. On the other hand, when the number-of-times of document registration performed by the user 107 is determined to exceed the number-of-times of document registration specified by the user 106, the multi-function peripheral 1803 displays a re-document registration request screen 2802 on the operation panel. When user 107 selects a menu button 2812 on the re-document registration request screen 2802, the menu screen 2401 is displayed on the operation panel; when a completion button 2812 is selected on the document continuous scan/transmission start screen 2801, the menu screen 2401 is displayed on the operation panel.

Fifth Embodiment

A fifth embodiment of the present invention will be described based on FIGS. 29A to 31C.

A summary of the present embodiment will first be described. The document management system 1910 receives information set for the document registration button on the menu displayed by the multi-function peripheral 1803 when the user 107 logs into the multi-function peripheral 1803. Then, the document management system 1910 compares new document registration button information to be stored in the database server 1802 with the received information set for the document registration button on the menu utilized by the multi-function peripheral 1803.

When, as a result of comparing both pieces of information, they are the same as each other, a pop-up or the like is displayed at the document registration button on the menu displayed by the multi-function peripheral 1803, and a focused request is transmitted to the multi-function peripheral 1803. On the other hand, when both pieces of information are different, the document management system 1910 transmits a request for producing a new document registration button to the multi-function peripheral 1803.

[Software Configuration]

Figure 29A:
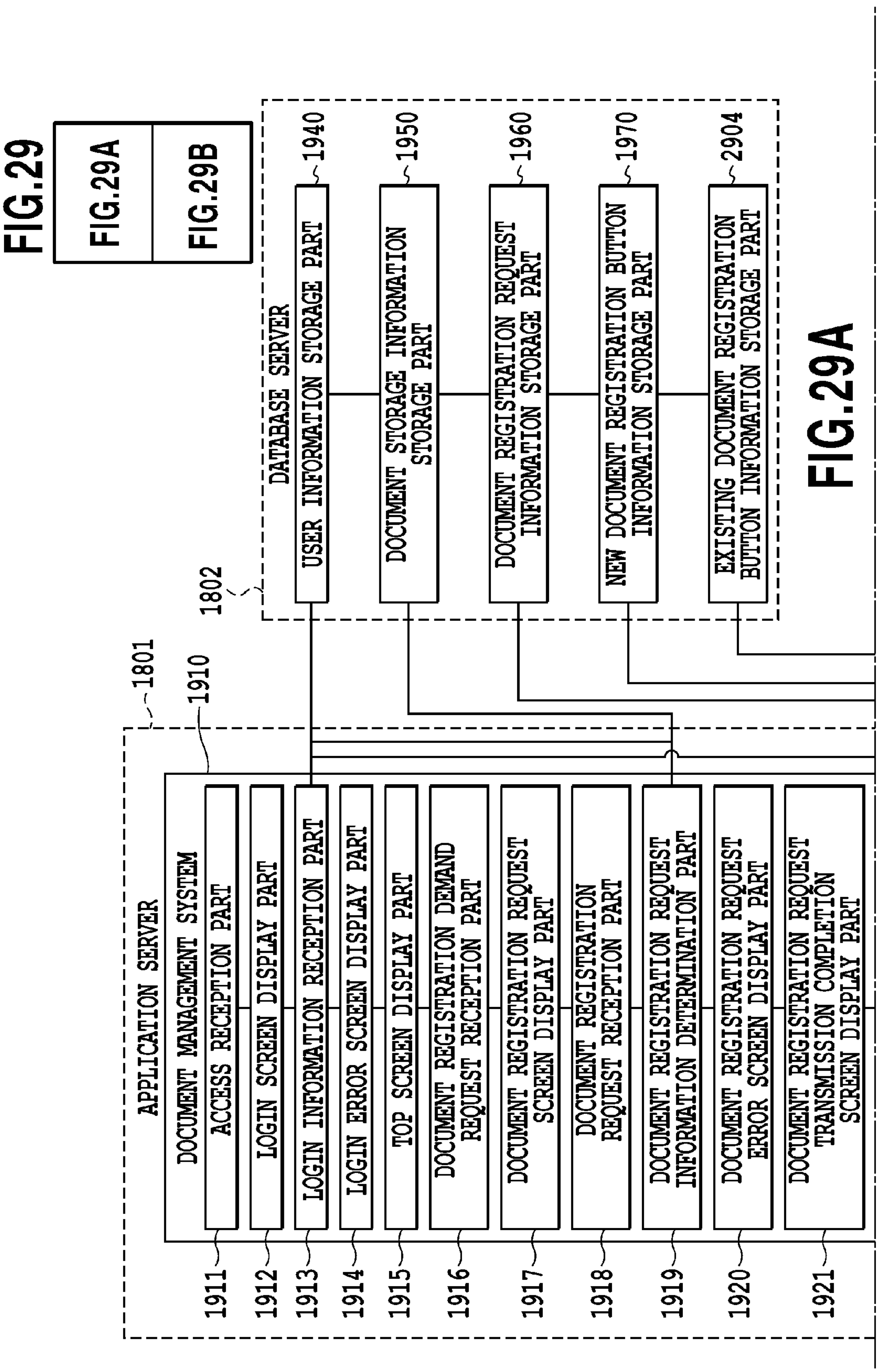
FIG. 29A is a diagram showing a software configuration in a fifth embodiment.
Figure 29B:
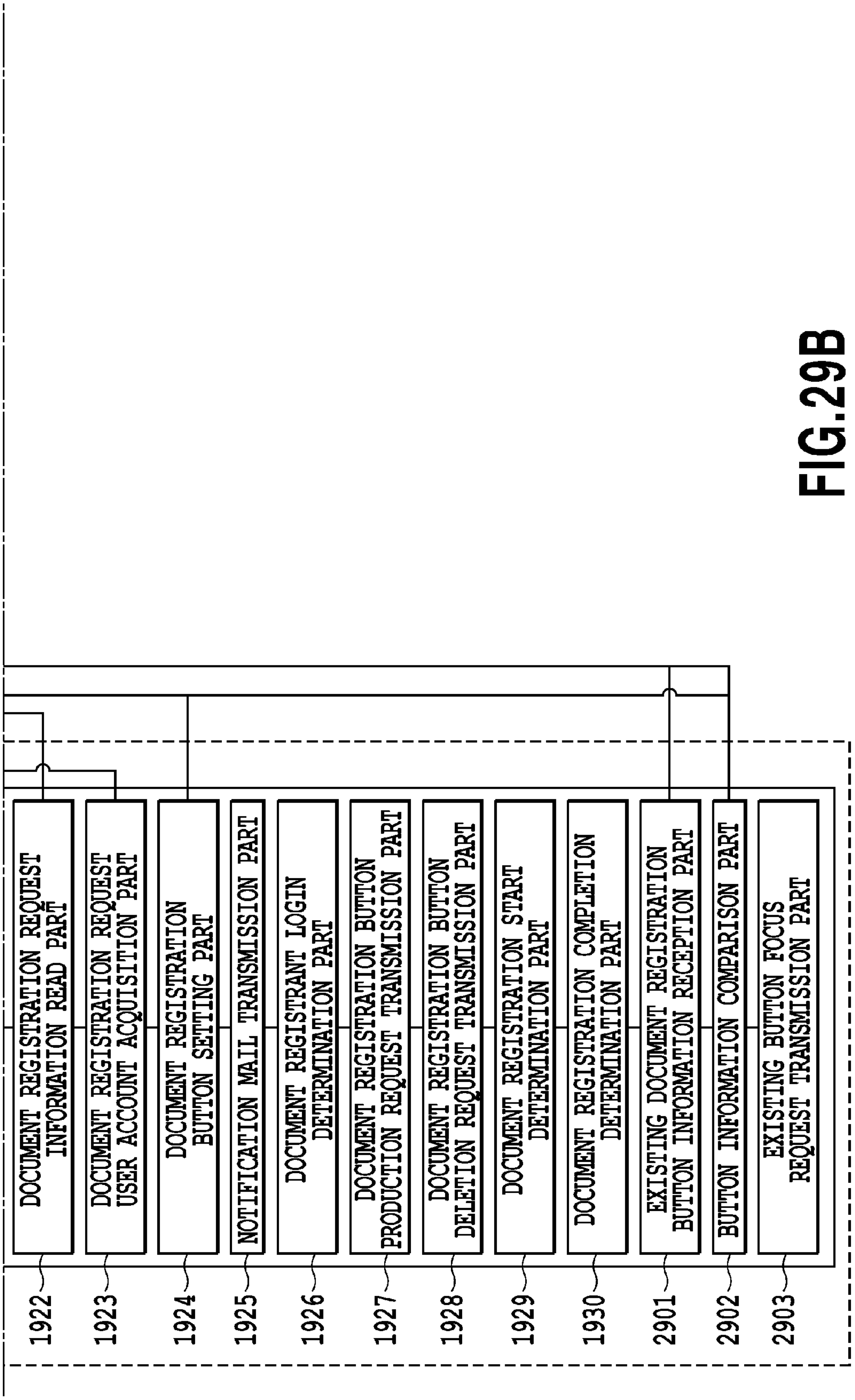
FIG. 29B is a diagram showing a software configuration in a fifth embodiment.

Now, software configurations within the application server 1801 and the database server 1802 in the present embodiment are shown in FIGS. 29A and 29B.

An existing document registration button information reception part 2901 receives information on the document registration button on the menu displayed by the multi-function peripheral 1803 when the user 107 logs into the multi-function peripheral 1803. Then, the above-mentioned information is stored in an existing document registration button information storage part 2904 of the database server 1802.

A button information comparison part 2902 calls the information on the document registration button stored in the existing document registration button information storage part 2904 of the server 1802 when the user 107 logs into the document management system 1910. The button information comparison part 2902 further calls information extracted from the document registration request stored in the new document registration button information storage part 1970 of the database server 1802 and the new document registration button information. Then, the button information comparison part 2902 compares the called pieces of document registration button information.

When, as a result of comparing the respective pieces of button information by the button information comparison part 2902, they are the same button information, an existing button focus request transmission part 2903 transmits, to the multi-function peripheral 1803, a request for focusing the document registration button on the menu displayed by the multi-function peripheral 1803. On the other hand, when they are different pieces of button information, the document registration button production request transmission part 1927 transmits the information on the document registration button stored in the new document registration button information storage part 1970 together with the document registration button production request. The configuration of the other parts is the same as in the third embodiment (FIGS. 19A and 19B), and thus their description will not be repeated.

[Existing Document Registration Button Focus Unit]

Figures 30, 30A:
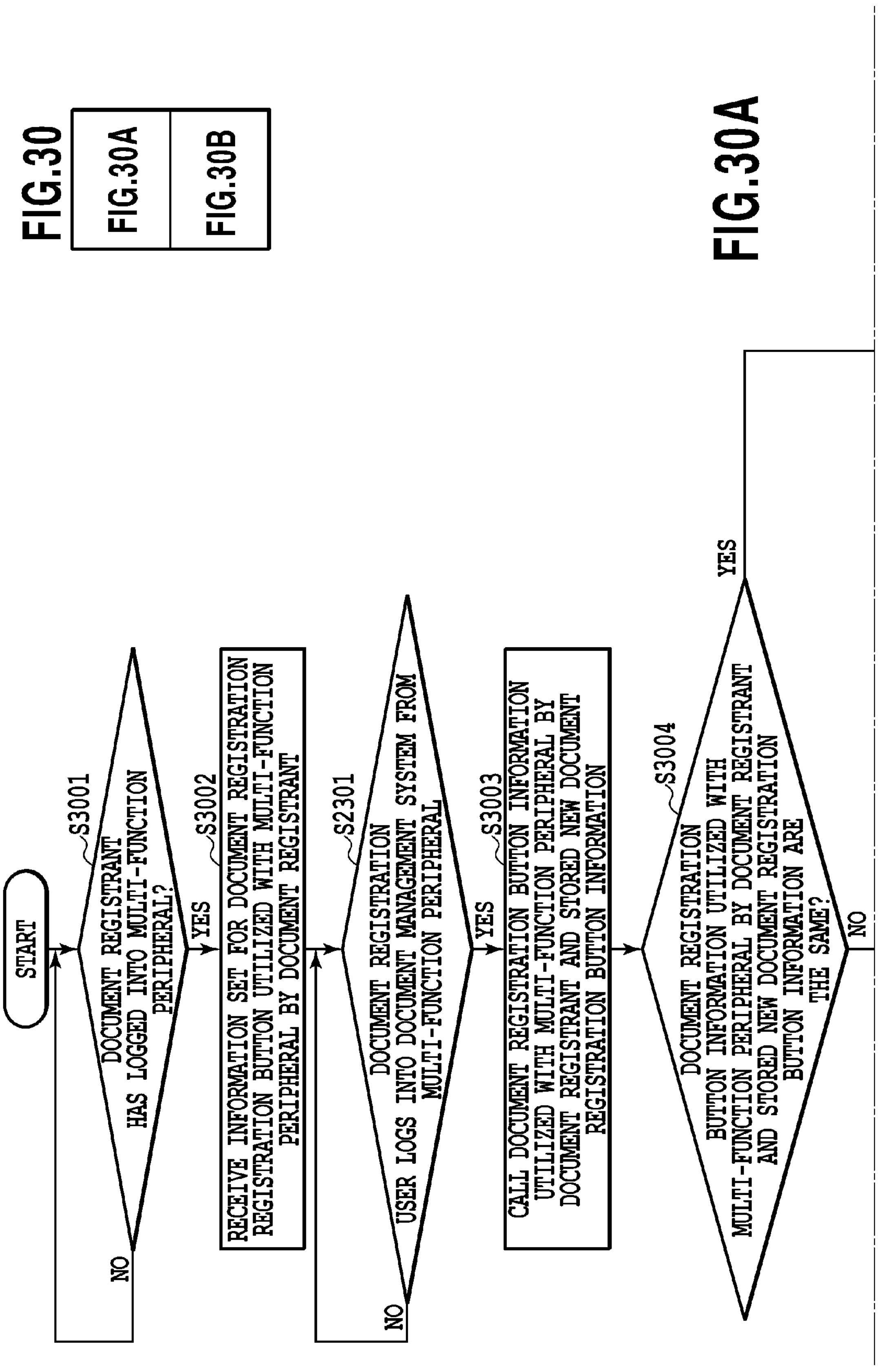
FIG. 30 is a diagram showing the relationship between FIG. 30A and FIG. 30B.
FIG. 30A is a flowchart of a document registration button focus process in the fifth embodiment.
Figure 30B:
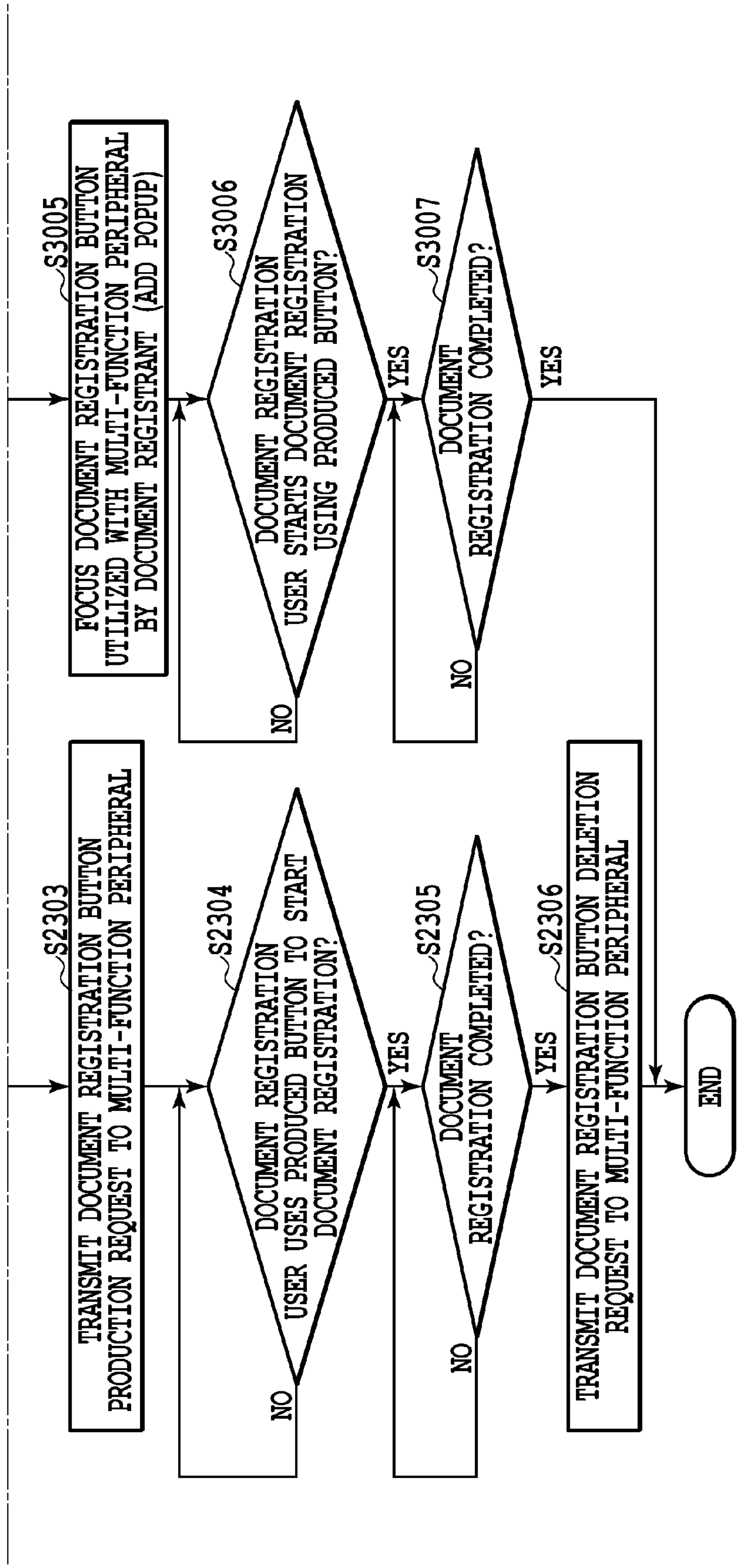
FIG. 30B is a flowchart of a document registration button focus process in the fifth embodiment.

Now, a flowchart used in focus processing on the existing button in the present embodiment is shown in FIGS. 30A and 30B. Step 2301 and steps 2303 to 2306 are the same as in the flowchart of FIG. 23, and thus their description will not be repeated.

At step 3001, the existing document registration button information reception part 2901 determines whether or not the user 107 logs into the multi-function peripheral 1803. Then, if the user 107 logs in, at step 3002, information set for the document registration button utilized in the multi-function peripheral 1803 by the user 107 is received from the multi-function peripheral 1803.

Then, if, at step 2301, the document registrant login determination part 1926 determines that the user 107 logs into the document management system 1910 through the multi-function peripheral 1803, the process proceeds to step 3003. At step 3003, the existing document registration button information reception part 2901 calls the document registration button information utilized in the multi-function peripheral by the user 107 and the new document registration button information extracted from the document registration request. Then, at step 3004, the button information comparison part 2902 compares the above-mentioned respective pieces of document registration button information called at step 3003.

If, as a result of the comparison at step 3004, they are determined to be the same information, the process proceeds to step 3005. At step 3005, an existing button focus request transmission part 1403 transmits a request for focusing the document registration button, and focuses the document registration button utilized in the multi-function peripheral 1803 by the user 107.

At step 3006, the document registration start determination part 1929 determines whether or not the user 107 has started the document registration using the focused document registration button. If, at step 3006, the user 107 is determined to have started the document registration, at step 3007, the document registration completion determination part 1930 determines whether or not the document registration has been completed.

At step 3004, the above-mentioned respective pieces of document registration button information called at step 3003 are compared, and, if, as a result of this comparison, they are different pieces of information, the process proceeds to step 2303. At step 2303, the document registration button production request transmission part 1927 transmits the document registration button production request to the multi-function peripheral 1803.

Figures 31, 31A:
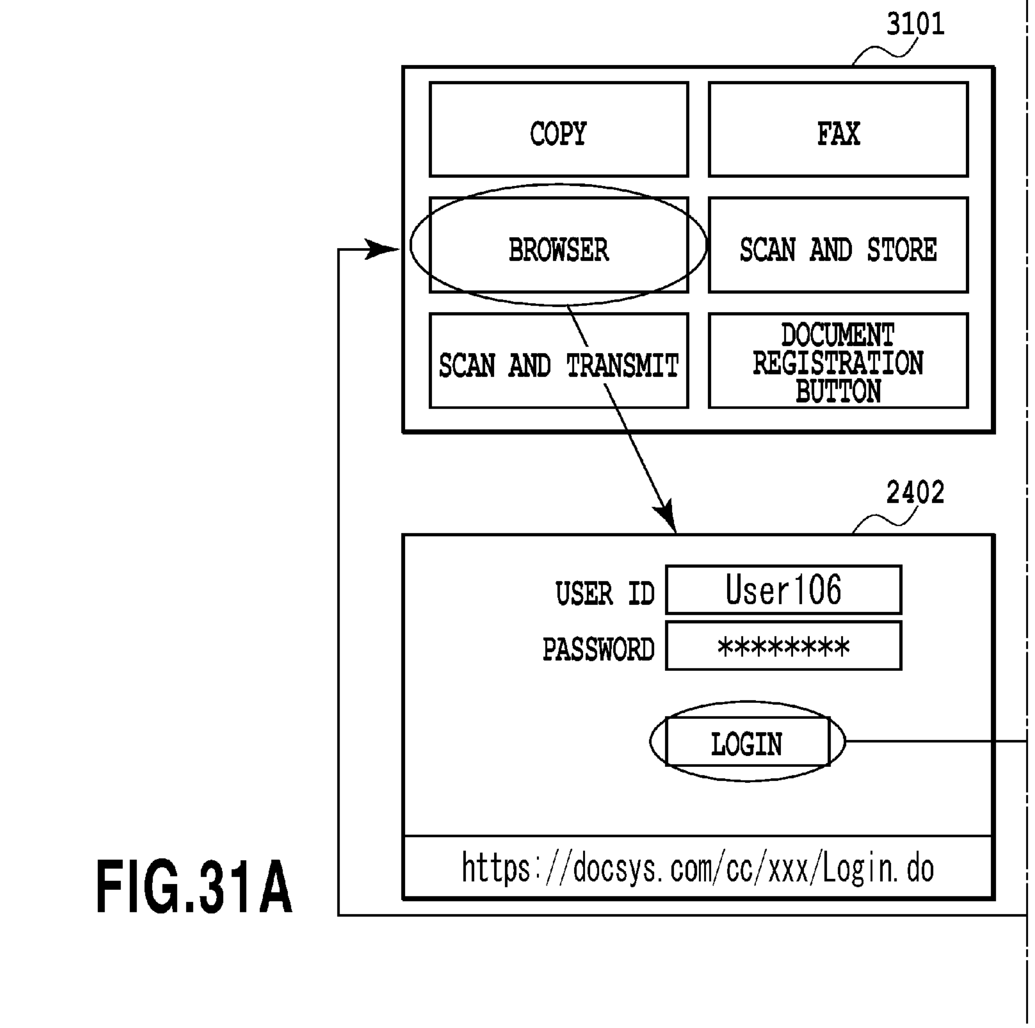
FIG. 31 is a diagram showing the relationship among FIG. 31A, FIG. 31B and FIG. 31C.
FIG. 31A is a diagram showing the details of screen transition in the fifth embodiment.
Figure 31B:
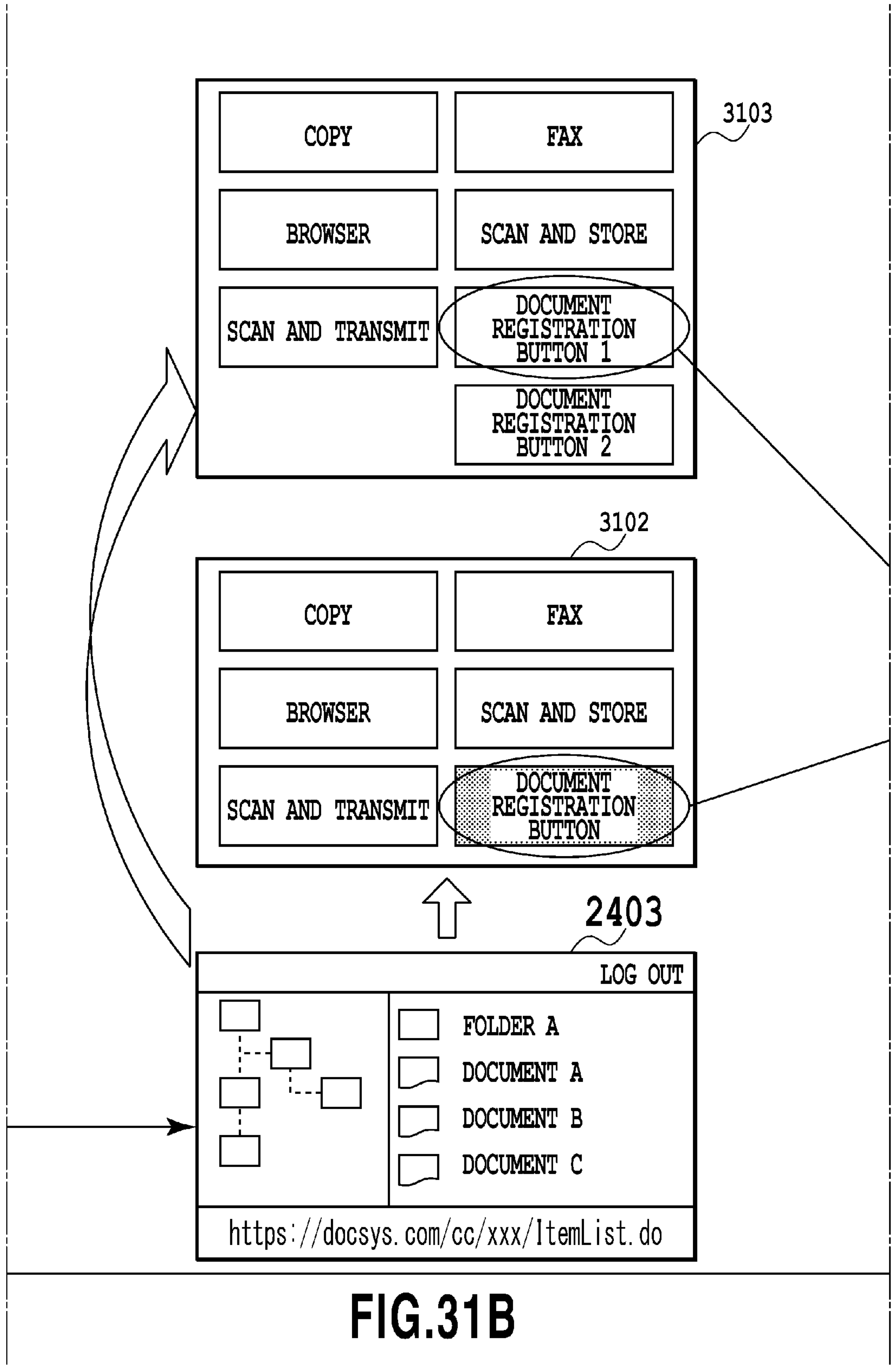
FIG. 31B is a diagram showing the details of screen transition in the fifth embodiment.
Figure 31C:
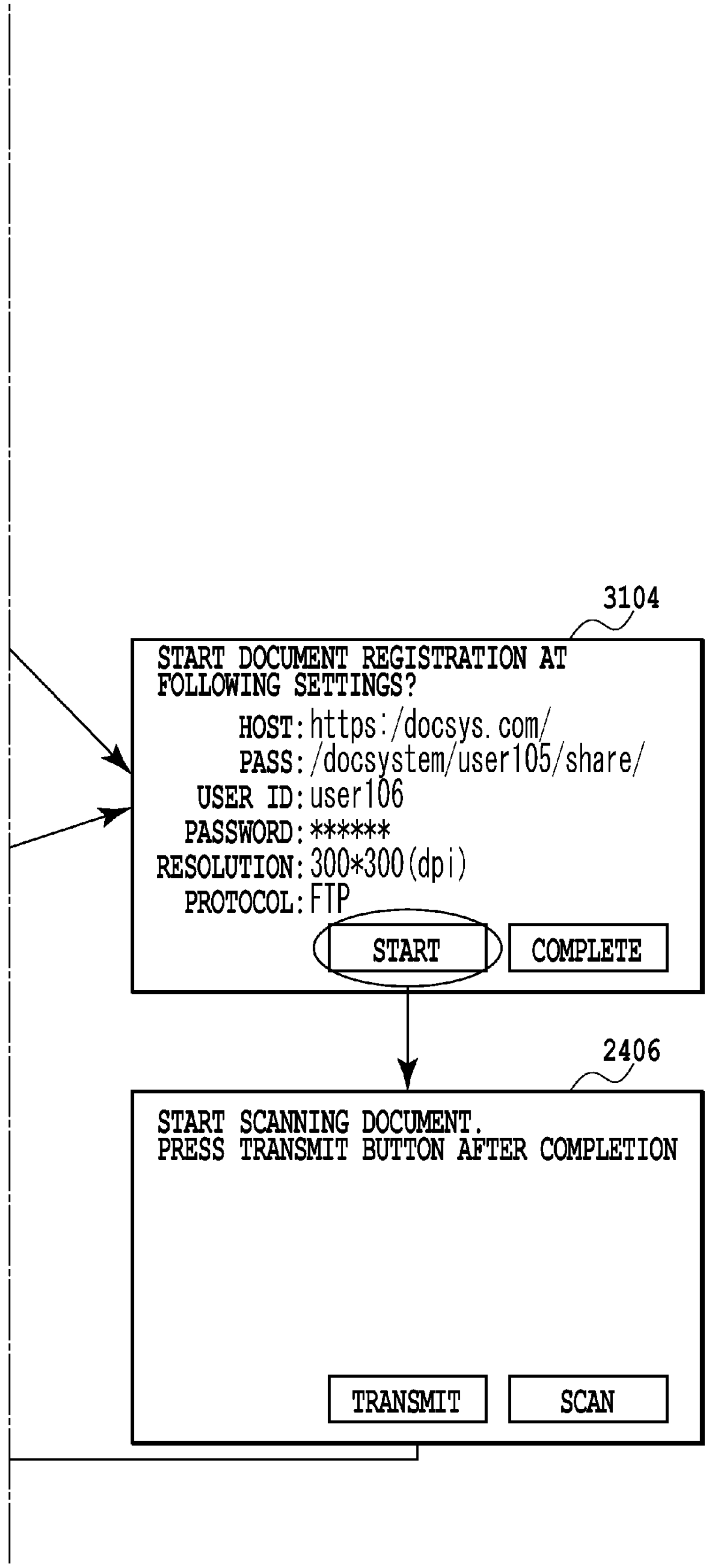
FIG. 31C is a diagram showing the details of screen transition in the fifth embodiment.

Now, an example of screen transition in the present embodiment is shown in FIGS. 31A to 31C.

When the user 107 logs into the multi-function peripheral 1803, a menu screen 3101 utilized by the multi-function peripheral 1803 is displayed on the operation panel of the multi-function peripheral 1803. Here, when the document registration button is present on the menu utilized by the user 107, the multi-function peripheral 1803 transmits information set for the document registration button to the document management system 1910. When the user 107 utilizes the browser installed in the multi-function peripheral 1803 to access the document management system 1910, the login screen 2402 of the document management system 1910 is displayed on the operation panel of the multi-function peripheral 1803. When the user 107 enters the user account of the user 107 on the login screen 2402 of the document management system 1901 and thereby logs in, the top screen 2903 is displayed on the operation panel.

Furthermore, the document management system 1910 compares the received information set for the document registration button on the menu utilized by the user 107 with the new document registration button information extracted from a newly received document registration request. When, as a result of the comparison, they are the same information, the document registration button focus request is transmitted to the multi-function peripheral 1803.

When the user 107 switches the screen of the multi-function peripheral 1803 from the browser to the menu screen, the multi-function peripheral 1803 that has received the document registration button focus request displays a menu screen 3202 in which the document registration button on the menu screen 3101 is focused. An example of the focusing method is to display a pop-up or the like to achieve the focusing; the present invention is not limited to this focusing method. Another possible example is to change colors, to change sizes or to produce a display with animation; any method may be used as long as a button that is focused and a button that is not focused can be distinguished from each other.

On the other hand, when, as a result of the above comparison, those pieces of button information are different, the document registration button production request is transmitted to the multi-function peripheral 1803. Then, when the user 107 switches the screen of the multi-function peripheral 1803 from the browser to the menu screen, the multi-function peripheral 1803 that has received the document registration button production request displays a menu screen 3103 obtained by adding a newly produced document registration button to the menu screen 3101.

When the user 107 starts the document registration utilizing a document registration button on a menu screen 3102 or 3103 including the document registration button, the multi-function peripheral 1803 displays a document registration start screen 3104 on the operation panel.

When the user 107 selects the start button on the document registration start screen 3104, the document scan/transmission start screen 2406 is displayed on the operation panel. When, on the displayed document scan/transmission start screen 2406, the document is scanned and the transmission button is selected, the scanned document is transmitted to the document management system 1910 and the application server 1801.

Sixth Embodiment

A sixth embodiment of the present invention will be described based on FIGS. 32 to 35.

[System Configuration]

Figure 32:
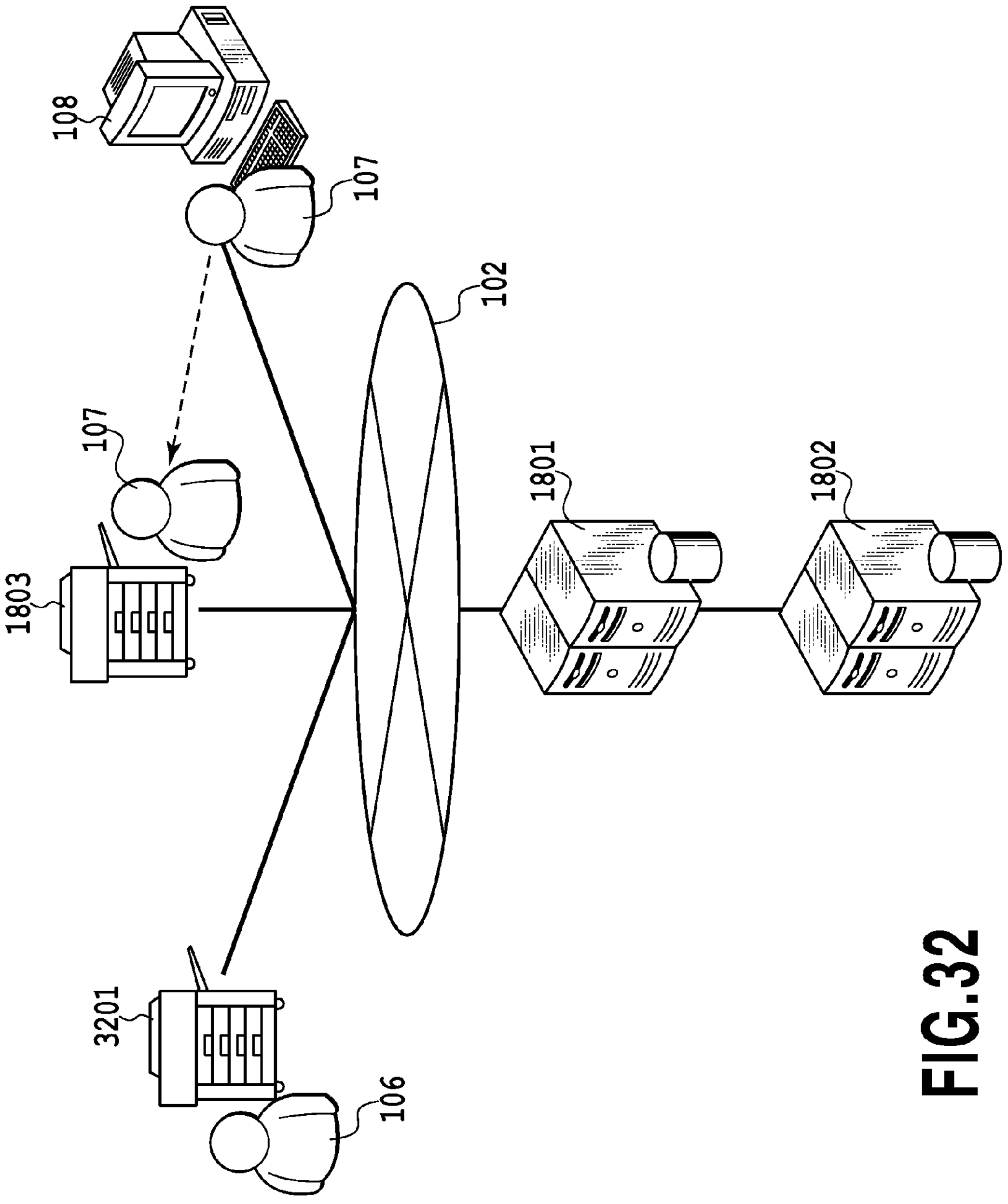
FIG. 32 is a system configuration diagram of a sixth embodiment of the document management system according to the present invention.

FIG. 32 is a (diagram showing the system configuration of the present embodiment.

A multi-function peripheral 3201 on the side of a document registration requester is connected through the network 102 to the application server 1801 and the database server 1802. The user 106 logs into the document management system within the application server 1801 from the multi-function peripheral 3201 through the network 102, and transmits information on a document registration request to the application server 1801.

When the application server 1801 receives the document registration demand request transmitted by the user 106, the application server 1801 reads information included in the document registration request set by the user 106 and the user account information on the document management system of the user 106 who has transmitted the document registration request. Furthermore, the application server 1801 receives document registration button information transmitted from the multi-function peripheral 3201 and utilized in the multi-function peripheral 3201 by the user 106. Then, the application server 1801 retrieves a document registration button corresponding to the information included in the read document registration request from the received multiple pieces of document registration button information. When, as a result of the retrieval, the corresponding document registration button is present, the application server 1801 makes an inquiry to the user 106 about whether the document registration button is utilized as is or a document registration button obtained by changing part of its setting is newly produced, and sets the document registration button information according to the result of the response.

When the document registration button information is set, the application server 1801 transmits an e-mail to a specified e-mail address within information included in the document registration request, using smtp (simple mail transfer protocol). The user 107 that has received the mail notification checks the text of the e-mail, accesses the application server 1801 from the multi-function peripheral 1803 and logs into the document management system. The multi-function peripheral 1803, after recognizing that the user 107 logs in, transmits a login request to the application server 1801.

The application server 1801 that has received the login request calls the set document registration button information, and transmits a document registration button production request to the multi-function peripheral 1803. The multi-function peripheral 1803 that has received the document registration button production request produces the document registration button on the menu utilized by the user 107. When the user 107 starts the document registration using the document registration button, the document scanned by the multi-function peripheral 1803 is transmitted to the application server 1801, and the application server 1801 stores the scanned document in the database server 1802.

After the completion of the document registration, the application server 1801 transmits, to the multi-function peripheral 1803, a document registration button deletion request for deleting the document registration button produced on the menu utilized by the user 107. The multi-function peripheral 1803 that has received the document registration button deletion request deletes the document registration button produced on the menu utilized by the user 107.

[Software Configuration]

Figures 33, 33A:
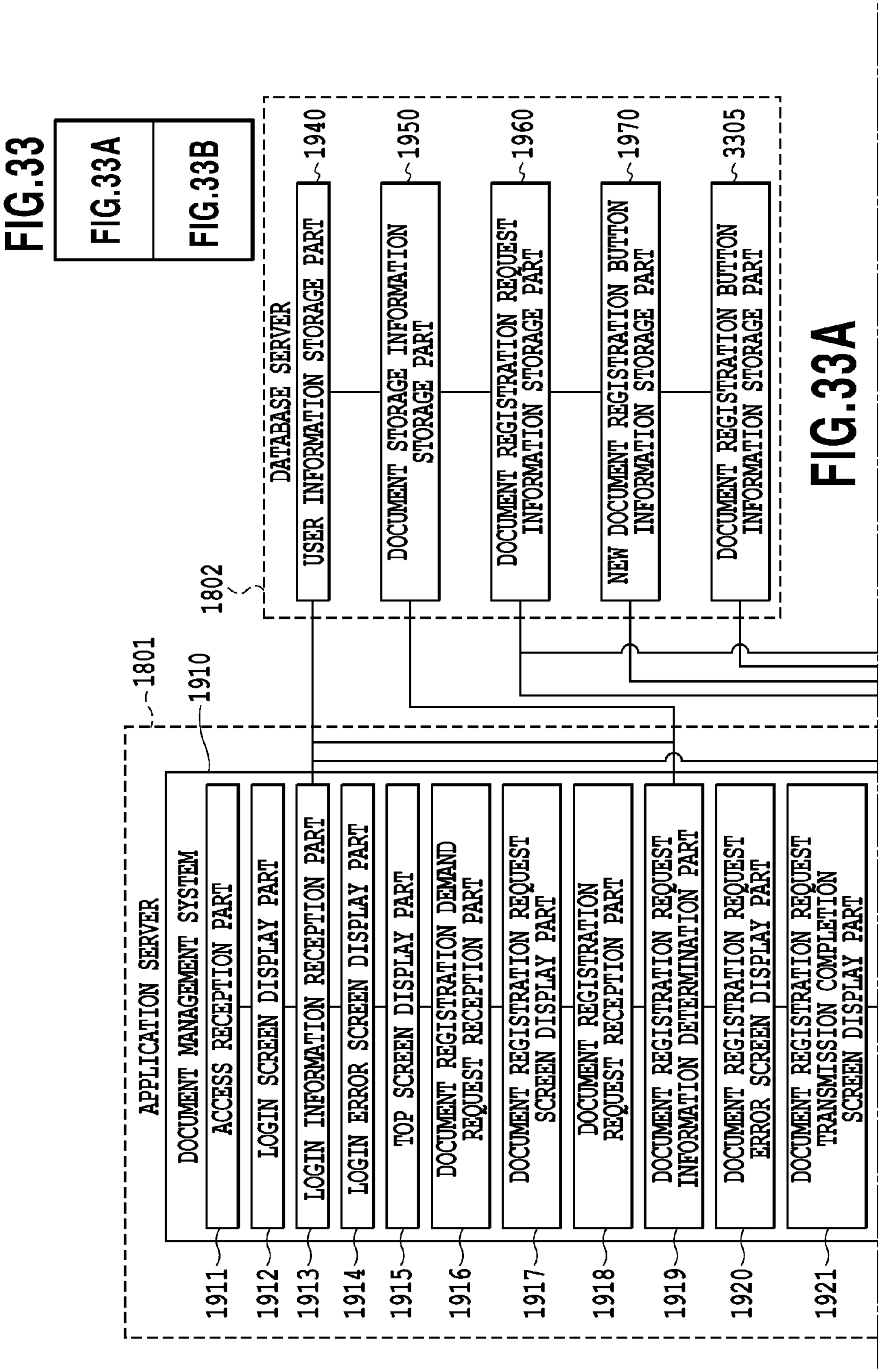
FIG. 33 is a diagram showing the relationship between FIG. 33A and FIG. 33B.
FIG. 33A is a diagram showing a software configuration in the sixth embodiment.
Figure 33B:
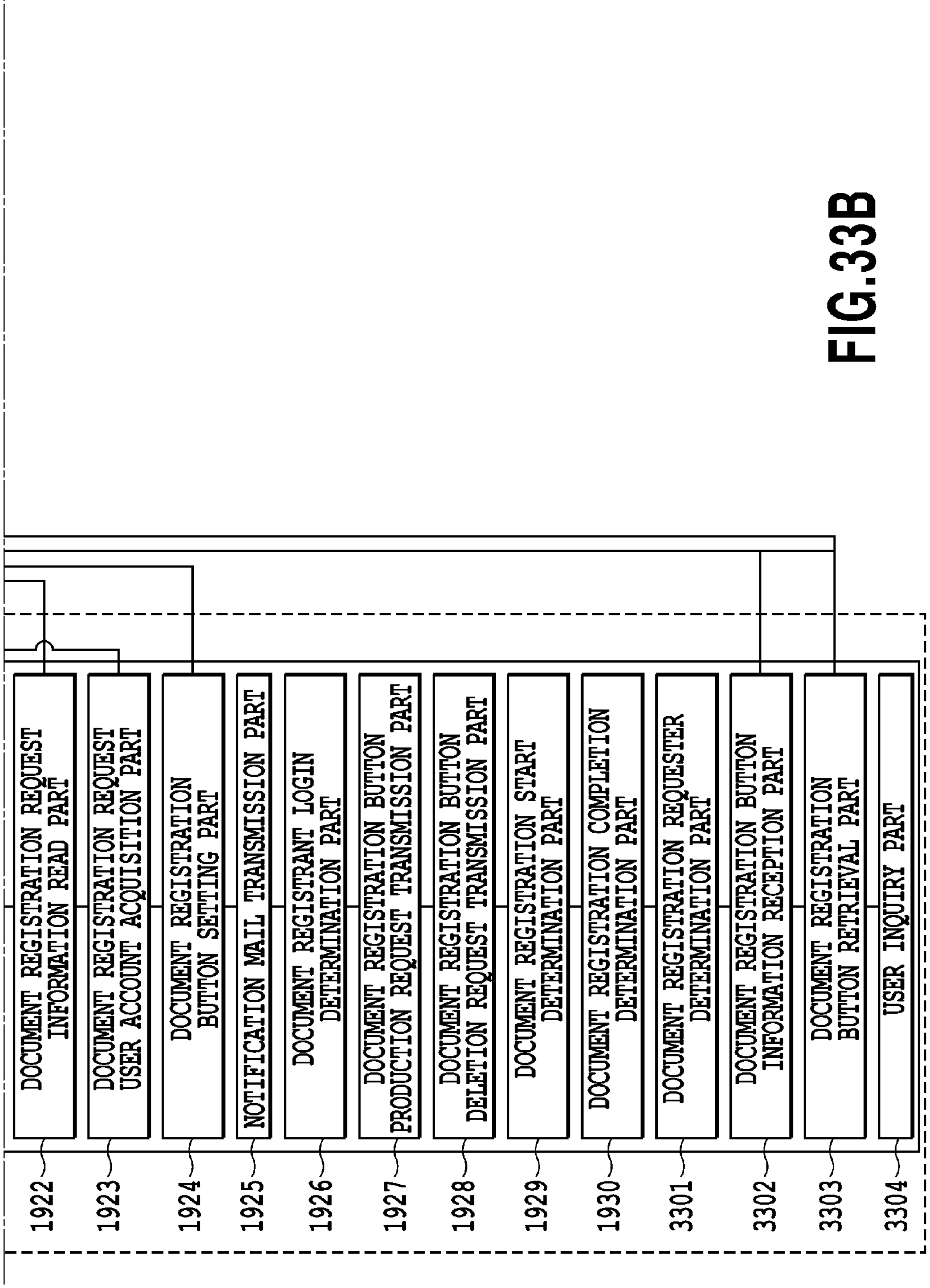
FIG. 33B is a diagram showing a software configuration in the sixth embodiment.

Now, software configurations within the application server 1801 and the database server 1802 in the present embodiment are shown in FIGS. 33A and 33B.

A document registration requester determination part 3301 determines type of client through which the user 106 makes the document registration request. Examples of the clients are the PCs and the multi-function peripheral; clients of the present invention are not limited to these clients.

When the document registration requester determination part 3301 determines that the client is a multi-function peripheral, a document registration button information reception part 3302 receives, from the multi-function peripheral 3201, the document registration button information utilized in the multi-function peripheral 3201 by the user 106. The document registration button information reception part 3302 stores the document registration button information utilized in the multi-function peripheral 3201 by the user 106 in a document registration button information storage part 3305 of the database server 1802.

A document registration button retrieval part 3303 retrieves a document registration button corresponding to the document registration information included in the document registration request from the document registration button information stored in the document registration button information storage part 3305 of the database server 1802.

A user inquiry part 3309 makes an inquiry to the user 106 about whether to lend the document registration button as is or to newly produce a button by changing part of its setting when, as a result of retrieving the document registration button by the document registration button retrieval part 3303, if the corresponding document registration button is present. The configuration of the other parts is the same as in FIGS. 19A and 19B, and thus their description will not be repeated.

[Document Registration Button Lending Unit and Newly Producing Unit]

Figures 34, 34A:
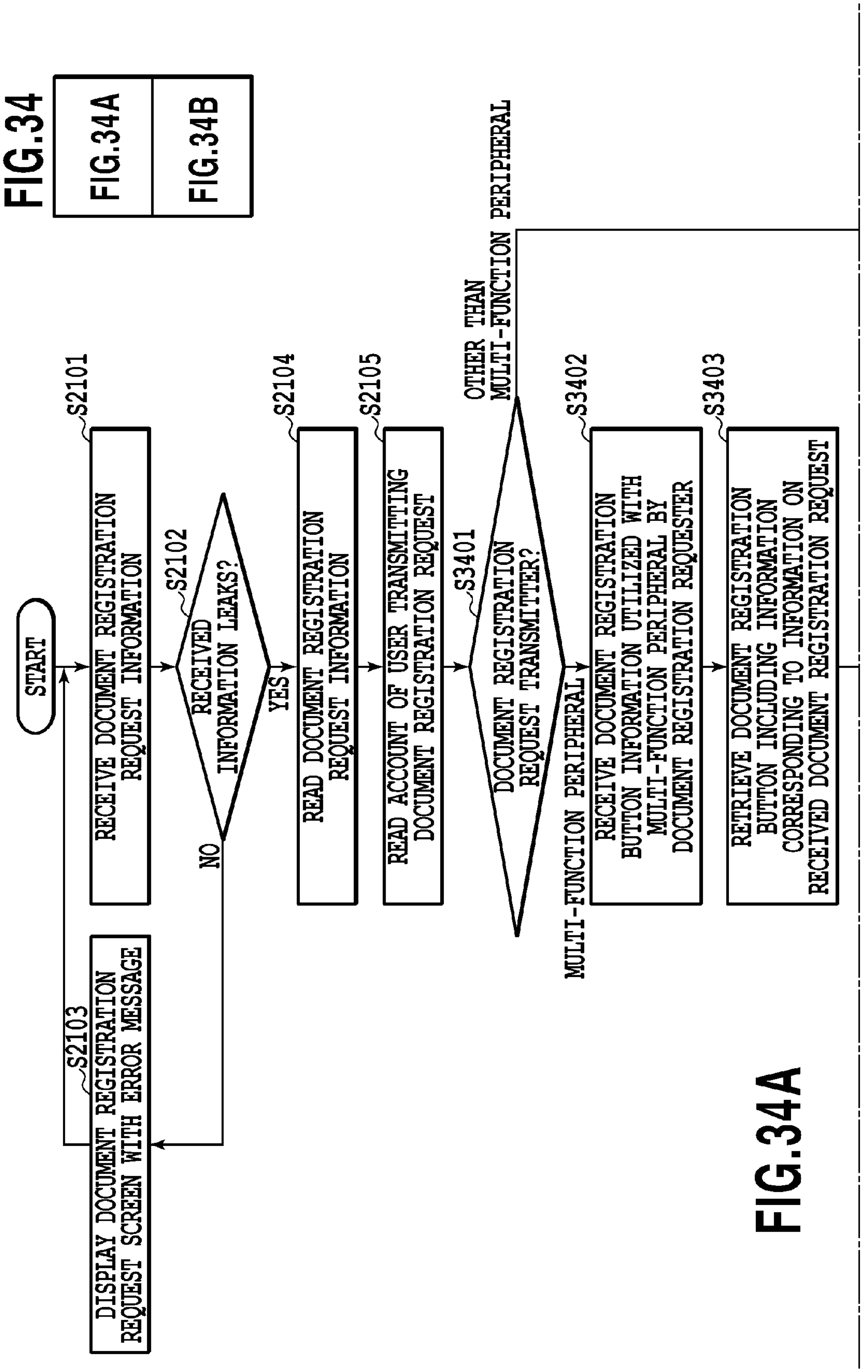
FIG. 34 is a diagram showing the relationship between FIG. 34A and FIG. 34B.
FIG. 34A is a flowchart of processing for producing and deleting a document registration button in the sixth embodiment.
Figure 34B:
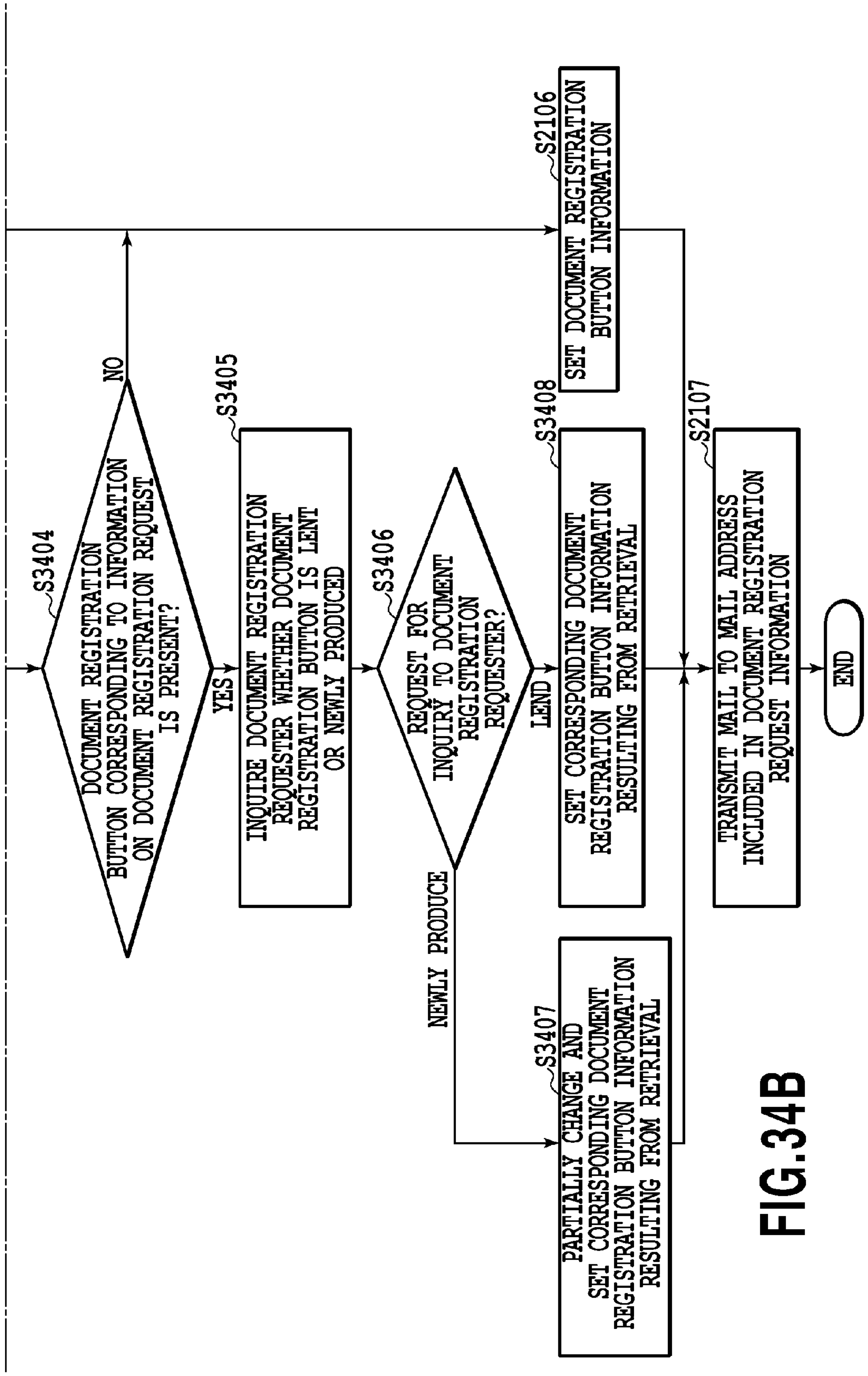
FIG. 34B is a flowchart of processing for producing and deleting a document registration button in the sixth embodiment.

Now, a flowchart used in the processing of lending the document registration button as is or of newly producing a button by changing part of its setting is shown in FIGS. 34A and 31B. Processing at steps 2101 to 2107 is the same as that in the corresponding steps in the flowchart of FIG. 21, and their description will not be repeated.

At step 3401, the document registration requester determination part 3301 determines the client that has transmitted the document registration request. If the document registration request transmitter is determined to be a multi-function peripheral, at step 3402, the document registration button information reception part 3302 receives the document registration button information utilized in the multi-function peripheral 3201 by the user 106. On the other hand, if, at step 3401, the document registration request transmitter is determined to be other than a multi-function peripheral, at step 2106, the document registration button setting part 1924 sets the document registration request information as the document registration button information.

At step 3403, the document registration button retrieval part 3303 retrieves the document registration button including the document registration request information from the document registration button information received at step 2002 and utilized in the multi-function peripheral 3201 by the user 106. As a result, whether or not the corresponding document registration button is present is determined at step 3404.

If, at step 3404, the corresponding document registration button is determined to be present, at step 3405, the user inquiry part 3304 makes an inquiry to the user 106 about whether to lend the corresponding document registration button or to newly produce a button. On the other hand, if, at step 3404, the corresponding document registration button is determined not to be present, at step 2106, the document registration button setting part 1924 sets the document registration request information as the document registration button information.

At step 3406, the document registration button retrieval part 3303 determines the content of the request from the user 106 for the inquiry at step 3405. If the request made by the user 106 is to newly produce a button, at step 3407, the document registration button setting part 1924 changes part of the corresponding document registration button information and sets it as a new document registration button. On the other hand, if the request made by the user 106 is to lend the corresponding document registration button, at step 2008, the document registration button setting part 1924 does not change the corresponding document registration button information and sets it as a new document registration button.

Figure 35:
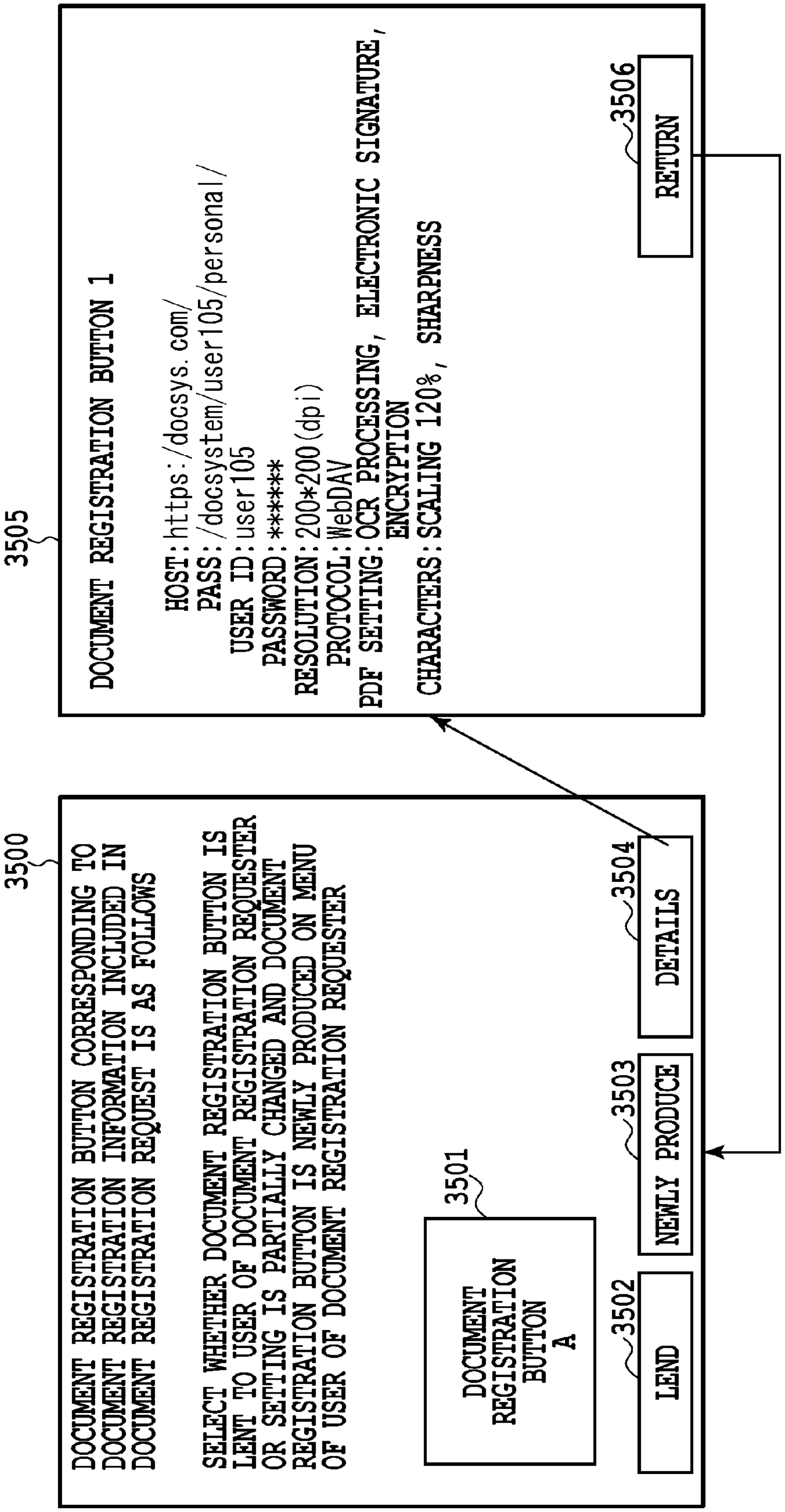
FIG. 35 is a diagram showing a user inquiry screen in the sixth embodiment.

Now, an example of a screen transmitted by the user inquiry part 3304 to the multi-function peripheral 3201 is shown in FIG. 35.

A user inquiry screen 3500 is a screen that is transmitted from the user inquiry part 3304 of the document management system 1910 to the multi-function peripheral 3201, and that is used to make an inquiry to the user 106 about whether to lend the document registration button or to newly produce a button. When the user 106 selects a document registration button A 3501 included in the user inquiry screen 3500, and further selects a lending button 3502, the document management system 1910 receives information set for the document registration button A 1901 from the multi-function peripheral 3201. On the other hand, when the user 106 selects a new production button 3503, information obtained by changing part of the information set for the document registration button A 1901 is received from the multi-function peripheral 3201. Examples of the part of the information include a PDF setting displayed on a document registration button detail screen 3505 described later, the scaling of characters and brightness; needless to say, the present invention is not limited to these examples. When the user 106 selects a detail button 3504, the document registration button detail screen 3505 is displayed on the multi-function peripheral 1701. When the user 106 selects a return button 3506 on the document registration button detail screen 3505, the user inquiry screen 3500 is displayed on the multi-function peripheral 3201.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-000987, filed Jan. 5, 2010, and 2010-149685, filed Jun. 30, 2010 which are hereby incorporated by reference herein in their entirety.

What is claimed is:

1. A document management device comprising:

a reception unit receiving information on a document registration user that is a requester for document registration and information on a document registration destination;

a provision unit providing based on said received information a first page displayed when the document registration user logs into the document management device with a link for accessing a second page for registering a desired document at the document registration destination received by the reception unit, wherein the second page is a document registration permission page that allows the document registration user to temporarily access the desired document to complete the registration; and a registration unit registering the desired document at the document registration destination when the document registration user performs an operation of registering the desired document on the second page accessed through the link included in the first page, wherein at least one of the reception unit, the provision unit, and the registration unit comprises at least one of a processor and a memory.

2. The document management device of claim 1 further comprising:

a first transmission unit transmitting, when the document registration user logs into the document management device, the first page provided with the link by the provision unit so that the first page is displayed on a terminal of the document registration user.

3. The document management device of claim 1 further comprising:

an access right setting unit setting an access right for the document registration user to register the document at the document registration destination when the document registration user registers the desired document at the document registration destination through the second page.

4. The document management device of claim 3, wherein the access right setting unit includes a unit returning the access right set for the document registration user to a state before the setting when the registration of the document at the document registration destination is completed.

5. The document management device of claim 1 further comprising:

a unit setting a possible number of times of document registration that can be performed in the registration unit;

a unit determining a number of times of registration of the desired document in the registration unit; and a unit performing control so that, when the determined number of times of registration exceeds the possible number of times of registration, the registration unit does not perform the registration.

6. The document management device of claim 1 further comprising:

a display unit displaying the link on the first page with a first method;

a unit receiving information on the link; and a comparison unit comparing the information on the link received by the unit with the information received by the reception unit, wherein, when as a result of the comparison by the comparison unit, the information on the link is the same as the information received by the reception unit, the display unit displays the link on the first page with a second method different from the first method.

7. The document management device of claim 6, wherein the comparison unit includes a unit comparing link information on a terminal of the request user with the information received by the reception unit, and wherein when, as a result of the comparison by the comparison unit, the link information on the terminal of the request user is the same as the information received by the reception unit, the provision unit uses the link information on the terminal of the request user to provide the link.

8. The document management device of claim 7, wherein the provision unit can change setting of the link information on the terminal of the request user.

9. The document management device of claim 1, wherein the reception unit receives the information on the document registration user and the information on the document registration destination by electronic mail from a request user who has requested the document registration.

10. The document management device of claim 1, wherein the reception unit receives the information on the document registration user and the information on the document registration destination which are input by a request user who performs a document registration request through a third page for performing the document registration request supplied by the document management device.

11. The document management device of claim 1 further comprising:

a second transmission unit transmitting, when the registration of the document at the document registration destination is completed, the first page not provided with the link so as to display the first page on a terminal of the document registration user.

12. The document management device of claim 1, wherein the link is a link to a fourth page for displaying a list of document registration requests performed by the document registration user, and the fourth page includes a link to the second page.

13. A document management method in a document management device, the method comprising the steps of:

configuring at least one processor or circuit to perform the steps of:

receiving, in a reception unit, information on a document registration user who is a requester for document registration and information on a document registration destination;

providing based on said received information, in a provision unit, a first page displayed when the document registration user logs into the document management device with a link for accessing a second page for registering a desired document at the document registration destination received by the reception unit, wherein the second page is a document registration permission page that allows the document registration user to temporarily access the desired document to complete the registration; and registering, in a registration unit, the desired document at the document registration destination when the document registration user performs an operation of registering the desired document on the second page accessed through the link included in the first page.

14. A non-transitory computer readable storage medium storing a computer program for causing a computer to perform a document management method of claim 13.

* * * * *